(12) United States Patent
Snyder et al.

(10) Patent No.: US 8,021,778 B2
(45) Date of Patent: Sep. 20, 2011

(54) ELECTROCHEMICAL APPARATUS WITH BARRIER LAYER PROTECTED SUBSTRATE

(75) Inventors: Shawn W. Snyder, Golden, CO (US); Bernd J. Neudecker, Littleton, CO (US)

(73) Assignee: Infinite Power Solutions, Inc., Littleton, CO (US)

( * ) Notice: Subject to any disclaimer, the term of this patent is extended or adjusted under 35 U.S.C. 154(b) by 1508 days.

(21) Appl. No.: 11/209,536

(22) Filed: Aug. 23, 2005

(65) Prior Publication Data

US 2006/0286448 A1   Dec. 21, 2006

Related U.S. Application Data

(63) Continuation of application No. 11/374,282, filed on Jun. 15, 2005, which is a continuation-in-part of application No. 10/215,190, filed on Aug. 9, 2002, now Pat. No. 6,916,679.

(60) Provisional application No. 60/690,697, filed on Jun. 15, 2005.

(51) Int. Cl.
 *H01M 6/40* (2006.01)
 *H01M 6/42* (2006.01)
 *H01M 6/46* (2006.01)

(52) U.S. Cl. ............ 429/162; 429/149; 429/156

(58) Field of Classification Search ........... 429/162, 429/176, 149, 163
See application file for complete search history.

(56) References Cited

U.S. PATENT DOCUMENTS

| | | |
|---|---|---|
| 712,316 A | 10/1902 | Loppe et al. |
| 2,970,180 A | 1/1961 | Urry |
| 3,616,403 A | 10/1971 | Collins et al. |
| 3,797,091 A | 3/1974 | Gavin |
| 3,850,604 A | 11/1974 | Klein |
| 3,939,008 A | 2/1976 | Longo et al. |
| 4,082,569 A | 4/1978 | Evans, Jr. |
| 4,111,523 A | 9/1978 | Kaminow et al. |

(Continued)

FOREIGN PATENT DOCUMENTS

CN    1415124    4/2003

(Continued)

OTHER PUBLICATIONS

Dobkin, Daniel, Silicon Dioxide: Properties and Applications, http://www.enigmatic-consulting.com/semiconductor_processing/CVD_Fundamentals/films/SiO2_properties.html.*

(Continued)

*Primary Examiner* — Jerry A Lorengo
*Assistant Examiner* — Jared Wood
(74) *Attorney, Agent, or Firm* — Dewey & LeBoeuf LLP; Jeff E. Schwartz

(57) ABSTRACT

The present invention relates to apparatus, compositions and methods of fabricating high performance thin-film batteries on metallic substrates, polymeric substrates, or doped or undoped silicon substrates by fabricating an appropriate barrier layer composed, for example, of barrier sublayers between the substrate and the battery part of the present invention thereby separating these two parts chemically during the entire battery fabrication process as well as during any operation and storage of the electrochemical apparatus during its entire lifetime. In a preferred embodiment of the present invention thin-film batteries fabricated onto a thin, flexible stainless steel foil substrate using an appropriate barrier layer that is composed of barrier sublayers have uncompromised electrochemical performance compared to thin-film batteries fabricated onto ceramic substrates when using a 700° C. post-deposition anneal process for a $LiCoO_2$ positive cathode.

44 Claims, 15 Drawing Sheets

U.S. PATENT DOCUMENTS

| | | |
|---|---|---|
| 4,127,424 A | 11/1978 | Ullery, Jr. |
| 4,226,924 A | 10/1980 | Kimura et al. |
| 4,283,216 A | 8/1981 | Brereton |
| 4,318,938 A | 3/1982 | Barnett et al. |
| 4,437,966 A | 3/1984 | Hope et al. |
| 4,442,144 A | 4/1984 | Pipkin |
| 4,481,265 A | 11/1984 | Ezawa et al. |
| 4,518,661 A | 5/1985 | Rippere |
| 4,555,456 A | 11/1985 | Kanehori et al. |
| 4,572,873 A | 2/1986 | Kanehori et al. |
| 4,587,225 A | 5/1986 | Tsukuma et al. |
| 4,619,680 A | 10/1986 | Nourshargh et al. |
| 4,645,726 A | 2/1987 | Hiratani et al. |
| 4,664,993 A | 5/1987 | Sturgis et al. |
| 4,668,593 A | 5/1987 | Sammells |
| RE32,449 E | 6/1987 | Claussen |
| 4,672,586 A | 6/1987 | Shimohigashi et al. |
| 4,710,940 A | 12/1987 | Sipes, Jr. |
| 4,728,588 A | 3/1988 | Noding et al. |
| 4,740,431 A | 4/1988 | Little |
| 4,756,717 A | 7/1988 | Sturgis et al. |
| 4,785,459 A | 11/1988 | Baer |
| 4,826,743 A | 5/1989 | Nazri |
| 4,865,428 A | 9/1989 | Corrigan |
| 4,878,094 A | 10/1989 | Balkanski |
| 4,903,326 A | 2/1990 | Zakman et al. |
| 4,915,810 A | 4/1990 | Kestigian et al. |
| 4,964,877 A | 10/1990 | Keister et al. |
| 4,977,007 A | 12/1990 | Kondo et al. |
| 4,978,437 A | 12/1990 | Wirz |
| 5,006,737 A | 4/1991 | Fay |
| 5,019,467 A | 5/1991 | Fujiwara |
| 5,030,331 A | 7/1991 | Sato |
| 5,035,965 A | 7/1991 | Sangyoji et al. |
| 5,055,704 A | 10/1991 | Link et al. |
| 5,057,385 A | 10/1991 | Hope et al. |
| 5,085,904 A | 2/1992 | Deak et al. |
| 5,096,852 A | 3/1992 | Hobson |
| 5,100,821 A | 3/1992 | Fay |
| 5,107,538 A | 4/1992 | Benton et al. |
| 5,110,694 A | 5/1992 | Nagasubramanian et al. |
| 5,110,696 A | 5/1992 | Shokoohi et al. |
| 5,119,269 A | 6/1992 | Nakayama |
| 5,119,460 A | 6/1992 | Bruce et al. |
| 5,124,782 A | 6/1992 | Hundt et al. |
| 5,147,985 A | 9/1992 | DuBrucq |
| 5,153,710 A | 10/1992 | McCain |
| 5,169,408 A | 12/1992 | Biggerstaff et al. |
| 5,171,413 A | 12/1992 | Arntz et al. |
| 5,173,271 A | 12/1992 | Chen et al. |
| 5,174,876 A | 12/1992 | Buchal et al. |
| 5,180,645 A | 1/1993 | Morè |
| 5,187,564 A | 2/1993 | McCain |
| 5,196,041 A | 3/1993 | Tumminelli et al. |
| 5,196,374 A | 3/1993 | Hundt et al. |
| 5,200,029 A | 4/1993 | Bruce et al. |
| 5,202,201 A | 4/1993 | Meunier et al. |
| 5,206,925 A | 4/1993 | Nakazawa et al. |
| 5,208,121 A | 5/1993 | Yahnke et al. |
| 5,217,828 A | 6/1993 | Sangyoji et al. |
| 5,221,891 A | 6/1993 | Janda et al. |
| 5,225,288 A | 7/1993 | Beeson et al. |
| 5,227,264 A | 7/1993 | Duval et al. |
| 5,237,439 A | 8/1993 | Misono et al. |
| 5,252,194 A | 10/1993 | Demaray et al. |
| 5,273,608 A | 12/1993 | Nath |
| 5,287,427 A | 2/1994 | Atkins et al. |
| 5,296,089 A | 3/1994 | Chen et al. |
| 5,300,461 A | 4/1994 | Ting |
| 5,303,319 A | 4/1994 | Ford et al. |
| 5,306,569 A | 4/1994 | Hiraki |
| 5,307,240 A | 4/1994 | McMahon |
| 5,309,302 A | 5/1994 | Vollmann |
| 5,314,765 A | 5/1994 | Bates |
| 5,326,652 A | 7/1994 | Lake |
| 5,326,653 A | 7/1994 | Chang |
| 5,338,624 A | 8/1994 | Gruenstern et al. |
| 5,338,625 A | 8/1994 | Bates et al. |
| 5,342,709 A | 8/1994 | Yahnke et al. |
| 5,355,089 A | 10/1994 | Treger et al. |
| 5,360,686 A | 11/1994 | Peled et al. |
| 5,362,579 A | 11/1994 | Rossoll et al. |
| 5,381,262 A | 1/1995 | Arima et al. |
| 5,387,482 A | 2/1995 | Anani |
| 5,401,595 A | 3/1995 | Kagawa et al. |
| 5,403,680 A | 4/1995 | Otagawa et al. |
| 5,411,537 A | 5/1995 | Munshi et al. |
| 5,411,592 A | 5/1995 | Ovshinsky et al. |
| 5,419,982 A | 5/1995 | Tura et al. |
| 5,427,669 A | 6/1995 | Drummond |
| 5,435,826 A | 7/1995 | Sakakibara et al. |
| 5,437,692 A | 8/1995 | Dasgupta et al. |
| 5,445,856 A | 8/1995 | Chaloner-Gill |
| 5,445,906 A | 8/1995 | Hobson et al. |
| 5,448,110 A | 9/1995 | Tuttle et al. |
| 5,449,576 A | 9/1995 | Anani |
| 5,455,126 A | 10/1995 | Bates et al. |
| 5,457,569 A | 10/1995 | Liou et al. |
| 5,458,995 A | 10/1995 | Behl et al. |
| 5,464,706 A | 11/1995 | Dasgupta et al. |
| 5,470,396 A | 11/1995 | Mongon et al. |
| 5,472,795 A | 12/1995 | Atita |
| 5,475,528 A | 12/1995 | LaBorde |
| 5,478,456 A | 12/1995 | Humpal et al. |
| 5,483,613 A | 1/1996 | Bruce et al. |
| 5,493,177 A | 2/1996 | Muller et al. |
| 5,498,489 A | 3/1996 | Dasgupta et al. |
| 5,499,207 A | 3/1996 | Miki et al. |
| 5,501,918 A | 3/1996 | Gruenstern et al. |
| 5,504,041 A | 4/1996 | Summerfelt |
| 5,512,147 A | 4/1996 | Bates et al. |
| 5,512,387 A | 4/1996 | Ovshinsky |
| 5,512,389 A | 4/1996 | Dasgupta et al. |
| 5,538,796 A | 7/1996 | Schaffer et al. |
| 5,540,742 A | 7/1996 | Sangyoji et al. |
| 5,547,780 A | 8/1996 | Kagawa et al. |
| 5,547,782 A | 8/1996 | Dasgupta et al. |
| 5,552,242 A | 9/1996 | Ovshinsky et al. |
| 5,555,127 A | 9/1996 | Abdelkader et al. |
| 5,561,004 A | 10/1996 | Bates et al. |
| 5,563,979 A | 10/1996 | Bruce et al. |
| 5,565,071 A | 10/1996 | Demaray et al. |
| 5,567,210 A | 10/1996 | Bates et al. |
| 5,569,520 A | 10/1996 | Bates |
| 5,582,935 A | 12/1996 | Dasgupta et al. |
| 5,591,520 A | 1/1997 | Migliorini et al. |
| 5,597,660 A | 1/1997 | Bates et al. |
| 5,597,661 A | 1/1997 | Takeuchi et al. |
| 5,599,355 A | 2/1997 | Nagasubramanian et al. |
| 5,601,952 A | 2/1997 | Dasgupta et al. |
| 5,603,816 A | 2/1997 | Demaray et al. |
| 5,607,560 A | 3/1997 | Hirabayashi et al. |
| 5,607,789 A | 3/1997 | Treger et al. |
| 5,612,152 A | 3/1997 | Bates |
| 5,612,153 A | 3/1997 | Moulton et al. |
| 5,613,995 A | 3/1997 | Bhandarkar et al. |
| 5,616,933 A | 4/1997 | Li |
| 5,637,418 A | 6/1997 | Brown et al. |
| 5,643,480 A | 7/1997 | Gustavsson et al. |
| 5,644,207 A | 7/1997 | Lew et al. |
| 5,645,626 A | 7/1997 | Edlund et al. |
| 5,645,960 A | 7/1997 | Scrosati et al. |
| 5,654,054 A | 8/1997 | Tropsha et al. |
| 5,654,984 A | 8/1997 | Hershbarger et al. |
| 5,658,652 A | 8/1997 | Sellergren |
| 5,660,700 A | 8/1997 | Shimizu et al. |
| 5,665,490 A | 9/1997 | Takeuchi et al. |
| 5,667,538 A | 9/1997 | Bailey |
| 5,677,784 A | 10/1997 | Harris |
| 5,679,980 A | 10/1997 | Summerfelt |
| 5,681,666 A | 10/1997 | Treger et al. |
| 5,686,360 A | 11/1997 | Harvey, III et al. |
| 5,689,522 A | 11/1997 | Beach |
| 5,693,956 A | 12/1997 | Shi et al. |
| 5,702,829 A | 12/1997 | Paidassi et al. |
| 5,705,293 A | 1/1998 | Hobson |
| 5,718,813 A | 2/1998 | Drummond et al. |

| Patent | Date | Inventor |
|---|---|---|
| 5,719,976 A | 2/1998 | Henry et al. |
| 5,721,067 A | 2/1998 | Jacobs et al. |
| RE35,746 E | 3/1998 | Lake |
| 5,731,661 A | 3/1998 | So et al. |
| 5,738,731 A | 4/1998 | Shindo et al. |
| 5,742,094 A | 4/1998 | Ting |
| 5,755,938 A | 5/1998 | Fukui et al. |
| 5,755,940 A | 5/1998 | Shindo |
| 5,757,126 A | 5/1998 | Harvey, III et al. |
| 5,762,768 A | 6/1998 | Goy et al. |
| 5,763,058 A | 6/1998 | Isen et al. |
| 5,771,562 A | 6/1998 | Harvey, III et al. |
| 5,776,278 A | 7/1998 | Tuttle et al. |
| 5,779,839 A | 7/1998 | Tuttle et al. |
| 5,790,489 A | 8/1998 | O'Connor |
| 5,792,550 A | 8/1998 | Phillips et al. |
| 5,805,223 A | 9/1998 | Shikakura et al. |
| 5,811,177 A | 9/1998 | Shi et al. |
| 5,814,195 A | 9/1998 | Lehan et al. |
| 5,830,330 A | 11/1998 | Lantsman |
| 5,831,262 A | 11/1998 | Greywall et al. |
| 5,834,137 A | 11/1998 | Zhang et al. |
| 5,841,931 A | 11/1998 | Foresi et al. |
| 5,842,118 A | 11/1998 | Wood, Jr. |
| 5,845,990 A | 12/1998 | Hymer |
| 5,847,865 A | 12/1998 | Gopinath et al. |
| 5,849,163 A | 12/1998 | Ichikawa et al. |
| 5,851,896 A | 12/1998 | Summerfelt |
| 5,853,830 A | 12/1998 | McCaulley et al. |
| 5,855,744 A | 1/1999 | Halsey et al. |
| 5,856,705 A | 1/1999 | Ting |
| 5,864,182 A | 1/1999 | Matsuzaki |
| 5,865,860 A | 2/1999 | Delnick |
| 5,870,273 A | 2/1999 | Sogabe et al. |
| 5,874,184 A | 2/1999 | Takeuchi et al. |
| 5,882,721 A | 3/1999 | Delnick |
| 5,882,946 A | 3/1999 | Otani |
| 5,889,383 A | 3/1999 | Teich |
| 5,895,731 A | 4/1999 | Clingempeel |
| 5,897,522 A | 4/1999 | Nitzan |
| 5,900,057 A | 5/1999 | Buchal et al. |
| 5,909,346 A | 6/1999 | Malhotra et al. |
| 5,916,704 A | 6/1999 | Lewin et al. |
| 5,923,964 A | 7/1999 | Li |
| 5,930,046 A | 7/1999 | Solberg et al. |
| 5,930,584 A | 7/1999 | Sun et al. |
| 5,942,089 A | 8/1999 | Sproul et al. |
| 5,948,215 A | 9/1999 | Lantsman et al. |
| 5,948,464 A | 9/1999 | Delnick |
| 5,948,562 A | 9/1999 | Fulcher et al. |
| 5,952,778 A | 9/1999 | Haskal et al. |
| 5,955,217 A | 9/1999 | Lerberghe |
| 5,961,672 A | 10/1999 | Skotheim et al. |
| 5,961,682 A | 10/1999 | Lee et al. |
| 5,966,491 A | 10/1999 | DiGiovanni |
| 5,970,393 A | 10/1999 | Khorrami et al. |
| 5,973,913 A | 10/1999 | McEwen et al. |
| 5,977,582 A | 11/1999 | Fleming et al. |
| 5,982,144 A | 11/1999 | Johnson et al. |
| 5,985,484 A | 11/1999 | Young et al. |
| 5,985,485 A | 11/1999 | Ovshinsky et al. |
| 6,000,603 A | 12/1999 | Koskenmaki et al. |
| 6,001,224 A | 12/1999 | Drummond et al. |
| 6,004,660 A | 12/1999 | Topolski et al. |
| 6,007,945 A | 12/1999 | Jacobs et al. |
| 6,013,949 A | 1/2000 | Tuttle |
| 6,019,284 A | 2/2000 | Freeman et al. |
| 6,023,610 A | 2/2000 | Wood, Jr. |
| 6,024,844 A | 2/2000 | Drummond et al. |
| 6,025,094 A | 2/2000 | Visco et al. |
| 6,028,990 A | 2/2000 | Shahani et al. |
| 6,030,421 A | 2/2000 | Gauthier et al. |
| 6,042,965 A | 3/2000 | Nestler et al. |
| 6,045,626 A | 4/2000 | Yano et al. |
| 6,045,652 A | 4/2000 | Tuttle et al. |
| 6,045,942 A | 4/2000 | Miekka et al. |
| 6,046,081 A | 4/2000 | Kuo |
| 6,048,372 A | 4/2000 | Mangahara et al. |
| 6,051,114 A | 4/2000 | Yao et al. |
| 6,051,296 A | 4/2000 | McCaulley et al. |
| 6,052,397 A | 4/2000 | Jeon et al. |
| 6,057,557 A | 5/2000 | Ichikawa |
| 6,058,233 A | 5/2000 | Dragone |
| 6,071,323 A | 6/2000 | Kawaguchi |
| 6,075,973 A | 6/2000 | Greeff et al. |
| 6,077,106 A | 6/2000 | Mish |
| 6,077,642 A | 6/2000 | Ogata et al. |
| 6,078,791 A | 6/2000 | Tuttle et al. |
| 6,080,508 A | 6/2000 | Dasgupta et al. |
| 6,080,643 A | 6/2000 | Noguchi et al. |
| 6,093,944 A | 7/2000 | VanDover |
| 6,094,292 A | 7/2000 | Goldner et al. |
| 6,096,569 A | 8/2000 | Matsuno et al. |
| 6,100,108 A | 8/2000 | Mizuno et al. |
| 6,106,933 A | 8/2000 | Nagai et al. |
| 6,110,531 A | 8/2000 | Paz De Araujo |
| 6,115,616 A | 9/2000 | Halperin et al. |
| 6,117,279 A | 9/2000 | Smolanoff et al. |
| 6,118,426 A | 9/2000 | Albert et al. |
| 6,120,890 A | 9/2000 | Chen et al. |
| 6,129,277 A | 10/2000 | Grant et al. |
| 6,133,670 A | 10/2000 | Rodgers et al. |
| 6,137,671 A | 10/2000 | Staffiere |
| 6,144,916 A | 11/2000 | Wood, Jr. et al. |
| 6,146,225 A | 11/2000 | Sheats et al. |
| 6,148,503 A | 11/2000 | Delnick et al. |
| 6,157,765 A | 12/2000 | Bruce et al. |
| 6,159,635 A | 12/2000 | Dasgupta et al. |
| 6,160,373 A | 12/2000 | Dunn et al. |
| 6,162,709 A | 12/2000 | Raoux et al. |
| 6,165,566 A | 12/2000 | Tropsha |
| 6,168,884 B1 | 1/2001 | Neudecker et al. |
| 6,169,474 B1 | 1/2001 | Greeff et al. |
| 6,175,075 B1 | 1/2001 | Shiotsuka et al. |
| 6,176,986 B1 | 1/2001 | Watanabe et al. |
| 6,181,283 B1 | 1/2001 | Johnson et al. |
| 6,192,222 B1 | 2/2001 | Greeff et al. |
| 6,197,167 B1 | 3/2001 | Tanaka |
| 6,198,217 B1 | 3/2001 | Suzuki et al. |
| 6,204,111 B1 | 3/2001 | Uemoto et al. |
| 6,210,544 B1 | 4/2001 | Sasaki |
| 6,210,832 B1 | 4/2001 | Visco et al. |
| 6,214,061 B1 | 4/2001 | Visco et al. |
| 6,214,660 B1 | 4/2001 | Uemoto et al. |
| 6,218,049 B1 | 4/2001 | Bates et al. |
| 6,220,516 B1 | 4/2001 | Tuttle et al. |
| 6,223,317 B1 | 4/2001 | Pax et al. |
| 6,228,532 B1 | 5/2001 | Tsuji et al. |
| 6,229,987 B1 | 5/2001 | Greeff et al. |
| 6,232,242 B1 | 5/2001 | Hata et al. |
| 6,235,432 B1 | 5/2001 | Kono et al. |
| 6,236,793 B1 | 5/2001 | Lawrence et al. |
| 6,242,129 B1 | 6/2001 | Johnson |
| 6,242,132 B1 | 6/2001 | Neudecker et al. |
| 6,248,291 B1 | 6/2001 | Nakagama et al. |
| 6,248,481 B1 | 6/2001 | Visco et al. |
| 6,248,640 B1 | 6/2001 | Nam |
| 6,249,222 B1 | 6/2001 | Gehlot |
| 6,252,564 B1 | 6/2001 | Albert et al. |
| 6,258,252 B1 | 7/2001 | Miyasaka et al. |
| 6,261,917 B1 | 7/2001 | Quek et al. |
| 6,264,709 B1 | 7/2001 | Yoon et al. |
| 6,265,652 B1 | 7/2001 | Kurata et al. |
| 6,268,695 B1 | 7/2001 | Affinito |
| 6,271,053 B1 | 8/2001 | Kondo |
| 6,271,793 B1 | 8/2001 | Brady et al. |
| 6,271,801 B2 | 8/2001 | Tuttle et al. |
| 6,280,585 B1 | 8/2001 | Obinata |
| 6,280,875 B1 | 8/2001 | Kwak et al. |
| 6,281,142 B1 | 8/2001 | Basceri |
| 6,284,406 B1 | 9/2001 | Xing et al. |
| 6,287,986 B1 | 9/2001 | Mihara |
| 6,289,209 B1 | 9/2001 | Wood, Jr. |
| 6,290,821 B1 | 9/2001 | McLeod |
| 6,290,822 B1 | 9/2001 | Fleming et al. |
| 6,291,098 B1 | 9/2001 | Shibuya et al. |
| 6,294,722 B1 | 9/2001 | Kondo et al. |
| 6,296,949 B1 | 10/2001 | Bergstresser et al. |

| | | | | | | |
|---|---|---|---|---|---|---|
| 6,296,967 B1 | 10/2001 | Jacobs et al. | | 6,503,661 B1 | 1/2003 | Park et al. |
| 6,296,971 B1 | 10/2001 | Hara | | 6,503,831 B1 | 1/2003 | Speakman |
| 6,300,215 B1 | 10/2001 | Shin | | 6,506,289 B2 | 1/2003 | Demaray et al. |
| 6,302,939 B1 | 10/2001 | Rabin | | 6,511,516 B1 | 1/2003 | Johnson et al. |
| 6,306,265 B1 | 10/2001 | Fu et al. | | 6,511,615 B1 | 1/2003 | Dawes et al. |
| 6,316,563 B2 | 11/2001 | Naijo et al. | | 6,517,968 B2 | 2/2003 | Johnson et al. |
| 6,323,416 B1 | 11/2001 | Komori et al. | | 6,522,067 B1 | 2/2003 | Graff et al. |
| 6,324,211 B1 | 11/2001 | Ovard et al. | | 6,524,466 B1 | 2/2003 | Bonaventura et al. |
| 6,325,294 B2 | 12/2001 | Tuttle et al. | | 6,524,750 B1 | 2/2003 | Mansuetto |
| 6,329,213 B1 | 12/2001 | Tuttle et al. | | 6,525,976 B1 | 2/2003 | Johnson |
| 6,339,236 B1 | 1/2002 | Tomii et al. | | 6,528,212 B1 | 3/2003 | Kusumoto et al. |
| 6,344,366 B1 | 2/2002 | Bates | | 6,533,907 B2 | 3/2003 | Demaray et al. |
| 6,344,419 B1 | 2/2002 | Forster et al. | | 6,537,428 B1 | 3/2003 | Xiong et al. |
| 6,344,795 B1 | 2/2002 | Gehlot | | 6,538,211 B2 | 3/2003 | St. Lawrence et al. |
| 6,350,353 B2 | 2/2002 | Gopalraja et al. | | 6,541,147 B1 | 4/2003 | McLean et al. |
| 6,351,630 B2 | 2/2002 | Wood, Jr. | | 6,548,912 B1 | 4/2003 | Graff et al. |
| 6,356,230 B1 | 3/2002 | Greef et al. | | 6,551,745 B2 | 4/2003 | Moutsios et al. |
| 6,356,694 B1 | 3/2002 | Weber | | 6,558,836 B1 | 5/2003 | Whitacre et al. |
| 6,356,764 B1 | 3/2002 | Ovard et al. | | 6,562,513 B1 | 5/2003 | Takeuchi et al. |
| 6,358,810 B1 | 3/2002 | Dornfest et al. | | 6,563,998 B1 | 5/2003 | Farah et al. |
| 6,360,954 B1 | 3/2002 | Barnardo | | 6,569,564 B1 | 5/2003 | Lane |
| 6,361,662 B1 | 3/2002 | Chiba et al. | | 6,570,325 B2 | 5/2003 | Graff et al. |
| 6,365,300 B1 | 4/2002 | Ota et al. | | 6,572,173 B2 | 6/2003 | Muller |
| 6,365,319 B1 | 4/2002 | Heath et al. | | 6,573,652 B1 | 6/2003 | Graff et al. |
| 6,368,275 B1 | 4/2002 | Sliwa et al. | | 6,576,546 B2 | 6/2003 | Gilbert et al. |
| 6,369,316 B1 | 4/2002 | Plessing et al. | | 6,579,728 B2 | 6/2003 | Grant et al. |
| 6,372,383 B1 | 4/2002 | Lee et al. | | 6,582,480 B2 | 6/2003 | Pasquier et al. |
| 6,372,386 B1 | 4/2002 | Cho et al. | | 6,582,481 B1 | 6/2003 | Erbil |
| 6,373,224 B1 | 4/2002 | Goto et al. | | 6,582,852 B1 | 6/2003 | Gao et al. |
| 6,375,780 B1 | 4/2002 | Tuttle et al. | | 6,589,299 B2 | 7/2003 | Missling et al. |
| 6,376,027 B1 | 4/2002 | Lee et al. | | 6,593,150 B2 | 7/2003 | Ramberg et al. |
| 6,379,835 B1 | 4/2002 | Kucherovsky et al. | | 6,599,662 B1 | 7/2003 | Chiang et al. |
| 6,379,842 B1 | 4/2002 | Mayer | | 6,600,905 B2 | 7/2003 | Greeff et al. |
| 6,380,477 B1 | 4/2002 | Curtin | | 6,602,338 B2 | 8/2003 | Chen et al. |
| 6,384,573 B1 | 5/2002 | Dunn | | 6,603,139 B1 | 8/2003 | Tessler et al. |
| 6,387,563 B1 | 5/2002 | Bates | | 6,603,391 B1 | 8/2003 | Greeff et al. |
| 6,391,166 B1 | 5/2002 | Wang | | 6,605,228 B1 | 8/2003 | Kawaguchi et al. |
| 6,392,565 B1 | 5/2002 | Brown | | 6,608,464 B1 | 8/2003 | Lew et al. |
| 6,394,598 B1 | 5/2002 | Kaiser | | 6,610,440 B1 | 8/2003 | LaFollette et al. |
| 6,395,430 B1 | 5/2002 | Cho et al. | | 6,615,614 B1 | 9/2003 | Makikawa et al. |
| 6,396,001 B1 | 5/2002 | Nakamura | | 6,616,035 B2 | 9/2003 | Ehrensvard et al. |
| 6,398,824 B1 | 6/2002 | Johnson | | 6,618,829 B2 | 9/2003 | Pax et al. |
| 6,399,241 B1 | 6/2002 | Hara et al. | | 6,620,545 B2 | 9/2003 | Goenka et al. |
| 6,402,039 B1 | 6/2002 | Freeman et al. | | 6,622,049 B2 | 9/2003 | Penner et al. |
| 6,402,795 B1 | 6/2002 | Chu et al. | | 6,632,563 B1 | 10/2003 | Krasnov et al. |
| 6,402,796 B1 | 6/2002 | Johnson | | 6,637,906 B2 | 10/2003 | Knoerzer et al. |
| 6,409,965 B1 | 6/2002 | Nagata et al. | | 6,637,916 B2 | 10/2003 | Mullner |
| 6,413,284 B1 | 7/2002 | Chu et al. | | 6,639,578 B1 | 10/2003 | Comiskey et al. |
| 6,413,285 B1 | 7/2002 | Chu et al. | | 6,645,675 B1 | 11/2003 | Munshi |
| 6,413,382 B1 | 7/2002 | Wang et al. | | 6,650,000 B2 | 11/2003 | Ballantine et al. |
| 6,413,645 B1 | 7/2002 | Graff et al. | | 6,650,942 B2 | 11/2003 | Howard et al. |
| 6,413,676 B1 | 7/2002 | Munshi | | 6,662,430 B2 | 12/2003 | Brady et al. |
| 6,414,626 B1 | 7/2002 | Greeff et al. | | 6,664,006 B1 | 12/2003 | Munshi |
| 6,416,598 B1 | 7/2002 | Sircar | | 6,673,484 B2 | 1/2004 | Matsuura |
| 6,420,961 B1 | 7/2002 | Bates et al. | | 6,673,716 B1 | 1/2004 | D'Couto et al. |
| 6,422,698 B2 | 7/2002 | Kaiser | | 6,674,159 B1 | 1/2004 | Peterson et al. |
| 6,423,106 B1 | 7/2002 | Bates | | 6,677,070 B2 | 1/2004 | Kearl |
| 6,423,776 B1 | 7/2002 | Akkapeddi et al. | | 6,683,244 B2 | 1/2004 | Fujimori et al. |
| 6,426,163 B1 | 7/2002 | Pasquier et al. | | 6,683,749 B2 | 1/2004 | Daby et al. |
| 6,432,577 B1 | 8/2002 | Shul et al. | | 6,686,096 B1 | 2/2004 | Chung |
| 6,432,584 B1 | 8/2002 | Visco et al. | | 6,693,840 B2 | 2/2004 | Shimada et al. |
| 6,433,380 B2 | 8/2002 | Shin | | 6,700,491 B2 | 3/2004 | Shafer |
| 6,433,465 B1 | 8/2002 | McKnight et al. | | 6,706,449 B2 | 3/2004 | Mikhaylik et al. |
| 6,436,156 B1 | 8/2002 | Wandeloski et al. | | 6,709,778 B2 | 3/2004 | Johnson |
| 6,437,231 B2 | 8/2002 | Kurata et al. | | 6,713,216 B2 | 3/2004 | Kugai et al. |
| 6,444,336 B1 | 9/2002 | Jia et al. | | 6,713,389 B2 | 3/2004 | Speakman |
| 6,444,355 B1 | 9/2002 | Murai et al. | | 6,713,987 B2 | 3/2004 | Krasnov et al. |
| 6,444,368 B1 | 9/2002 | Hikmet et al. | | 6,723,140 B2 | 4/2004 | Chu et al. |
| 6,444,750 B1 | 9/2002 | Touhsaent | | 6,730,423 B2 | 5/2004 | Einhart et al. |
| 6,459,418 B1 | 10/2002 | Comiskey et al. | | 6,733,924 B1 | 5/2004 | Skotheim et al. |
| 6,459,726 B1 | 10/2002 | Ovard et al. | | 6,737,197 B2 | 5/2004 | Chu et al. |
| 6,466,771 B2 | 10/2002 | Wood, Jr. | | 6,737,789 B2 | 5/2004 | Radziemski et al. |
| 6,475,668 B1 | 11/2002 | Hosokawa et al. | | 6,741,178 B1 | 5/2004 | Tuttle |
| 6,481,623 B1 | 11/2002 | Grant et al. | | 6,750,156 B2 | 6/2004 | Le et al. |
| 6,488,822 B1 | 12/2002 | Moslehi | | 6,752,842 B2 | 6/2004 | Luski et al. |
| 6,494,999 B1 | 12/2002 | Herrera et al. | | 6,753,108 B1 | 6/2004 | Hampden-Smith et al. |
| 6,495,283 B1 | 12/2002 | Yoon et al. | | 6,753,114 B2 | 6/2004 | Jacobs et al. |
| 6,497,598 B2 | 12/2002 | Affinito | | 6,760,520 B1 | 7/2004 | Medin et al. |
| 6,500,287 B1 | 12/2002 | Azens et al. | | 6,764,525 B1 | 7/2004 | Whitacre et al. |

| Patent | Date | Inventor |
|---|---|---|
| 6,768,246 B2 | 7/2004 | Pelrine et al. |
| 6,768,855 B1 | 7/2004 | Bakke et al. |
| 6,770,176 B2 | 8/2004 | Benson et al. |
| 6,773,848 B1 | 8/2004 | Nortoft et al. |
| 6,780,208 B2 | 8/2004 | Hopkins et al. |
| 6,797,428 B1 | 9/2004 | Skotheim et al. |
| 6,797,429 B1 | 9/2004 | Komatus |
| 6,805,998 B2 | 10/2004 | Jensen et al. |
| 6,805,999 B2 | 10/2004 | Lee et al. |
| 6,818,356 B1 | 11/2004 | Bates |
| 6,822,157 B2 | 11/2004 | Fujioka |
| 6,824,922 B2 | 11/2004 | Park et al. |
| 6,827,826 B2 | 12/2004 | Demaray et al. |
| 6,828,063 B2 | 12/2004 | Park et al. |
| 6,828,065 B2 | 12/2004 | Munshi |
| 6,830,846 B2 | 12/2004 | Kramlich et al. |
| 6,835,493 B2 | 12/2004 | Zhang et al. |
| 6,838,209 B2 | 1/2005 | Langan et al. |
| 6,846,765 B2 | 1/2005 | Imamura et al. |
| 6,852,139 B2 | 2/2005 | Zhang et al. |
| 6,855,441 B1 | 2/2005 | Levanon |
| 6,861,821 B2 | 3/2005 | Masumoto et al. |
| 6,863,699 B1 | 3/2005 | Krasnov et al. |
| 6,866,901 B2 | 3/2005 | Burrows et al. |
| 6,866,963 B2 | 3/2005 | Seung et al. |
| 6,869,722 B2 | 3/2005 | Kearl |
| 6,884,327 B2 | 4/2005 | Pan et al. |
| 6,886,240 B2 | 5/2005 | Zhang et al. |
| 6,896,992 B2 | 5/2005 | Kearl |
| 6,899,975 B2 | 5/2005 | Watanabe et al. |
| 6,902,660 B2 | 6/2005 | Lee et al. |
| 6,905,578 B1 | 6/2005 | Moslehi et al. |
| 6,906,436 B2 | 6/2005 | Jensen et al. |
| 6,911,667 B2 | 6/2005 | Pichler et al. |
| 6,916,679 B2 | 7/2005 | Snyder et al. |
| 6,921,464 B2 | 7/2005 | Krasnov et al. |
| 6,923,702 B2 | 8/2005 | Graff et al. |
| 6,924,164 B2 | 8/2005 | Jensen |
| 6,929,879 B2 | 8/2005 | Yamazaki |
| 6,936,377 B2 | 8/2005 | Wensley et al. |
| 6,936,381 B2 | 8/2005 | Skotheim et al. |
| 6,936,407 B2 | 8/2005 | Pichler |
| 6,949,389 B2 | 9/2005 | Pichler et al. |
| 6,955,986 B2 | 10/2005 | Li |
| 6,962,613 B2 | 11/2005 | Jenson |
| 6,962,671 B2 | 11/2005 | Martin et al. |
| 6,964,829 B2 | 11/2005 | Utsugi et al. |
| 6,982,132 B1 | 1/2006 | Goldner et al. |
| 6,986,965 B2 | 1/2006 | Jenson et al. |
| 6,994,933 B1 | 2/2006 | Bates |
| 7,022,431 B2 | 4/2006 | Shchori et al. |
| 7,033,406 B2 | 4/2006 | Weir et al. |
| 7,045,246 B2 | 5/2006 | Simburger et al. |
| 7,045,372 B2 | 5/2006 | Ballantine et al. |
| 7,056,620 B2 | 6/2006 | Krasnov et al. |
| 7,073,723 B2 | 7/2006 | Fürst et al. |
| 7,095,372 B2 | 8/2006 | Soler Castany et al. |
| 7,129,166 B2 | 10/2006 | Speakman |
| 7,131,189 B2 | 11/2006 | Jenson |
| 7,144,654 B2 | 12/2006 | LaFollette et al. |
| 7,144,655 B2 | 12/2006 | Jenson et al. |
| 7,157,187 B2 | 1/2007 | Jenson |
| 7,158,031 B2 | 1/2007 | Tuttle |
| 7,162,392 B2 | 1/2007 | Vock et al. |
| 7,183,693 B2 | 2/2007 | Brantner et al. |
| 7,186,479 B2 | 3/2007 | Krasnov et al. |
| 7,194,801 B2 | 3/2007 | Jenson et al. |
| 7,198,832 B2 | 4/2007 | Burrows et al. |
| 7,202,825 B2 | 4/2007 | Leizerovich et al. |
| 7,220,517 B2 | 5/2007 | Park et al. |
| 7,230,321 B2 | 6/2007 | McCain |
| 7,247,408 B2 | 7/2007 | Skotheim et al. |
| 7,253,494 B2 | 8/2007 | Mino et al. |
| 7,265,674 B2 | 9/2007 | Tuttle |
| 7,267,904 B2 | 9/2007 | Komatsu et al. |
| 7,267,906 B2 | 9/2007 | Mizuta et al. |
| 7,273,682 B2 | 9/2007 | Park et al. |
| 7,274,118 B2 | 9/2007 | Jenson et al. |
| 7,288,340 B2 | 10/2007 | Iwamoto |
| 7,316,867 B2 | 1/2008 | Park et al. |
| 7,323,634 B2 | 1/2008 | Speakman |
| 7,332,363 B2 | 2/2008 | Edwards |
| 7,335,441 B2 | 2/2008 | Luski et al. |
| RE40,137 E | 3/2008 | Tuttle et al. |
| 7,345,647 B1 | 3/2008 | Rodenbeck |
| 7,348,099 B2 | 3/2008 | Mukai et al. |
| 7,389,580 B2 | 6/2008 | Jenson et al. |
| 7,400,253 B2 | 7/2008 | Cohen |
| 7,410,730 B2 | 8/2008 | Bates |
| RE40,531 E | 10/2008 | Graff et al. |
| 7,468,221 B2 | 12/2008 | LaFollette et al. |
| 7,494,742 B2 | 2/2009 | Tarnowski et al. |
| 7,670,724 B1 | 3/2010 | Chan et al. |
| 2001/0027159 A1 | 10/2001 | Kaneyoshi |
| 2001/0031122 A1 | 10/2001 | Lackritz et al. |
| 2001/0032666 A1 | 10/2001 | Jenson et al. |
| 2001/0033952 A1 | 10/2001 | Jenson et al. |
| 2001/0034106 A1 | 10/2001 | Moise et al. |
| 2001/0041294 A1 | 11/2001 | Chu et al. |
| 2001/0041460 A1 | 11/2001 | Wiggins |
| 2001/0052752 A1 | 12/2001 | Ghosh et al. |
| 2001/0054437 A1 | 12/2001 | Komori et al. |
| 2001/0055719 A1 | 12/2001 | Akashi et al. |
| 2002/0000034 A1 | 1/2002 | Jenson |
| 2002/0001746 A1 | 1/2002 | Jenson |
| 2002/0001747 A1 | 1/2002 | Jenson |
| 2002/0004167 A1 | 1/2002 | Jenson et al. |
| 2002/0009630 A1 | 1/2002 | Gao et al. |
| 2002/0019296 A1 | 2/2002 | Freeman et al. |
| 2002/0028377 A1 | 3/2002 | Gross |
| 2002/0033330 A1 | 3/2002 | Demaray et al. |
| 2002/0037756 A1 | 3/2002 | Jacobs et al. |
| 2002/0066539 A1 | 6/2002 | Muller |
| 2002/0067615 A1 | 6/2002 | Muller |
| 2002/0076133 A1 | 6/2002 | Li et al. |
| 2002/0091929 A1 | 7/2002 | Ehrensvard |
| 2002/0093029 A1 | 7/2002 | Ballantine et al. |
| 2002/0106297 A1 | 8/2002 | Ueno et al. |
| 2002/0115252 A1 | 8/2002 | Haukka et al. |
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |
| 2003/0019326 A1 | 1/2003 | Han et al. |
| 2003/0022487 A1 | 1/2003 | Yoon et al. |
| 2003/0024994 A1 | 2/2003 | Ladyansky |
| 2003/0029493 A1 | 2/2003 | Plessing |
| 2003/0035906 A1 | 2/2003 | Memarian et al. |
| 2003/0036003 A1 | 2/2003 | Shchori et al. |
| 2003/0042131 A1 | 3/2003 | Johnson |
| 2003/0044665 A1 | 3/2003 | Rastegar et al. |
| 2003/0048635 A1 | 3/2003 | Knoerzer et al. |
| 2003/0063883 A1 | 4/2003 | Demaray et al. |
| 2003/0064292 A1 | 4/2003 | Neudecker et al. |
| 2003/0068559 A1 | 4/2003 | Armstrong et al. |
| 2003/0077914 A1 | 4/2003 | Le et al. |
| 2003/0079838 A1 | 5/2003 | Brcka |
| 2003/0091904 A1 | 5/2003 | Munshi |
| 2003/0095463 A1 | 5/2003 | Shimada et al. |
| 2003/0097858 A1 | 5/2003 | Strohhofer et al. |
| 2003/0109903 A1 | 6/2003 | Berrant et al. |
| 2003/0127319 A1 | 7/2003 | Demaray et al. |
| 2003/0134054 A1 | 7/2003 | Demaray et al. |
| 2003/0141186 A1 | 7/2003 | Wang et al. |
| 2003/0143853 A1 | 7/2003 | Celii et al. |
| 2003/0152829 A1 | 8/2003 | Zhang et al. |
| 2003/0162094 A1 | 8/2003 | Lee et al. |
| 2003/0173207 A1 | 9/2003 | Zhang et al. |
| 2003/0173208 A1 | 9/2003 | Pan et al. |
| 2003/0174391 A1 | 9/2003 | Pan et al. |
| 2003/0175142 A1 | 9/2003 | Milonopoulou et al. |
| 2003/0178623 A1 | 9/2003 | Nishiki et al. |
| 2003/0178637 A1 | 9/2003 | Chen et al. |
| 2003/0180610 A1 | 9/2003 | Felde et al. |

| | | | | | | |
|---|---|---|---|---|---|---|
| 2003/0185266 | A1 | 10/2003 | Henrichs | 2007/0125638 A1 | 6/2007 | Zhang et al. |
| 2003/0231106 | A1 | 12/2003 | Shafer | 2007/0141468 A1 | 6/2007 | Barker |
| 2003/0232248 | A1* | 12/2003 | Iwamoto et al. ............... 429/233 | 2007/0148065 A1 | 6/2007 | Weir et al. |
| 2004/0008587 | A1 | 1/2004 | Siebott et al. | 2007/0148553 A1 | 6/2007 | Weppner |
| 2004/0015735 | A1 | 1/2004 | Norman | 2007/0151661 A1 | 7/2007 | Mao et al. |
| 2004/0023106 | A1 | 2/2004 | Benson et al. | 2007/0164376 A1 | 7/2007 | Burrows et al. |
| 2004/0028875 | A1 | 2/2004 | Van Rijn et al. | 2007/0166612 A1 | 7/2007 | Krasnov et al. |
| 2004/0029311 | A1 | 2/2004 | Snyder et al. | 2007/0184345 A1 | 8/2007 | Neudecker et al. |
| 2004/0038050 | A1 | 2/2004 | Saijo et al. | 2007/0196682 A1 | 8/2007 | Visser et al. |
| 2004/0043557 | A1 | 3/2004 | Haukka et al. | 2007/0205513 A1 | 9/2007 | Brunnbauer et al. |
| 2004/0048157 | A1 | 3/2004 | Neudecker et al. | 2007/0210459 A1 | 9/2007 | Burrows et al. |
| 2004/0058237 | A1 | 3/2004 | Higuchi et al. | 2007/0224951 A1 | 9/2007 | Gilb et al. |
| 2004/0077161 | A1 | 4/2004 | Chen et al. | 2007/0264564 A1 | 11/2007 | Johnson et al. |
| 2004/0078662 | A1 | 4/2004 | Hamel et al. | 2007/0278653 A1 | 12/2007 | Brunnbauer et al. |
| 2004/0081415 | A1 | 4/2004 | Demaray et al. | 2007/0298326 A1 | 12/2007 | Angell et al. |
| 2004/0081860 | A1 | 4/2004 | Hundt et al. | 2008/0003496 A1 | 1/2008 | Neudecker et al. |
| 2004/0085002 | A1 | 5/2004 | Pearce | 2008/0008936 A1 | 1/2008 | Mizuta et al. |
| 2004/0101761 | A1 | 5/2004 | Park et al. | 2008/0014501 A1 | 1/2008 | Skotheim et al. |
| 2004/0105644 | A1 | 6/2004 | Dawes | 2008/0057397 A1 | 3/2008 | Skotheim et al. |
| 2004/0106038 | A1 | 6/2004 | Shimamura et al. | 2008/0213672 A1 | 9/2008 | Skotheim et al. |
| 2004/0106046 | A1 | 6/2004 | Inda | 2008/0233708 A1 | 9/2008 | Hisamatsu |
| 2004/0118700 | A1 | 6/2004 | Schierle-Arndt et al. | 2008/0254575 A1 | 10/2008 | Fuergut et al. |
| 2004/0126305 | A1 | 7/2004 | Chen et al. | 2008/0261107 A1 | 10/2008 | Snyder et al. |
| 2004/0151986 | A1 | 8/2004 | Park et al. | 2008/0286651 A1 | 11/2008 | Neudecker et al. |
| 2004/0161640 | A1 | 8/2004 | Salot | 2009/0181303 A1 | 7/2009 | Neudecker et al. |
| 2004/0175624 | A1 | 9/2004 | Luski et al. | 2010/0032001 A1 | 2/2010 | Brantner |
| 2004/0188239 | A1 | 9/2004 | Robison et al. | 2010/0086853 A1 | 4/2010 | Venkatachalam et al. |
| 2004/0209159 | A1 | 10/2004 | Lee et al. | | | |
| 2004/0214079 | A1 | 10/2004 | Simburger et al. | FOREIGN PATENT DOCUMENTS | | |
| 2004/0219434 | A1 | 11/2004 | Benson et al. | CN 1532984 | 9/2004 | |
| 2004/0245561 | A1 | 12/2004 | Sakashita et al. | DE 10 2005 014 427 A1 | 9/2006 | |
| 2004/0258984 | A1 | 12/2004 | Ariel et al. | DE 10 2006 054 309 A1 | 11/2006 | |
| 2004/0259305 | A1 | 12/2004 | Demaray et al. | DE 10 2008 016 665 A1 | 10/2008 | |
| 2005/0000794 | A1 | 1/2005 | Demaray et al. | DE 102007030604 | 1/2009 | |
| 2005/0006768 | A1 | 1/2005 | Narasimhan et al. | EP 0 510 883 | 10/1992 | |
| 2005/0048802 | A1 | 3/2005 | Zhang et al. | EP 0 639 655 | 2/1995 | |
| 2005/0070097 | A1 | 3/2005 | Barmak et al. | EP 0 652 308 | 5/1995 | |
| 2005/0072458 | A1 | 4/2005 | Goldstein | EP 0 820 088 | 1/1998 | |
| 2005/0079418 | A1* | 4/2005 | Kelley et al. ............. 429/231.95 | EP 1 068 899 | 1/2001 | |
| 2005/0095506 | A1 | 5/2005 | Klaassen | EP 0 867 985 | 2/2001 | |
| 2005/0105231 | A1 | 5/2005 | Hamel et al. | EP 1 092 689 | 4/2001 | |
| 2005/0110457 | A1 | 5/2005 | LaFollette et al. | EP 1 189 080 | 3/2002 | |
| 2005/0112461 | A1 | 5/2005 | Amine et al. | EP 1 713 024 A1 | 10/2006 | |
| 2005/0118464 | A1 | 6/2005 | Levanon | FR 2 861 218 | 4/2005 | |
| 2005/0130032 | A1 | 6/2005 | Krasnov et al. | JP 55009305 | 1/1980 | |
| 2005/0133361 | A1 | 6/2005 | Ding et al. | JP 56156675 | 12/1981 | |
| 2005/0141170 | A1 | 6/2005 | Honda et al. | JP 60068558 | 4/1985 | |
| 2005/0142447 | A1 | 6/2005 | Nakai et al. | JP 62267944 | 11/1987 | |
| 2005/0147877 | A1 | 7/2005 | Tarnowski et al. | JP 2-054764 | 2/1990 | |
| 2005/0158622 | A1 | 7/2005 | Mizuta et al. | JP 2230662 | 9/1990 | |
| 2005/0175891 | A1 | 8/2005 | Kameyama et al. | JP 4058456 | 2/1992 | |
| 2005/0176181 | A1 | 8/2005 | Burrows et al. | JP 4072049 | 3/1992 | |
| 2005/0181280 | A1 | 8/2005 | Ceder et al. | JP 6-010127 | 1/1994 | |
| 2005/0183946 | A1 | 8/2005 | Pan et al. | JP 6-100333 | 4/1994 | |
| 2005/0189139 | A1 | 9/2005 | Stole | JP 7-233469 | 5/1995 | |
| 2005/0208371 | A1 | 9/2005 | Kim et al. | JP 7-224379 | 8/1995 | |
| 2005/0239917 | A1 | 10/2005 | Nelson et al. | JP 11204088 | 7/1999 | |
| 2005/0266161 | A1 | 12/2005 | Medeiros et al. | JP 2000144435 | 5/2000 | |
| 2006/0019504 | A1 | 1/2006 | Taussig | JP 2000188099 | 7/2000 | |
| 2006/0021214 | A1 | 2/2006 | Jenson et al. | JP 2000268867 | 9/2000 | |
| 2006/0040177 | A1 | 2/2006 | Onodera et al. | JP 2001259494 | 9/2001 | |
| 2006/0046907 | A1 | 3/2006 | Rastegar et al. | JP 2001297764 | 10/2001 | |
| 2006/0054496 | A1 | 3/2006 | Zhang et al. | JP 2001328198 | 11/2001 | |
| 2006/0057283 | A1 | 3/2006 | Zhang et al. | JP 2002-344115 | 11/2002 | |
| 2006/0057304 | A1 | 3/2006 | Zhang et al. | JP 2003-17040 | 1/2003 | |
| 2006/0063074 | A1 | 3/2006 | Jenson et al. | JP 2003347045 | 12/2003 | |
| 2006/0071592 | A1 | 4/2006 | Narasimhan et al. | JP 2004071305 | 3/2004 | |
| 2006/0155545 | A1 | 7/2006 | Janye | JP 2004149849 | 5/2004 | |
| 2006/0201583 | A1 | 9/2006 | Michaluk et al. | JP 2004-158268 | 6/2004 | |
| 2006/0210779 | A1 | 9/2006 | Weir et al. | JP 2004273436 | 9/2004 | |
| 2006/0222954 | A1 | 10/2006 | Skotheim et al. | JP 2005-256101 | 9/2005 | |
| 2006/0234130 | A1 | 10/2006 | Inda | KR 20020007881 | 1/2002 | |
| 2006/0237543 | A1 | 10/2006 | Goto et al. | KR 20020017790 | 3/2002 | |
| 2006/0255435 | A1 | 11/2006 | Fuergut et al. | KR 20020029813 | 4/2002 | |
| 2007/0009802 | A1 | 1/2007 | Lee et al. | KR 20020038917 | 5/2002 | |
| 2007/0023275 | A1 | 2/2007 | Tanase et al. | KR 20030033913 | 5/2003 | |
| 2007/0053139 | A1 | 3/2007 | Zhang et al. | KR 20030042288 | 5/2003 | |
| 2007/0087230 | A1 | 4/2007 | Jenson et al. | KR 20030085252 | 11/2003 | |
| 2007/0091543 | A1 | 4/2007 | Gasse et al. | RU 2241281 | 11/2004 | |

| | | |
|---|---|---|
| WO | WO 9513629 | 5/1995 |
| WO | WO 9623085 | 8/1996 |
| WO | WO 9623217 | 8/1996 |
| WO | WO 9727344 | 7/1997 |
| WO | WO 9735044 | 9/1997 |
| WO | WO 9847196 | 10/1998 |
| WO | WO 9943034 | 8/1999 |
| WO | WO 9957770 | 11/1999 |
| WO | WO 0021898 | 4/2000 |
| WO | WO 0022742 | 4/2000 |
| WO | WO 0028607 | 5/2000 |
| WO | WO 0036665 | 6/2000 |
| WO | WO 0060682 | 10/2000 |
| WO | WO 0060689 | 10/2000 |
| WO | WO 0062365 | 10/2000 |
| WO | WO 0101507 | 1/2001 |
| WO | WO 01/17052 A2 | 3/2001 |
| WO | WO 0124303 | 4/2001 |
| WO | WO 01/33651 A1 | 5/2001 |
| WO | WO 01/39305 A1 | 5/2001 |
| WO | WO 01/73864 A2 | 10/2001 |
| WO | WO 01/73865 A2 | 10/2001 |
| WO | WO 01/73866 A2 | 10/2001 |
| WO | WO 01/73868 A2 | 10/2001 |
| WO | WO 01/73870 A2 | 10/2001 |
| WO | WO 01/73883 A2 | 10/2001 |
| WO | WO 01/73957 A2 | 10/2001 |
| WO | WO 0182390 | 11/2001 |
| WO | WO 0212932 | 2/2002 |
| WO | WO 0242516 | 5/2002 |
| WO | WO 0247187 A1 | 6/2002 |
| WO | WO 02701506 | 9/2002 |
| WO | WO 02101857 | 12/2002 |
| WO | WO 03003485 | 1/2003 |
| WO | WO 03005477 | 1/2003 |
| WO | WO 03026039 | 3/2003 |
| WO | WO 03036670 | 5/2003 |
| WO | WO 03069714 | 8/2003 |
| WO | WO 03080325 | 10/2003 |
| WO | WO 03083166 | 10/2003 |
| WO | WO 2004012283 | 2/2004 |
| WO | WO 2004021532 | 3/2004 |
| WO | WO 2004061887 | 7/2004 |
| WO | WO 2004077519 | 9/2004 |
| WO | WO 2004086550 | 10/2004 |
| WO | WO 2004106581 | 12/2004 |
| WO | WO 2004106582 | 12/2004 |
| WO | WO 2005008828 | 1/2005 |
| WO | WO 2005013394 | 2/2005 |
| WO | WO 2005038957 | 4/2005 |
| WO | WO 2005067645 | 7/2005 |
| WO | WO 2005085138 | 9/2005 |
| WO | WO 2005091405 | 9/2005 |
| WO | WO 2006063308 | 6/2006 |
| WO | WO 2007016781 | 2/2007 |
| WO | WO 2007027535 | 3/2007 |
| WO | WO 2007095604 A2 | 8/2007 |
| WO | WO 2008036731 A2 | 3/2008 |

OTHER PUBLICATIONS

Adachi et al., Thermal and Electrical Properties of Zirconium Nitride, 2005, Journal of Alloys and Compounds, 399, pp. 242-244.*

Pichon et al., Zirconium Nitrides Deposited by Dual Ion Beam Sputtering: Physical Properties and Growth Modelling, 1999, Applied Surface Science, 150, pp. 115-124.*

Wang et al., Characterization of Thin-Film Rechargeable Lithium Batteries with Lithium Cobalt Oxide Cathodes, *J. Electrochem. Soc.*, (1996) pp. 3203-3213, vol. 143, #10.

Bates et al., "Thin-Film Lithium Batteries" in New Trends in Electrochemical Technology: *Energy Storage Systems for Electronics*, 453-85 (T. Osaka & M. Datta eds., Gordon and Breach 2000).

PCT International Search Report for International Application No. PCT/US06/23143 filed Jun. 14, 2006, mailed Dec. 21, 2006.

Affinito, J.D. et al., "PML/oxide/PML barrier layer performance differences arising from use of UV or electron beam polymerization of the PML layers," Thin Solid Films 308-309: 19-25 (1997).

Affinito, J.D. et al., "Polymer-oxide transparent barrier layers," Society of Vacuum Coaters, 39$^{th}$ Ann. Technical Conference Proceedings, May 5-10, 1996, Philadelphia, PA, pp. 392-397 (1996).

Alder, T. et al., "High-efficiency fiber-to-chip coupling using low-loss tapered single-mode fiber," IEEE Photonics Tech. Lett. 12(8): 1016-1018 (2000).

Almeida, V.R. et al., "Nanotaper for compact mode conversion," Optics Letters 28(15): 1302-1304 (2003).

Anh et al., "Significant Suppression of Leakage Current in $(Ba,Sr)TiO_3$ Thin Films by Ni or Mn Doping," J. Appl. Phys.,92(5): 2651-2654 (Sep. 2002).

Asghari, M. And Dawnay, E., "ASOC™ —a manufacturing integrated optics technology," SPIE 3620: 252-262 (Jan. 1999).

Barbier, D. et al., "Amplifying four-wavelength combiner, based on erbium/ytterbium doped waveguide amplifiers and integrated splitters," IEEE Photonics Tech. Lett. 9:315-317 (1997).

Barbier, D., "Performances and potential applications of erbium doped planar waveguide amplifiers and lasers," Proc. OAA, Victoria, BC, Canada, pp. 58-63 (Jul. 21-23, 1997).

Beach R.J., "Theory and optimization of lens ducts," Applied Optics 35(12): 2005-2015 (1996).

Belkind, A. et al., "Pulsed-DC Reactive Sputtering of Dielectrics: Pulsing Parameter Effects," 43$^{rd}$ Annual Technical Conference Proceedings (2000).

Belkind, A. et al., "Using pulsed direct current power for reactive sputtering of $_{Al2O3}$," J. Vac. Sci. Technol. A 17(4): 1934-1940 (1999).

Bestwick, T., "ASOC™ silicon integrated optics technology," SPIE 3631: 182-190 (1999).

Borsella, E. et al., "Structural incorporation of silver in soda-lime glass by the ion-exchange process: a photoluminescence spectroscopy study," Applied Physics A 71: 125-132 (2000).

Byer, R.L., "Nonlinear optics and solid-state lasers: 2000," IEEE J. Selected Topics in Quantum Electronics 6(6): 911-930 (2000).

Campbell, S.A. et al., "Titanium dioxide (TiO2)-based gate insulators," IBM J. Res. Develop. 43(3): 383-392 (1999).

Chang, C.Y. And Sze, S.M. (eds.), in ULSI Technology, The McGraw-Hill Companies, Inc., Nyew York, Chapter 4, pp. 169-170 and 226-231 (1996).

Chen, G. et al., "Development of supported bifunctional electrocatalysts for unitized regenerative fuel cells," J. Electrochemical Society 149(8): A1092-A1099 (2002).

Choi, Y.B. et al., "Er-Al-codoped silicate planar light waveguide-type amplifier fabricated by radio-frequency sputtering," Optics Letters 25(4): 263-265 (2000).

Choy et al., "Eu-Doped Y2O3 Phosphor Films Produced by Electrostatic-Assisted Chemical Vapor Deposition," J. Mater. Res. 14(7): 3111-3114 (Jul. 1999).

Cocorullo, G. et al., "Amorphous silicon waveguides and light modulators for integrated photonics realized by low-temperature plasma-enhanced chemical-vapor deposition," Optics Lett. 21(24): 2002-2004 (1996).

Cooksey, K. et al., "Predicting permeability & Transmission rate for multilayer materials," Food Technology 53(9): 60-63 (1999).

Crowder, M.A. et al., "Low-temperature single-crystal Si TFT's fabricated on Si films processed via sequential lateral solidification," IEEE Electron Device Lett. 19(8): 306-308 (1998).

Delavaux, J-M. et al., "Integrated optics erbium ytterbium amplifier system in 10Gb/s fiber transmission experiment," 22$^{nd}$ European Conference on Optical Communication, Osla, 1.123-1.126 (1996).

Distributed Energy Resources: Fuel Cells, Projects, 4 pages http://www.eere.energy.gov/der/fuel_cells/projects.html (2003).

Dorey, R.A., "Low temperature micromoulding of functional ceramic devices," Grant summary for GR/S84156/01 for the UK Engineering and Physical Sciences Research Council, 2 pages (2004).

DuPont Teijin Films, Mylar 200 SBL 300, Product Information, 4 pages (2000).

Electrometals Technologies Limited, Financial Report for 2002, Corporate Directory, Chairman's review, Review of Operations, 10 pages. (2002).

E-Tek website: FAQ, Inside E-Tek, E-TEk News, Products; http://www.etek-inc.com/, 10 pages (2003).

Flytzanis, C. et al., "Nonlinear optics in composite materials," in Progress in Optics XXIX, Elsevier Science Publishers B.V., pp. 323-425 (1991).

Frazao, O. et al., "EDFA gain flattening using long-period fibre gratings based on the electric arc technique," Proc. London Comm. Symp. 2001, London, England, 3 pages (2001).

Abraham, K.M. et al., "Inorganic-organic composite solid polymer electrolytes," 147(4) J. Electrochem. Soc. 1251-56 (2000).

Abrahams, I., "$Li_6Zr_2O_7$, a new anion vacancy ccp based structure, determined by ab initio powder diffraction methods," 104 J. Solid State Chem. 397-403 (1993).

Amatucci, G. et al., "Lithium scandium phosphate-based electrolytes for solid state lithium rechargeable microbatteries," 60 Solid State Ionics 357-65 (1993).

Appetecchi, G.B. et al., "Composite polymer electrolytes with improved lithium metal electrode interfacial properties," 145(12) J. Electrochem. Soc. 4126-32 (1998).

Bates, J.B. et al., "Electrical properties of amorphous lithium electrolyte thin films," 53-56 Solid State Ionics 647-54 (1992).

Delmas, C. et al., "Des conducteurs ioniques pseudo-bidimensionnels $Li_8MO_6$ (M = Zr, Sn), $Li_7LO_6$ (L = Nb, Ta) et $Li_6In_2O_6$," 14 Mat. Res. Bull. 619-25 (1979).

Hu, Y-W. et al., "Ionic conductivity of lithium phosphate-doped lithium orthosilicate," 11 Mat. Res. Bull. 1227-30 (1976).

Neudecker, B. et al., "$Li_9SiAlO_8$: a lithium ion electrolyte for voltages above 5.4 V," 143(7) J. Electrochem. Soc. 2198-203 (1996).

Ohno, H. et al., "Electrical conductivity of a sintered pellet of octalithium zirconate," 132 J. Nucl. Mat. 222-30 (1985).

Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).

Yu, X. et al., "A stable thin-film lithium electrolyte: lithium phosphorus oxynitride," 144(2) J. Electrochem. Soc. 524-532 (1997).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a $Si/SiO_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. And Rusu, G.I., "On the structure of Titanium Oxide Thin Films," Andalele Stiintifice Ale Universitatii IASI Romania, pp. 201-208 (1999).

Marques, P.V.S. et al., "Planar Silica-on-Silicon Waveguide Lasers Based in Two Layers Core Devices," 10th European Conference on Integrated Optics, Session WeB2, pp. 79-82 (2001).

Meijerink, A. et al, "Luminescence of $Ag^+$ in Crystalline and Glassy $Srb_4O_7$," J. Physics Chem. Solids 54(8):901-906 (1993).

Mesnaoui, M. et al, "Spectroscopic properties of $Ag^+$ ions in phosphate glasses of $NaPO_3$-$AgPO_3$ system," Eur. J. Solid State Inorg. Chem. 29:1001-1013 (1992).

Mitomi, O. et al., "Design of a Single-Mode Tapered Waveguide for Low-Loss Chipto-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Ohkubo, H. et al., Polarization-Insensitive Arrayed-Waveguide Grating Using Pure $SiO_2$ Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 page (2004).

Ohtsuki, T., et al., "Gain Characteristics of high concentration $Er^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar $Er^{3+}$-doped aluminosilicate waveguide amplifier with more than 10 dB gain across C-band," Optical Society of America, 3 pages (2000).

Park et al., "Characteristics of Pt Thin Film on the Conducting Ceramics TiO and Ebonex ($Ti_4O_7$) as Electrode Materials," Thin Solid Films 258: 5-9 (1995).

Peters, D.P. et al., "Formation mechanism of silver nanocrystals made by ion irradiation of $Na^{30}$—$Ag^+$ ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton, Department of Electronics and Computer Science Research Journal, 7 pages. (1996).

Saha et al., "Large Reduction of Leakage Current by Graded-Layer La Doping in (Ba0.5,Sr0.5)TiO3 Thin Films," Appl. Phys. Lett. 79(1): 111-113 (Jul. 2001).

Sanyo Vacuum Industries Co., Ltd. Products Infor, $TiO_2$, (2003), 1 page, http://www.sanyovac.cojp/Englishweb/products?EtiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages. (1999).

Scholl, R., "Power Supplies for Pulsed Plasma Technologies: State-of-the-Art and Outlook," Advances Energy Industries, Inc. 1-8 (1999).

Scholl, R., "Power Systems for Reactive Sputtering of Insulating Films," Advances Energy Industries, Inc., 1-8 (Aug. 2001).

Second International Symposium of Polymer Surface Modification: Relevance to Adhesion, Preliminary Program, 13 pages. (1999).

Seventh International Conference on $TiO_2$ Photocatalysis: Fundamentals & Applications, Toronto, Ontario, Canada, Final Program, 7 pages. (Nov. 17-21, 2002).

Sewell, P. et al., "Rib Waveguide Spot-Size Transformers: Modal Properties," J Lightwave Technology 17(5):848-856 (1999).

Shaw, D.G. et al., "Use of Vapor Deposited Acrylate Coatings to Improve the Barrier Properties of Metallized Film," Society of Vacuum Coaters, 37th Annual Technical Conference Proceedings, pp. 240-244 (1994).

Shin, J.C. et al. "Dielectric and Electrical Properties of Sputter Grown (Ba,Se)$TiO_3$ Thin Films," J. Appl. Phys. 86(1):506-513 (1999).

Shmulovich, J. et al., "Recent progress in Erbium-doped waveguide amplifiers," Bell Laboratories, pp. 35-37 (1999).

Slooff, L.H. et al., "Optical properties of Erbium-doped organic polydentate cage complexes," J. Appl. Phys. 83(1):497-503 (1998).

Smith, R.E. et al., "Reduced Coupling Loss Using a Tapered-Rib Adiabatic-Following Fiber Coupler," IEEE Photonics Technology Lett. 8(8):1052-1054 (1996).

Snoeks, E. et al., "Cooperative upconversion in erbium-implanted soda-lime silicate glass optical waveguides," J. Opt. Soc. Am. B 12(8): 1468-1474 (1995).

Strohhofer, C. And Polman, A. "Energy transfer to $Er^{3+}$ in Ag ion-exchanged glass," FOM Institute for Atomic and Molecular Physics, 10 pages (2001).

Sugiyama, A. et al., "Gas Permeation Through the Pinholes of Plastic Film Laminated with Aluminum Foil," Vuoto XXVIII(1-2):51-54 (1999).

Tervonen, A. "Challenges and opportunities for integrated optics in optical networks," SPIE 3620:2-11 (1999).

Ting, C.Y. et al., "Study of planarized sputter-deposited $SiO_2$," J. Vac. Sci Technol, 15(3):1105-1112 (1978).

Tomaszewski, H. et al., "Yttria-stabilized zirconia thin films grown by reactive r.f. magnetron sputtering," Thin Solid Films 287: 104-109 (1996).

Fujii, M. et al., "1.54 μm photoluminescence of $Er^{3+}$ doped into $SiO_2$ films containing Si nanocrystals: evidence for energy transfer from Si nanocrystals for $Er^{3+}$," Appl. Phys. Lett. 71(9): 1198-1200 (1997).

Garcia, C. et al., "Size dependence of lifetime and absorption cross section of Si nanocrystals embedded in $SiO_2$," Appl. Phys. Lett. 82(10): 1595-1597 (2003).

Goossens, A. et al., "Sensitization of $TiO_2$ with p-type semiconductor polymers," Chem. Phys. Lett. 287: 148 (1998).

Greene, J.E. et al., "Morphological and electrical properties of rf sputtered $Y_2O_3$-doped $ZrO_2$ thin films," J. Vac. Sci. Tech. 13(1): 72-75 (1976).

Han, H.-S. et al., "Optical gain at 1.54 μm in Erbium-doped Silicon nanocluster sensitized waveguide," Appl. Phys. Lett. 79(27): 4568-4570 (2001).

Hayakawa, T. et al., "Enhanced fluorescence from $Eu^{3+}$ owing to surface plasma oscillation of silver particles in glass," J. Non-Crystalline Solids 259: 16-22 (1999).

Hayakawa, T. et al., "Field enhancement effect of small Ag particles on the fluorescence from $Eu^{3+}$-doped $SiO_2$ glass," Appl. Phys. Lett. 74(11): 1513-1515 (1999).

Hayfield, P.C.S., I Development of a New Material-Monolithic $Ti_4O_7$ Ebonix® Ceramic, Royal Society of Chemistry, Cambridge, Table of Contents, 4 pages (2002).

Hehlen, M.P. et al., "Spectroscopic properties of $Er^{3+}$- and $Yb^{3+}$-doped soda-lime silicate and aluminosilicate glasses," Physical Review B 56(15): 9302-9318 (1997).

Hehlen, M.P. et al., "Uniform upconversion in high-concentration $Er^{3+}$-doped soda lime silicate and aluminosilicate glasses," Optics Letters 22(11); 772-774 (1997).

Horst, F. et al., "Compact, tunable optical devices in silicon-oxynitride waveguide technology," Top. Meeting Integrated Photonics Res. '00, Quebec, Canada, p. IThF1, 3 pages (2000).

Howson, R.P., "The reactive sputtering of oxides and nitrides," Pure & Appl. Chem. 66(6): 1311-1318 (1994).

Hubner, J. And Guldberg-Kjaer, S., "Planar Er- and Yb-doped amplifiers and lasers," COM Technical University of Denmark, $10^{th}$ European Conf. on Integrated Optics, Session WeB2, pp. 71-74 (2001).

Hwang et al., "Characterization of sputter-deposited $LiMn_2O_4$ thin films for rechargeable microbatteries," 141(12) J. Electrochem. Soc. 3296-99 (1994).

Hwang, M-S. et al., "The effect of pulsed magnetron sputtering on the properties of iridium tin oxide thin films," Surface and Coatings Tech. 171: 29-33 (2003).

Im, J.S. and Sposili, R.S., "Crystalline Si films for integrated active-matrix liquid crystal displays," MRS Bulletin, pp. 39-48 (1996).

Im, J.S. et al., "Controlled super-lateral growth of Si-films for microstructural manipulation and optimization," Physica Status Solidi (A) 166(2): 603-617 (1998).

Im, J.S. et al., "Single-crystal Si films for thin-film transistor devices," Appl. Physics Lett. 70(25): 3434-3436 (1997).

Itoh, M. et al., "Large reduction of singlemode-fibre coupling loss in 1.5% Δ planar lightwave circuits using spot-size converters," Electronics Letters 38(2): 72-74 (2002).

Jackson, M.K. And Movassaghi, M., "An accurate compact EFA model," Eur. Conf. Optical Comm., Munich, Germany, 2 pages (2000).

Janssen, R. et al., "Photoinduced electron transfer from conjugated polymers onto nanocrystalline $TiO_2$," Synthet. Metal., 1 page (1999).

Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).

Jonsson, L.B. et al., "Frequency response in pulsed DC reactive sputtering processes," Thin Solid Films 365: 43-48 (2000).

Kato, K. and Inoue, Y., "Recent progress on PLC hybrid integration," SPIE 3631: 28-36 (1999).

Kato, K. and Tohmori, Y., "PLC hybrid integration technology and its application to photonic components," IEEE J. Selected Topics in Quantum Electronics 6(1): 4-13 (2000).

Kelly, P.J. and Arnell, R.D., "Control of the structure and properties of aluminum oxide coatings deposited by pulsed magnetron sputtering," J. Vac. Sci. Technol. A 17(3): 945-953 (1999).

Kelly, P.J. et al., "A novel technique for the deposition of aluminum-doped zinc oxide films," Thin Solid Films 426(1-2): 111-116 (2003).

Kelly, P.J. et al., "Reactive pulsed magnetron sputtering process for alumina films," J. Vac. Sci. Technol. A 18(6): 2890-2896 (2000).

Kik, P.G. And Polman, A., "Gain limiting processes in Er-doped Si nanocrystal waveguides in $SiO_2$," J. Appl. Phys. 91(1): 536-536 (2002).

Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).

Kim, D-W. et al. "Mixture Behavior and Microwave Dielectric Properties in the Low-fired $TiO_2$-CuO System," Jpn. J. Appl. Phys. 39:2696-2700 (2000).

Kim, H-K. et al., "Characteristics of rapid-thermal-annealed LiCoO2 cathode film for an all-solid-state thin film microbattery," J. Vac. Sci. Technol. A 22(4): 1182-1187 (2004).

Kim, J-Y. et al. "Frequency-dependent pulsed direct current magnetron sputtering of titanium oxide films," J. Vac. Sci. Technol. A 19(2):429-434 (2001).

Ladouceur, F. and Love, J.D., in: Silica-based Buried Channel Waveguides and Devices, Chapman & Hall, London, Table of Contents, 6 pages (1996).

Ladouceur, F. et al., "Effect of side wall roughness in buried channel waveguides," IEEE Proc. Optoelectron. 141(4):242-248 (1994).

Lamb, W. and Zeiler, R., Designing Non-Foil Containing Skins for Vacuum Insulation Panel (VIP) Application, Vuoto XXVIII(1-2):55-58 (1999).

Lamb, W.B., "Designing Nonfoil Containing Skins for VIP Applications," DuPont VIA Symposium Presentation, 35 Pages. (1999).

Lange, M.R. et al, "High Gain Ultra-Short Length Phosphate glass Erbium-Doped Fiber Amplifier Material," OSA Optical Fiber Communications (OFC), 3 Pages. (2002).

Laporta, P. et al, "Diode-pumped cw bulk Er: Yb: glass laser," Optics Letters 16(24):1952-1954 (1991).

Laurent-Lund, C. et al., "PECVD Grown Multiple Core Planar Waveguides with Extremely Low Interface Reflections and Losses," IEEE Photonics Tech. Lett. 10(10):1431-1433 (1998).

Triechel, O. and Kirchhoff, V., "The influences of pulsed magnetron sputtering on topography and crystallinity of $TiO_2$ films on glass," Surface and Coating Technology 123:268-272 (2000).

Tukamoto, H. And West, A.R., "Electronic Conductivity of $LiCoO_s$ and Its Enhancement by Magnesium Doping," J. Electrochem. Soc 144(9):3164-3168 (1997).

Van Dover, R.B., "Amorphous Lanthanide-Doped $TiO_X$ Dielectric Films," Appl. Phys. Lett. 74(20):3041-3043 (1999).

Viljanen, J. And Leppihalme, M., "Planner Optical Coupling Elements for Multimode Fibers with Two-Step Ion Migration Process," Applied Physics 24(1):61-63 (1981).

Villegas, M.A. et al., "Optical spectroscopy of a soda lime glass exchanged with silver," Phys. Chem. Glasses 37(6):248-253 (1996).

Von Rottkay, K. et al., "Influences of stoichiometry on electrochromic cerium-titanium oxide compounds," Presented at the $11^{th}$ Int'l Conference of Solid State Ionics, Honolulu, Hawaii, Nov. 19, 1997, Published in Solid State Ionics 113-115:425-430. (1998).

Westlinder, J. et al., "Simulations and Dielectric Characterization of Reactive dc Magnetron Cosputtered $(Ta_2O_5)_{1-x}(TiO_2)_X$ Thin Films," J Vac. Sci. Technol. B 20(3):855-861 (May/Jun. 2002).

Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).

Yanagawa, H. et al., "Index-and-Dimensional Taper and Its Application to Photonic Devices," J. Lightwave Technology 10(5):587-591 (1992).

Yoshikawa, K. et al., "Spray formed aluminum alloys for sputtering targets," Powder Metallurgy 43(3): 198-199 (2000).

Zhang, H. et al., "High Dielectric Strength, High k $TiO_2$ Films by Pulsed DC, Reactive Sputter Deposition," 5 pages (2001).

Starner, "Human-powered wearable computing" 35 (3 & 4) IBM Sys. J. 618-29 (1996).

Sarro, P., "Silicon Carbide as a New MEMS Technology," Sensors and Actuators 82, 210-218 (2000).

Hwang et al., "Characterization of Sputter-Deposited $LiMn_2O_4$ Thin Films for Rechargeable Microbatteries," 141(12) J. Electrochem. Soc. 3296-99 (1994).

Jones et al., 53-56 Solid State Ionics 628 (1992). A Thin Film Solid State Microbattery.

Mattox "Handbook of Physical Vapor Deposition (PVD) Processing, Society of Vacuum Coaters," Albuquerque, New Mexico 660f and 692ff, Noyes Publications (1998).

Non-Final Office Action dated Apr. 29, 2010, in U.S. Appl. No. 12/545,683.

Restriction Requirement dated Jun. 11, 2010, in U.S. Appl. No. 12/545,673.

Non-Final Office Action dated Jun. 24, 2010, in U.S. Appl. No. 12/545,662.

Response to Restriction Requirement dated Jun. 28, 2010, in U.S. Appl. No. 12/545,673.

Amendment and Response dated Jul. 29, 2010, in U.S. Appl. No. 12/545,683.

Final Office Action dated Aug. 19, 2010, in U.S. Appl. No. 12/545,683.

Non-Final Office Action dated Sep. 21, 2010, in U.S. Appl. No. 12/545,673.

Amendment and Response dated Sep. 24, 2010, in U.S. Appl. No. 12/545,662.

Final Office Action dated Nov. 12, 2010, in U.S. Appl. No. 12/545,662.

Response to Non-Final Office Action dated Dec. 17, 2010, in U.S. Appl. No. 12/545,673.

* cited by examiner

ELECTROCHEMICAL APPARATUS WITH BARRIER LAYER PROTECTED SUBSTRATE

RELATED APPLICATIONS

The present application is a continuation, and claims the benefit under 35 U.S.C. §120, of U.S. patent application Ser. No. 11/374,282, converted from U.S. provisional application Ser. No. 60/690,697, and filed on Jun. 15, 2005, entitled "Electrochemical Apparatus with Barrier Layer Protected Substrate," which is a continuation-in-part, and claims the benefit under 35 U.S.C. §120, of U.S. patent application Ser. No. 10/215,190, filed 9 Aug. 2002, entitled "Methods of and device for encapsulation and termination of electronic devices," now U.S. Pat. No. 6,916,679, issued 12 Jul. 2005, which are incorporated herein by reference.

FIELD OF THE INVEfNTION

The field of this invention is the apparatus, composition, and fabrication of lithium-based, solid-state, thin-film, secondary and primary batteries with improved capacity density, energy density, and power density, and preferably with flexible form factor and crystalline $LiCoO_2$, $LiNiO_2$, $LiMn_2O_4$ cathodes and derivative materials.

BACKGROUND OF THE INVENTION

The following passage describes the need and evolution of the subject technology in the field of thin film batteries.

Thin-film batteries may be fabricated by sequential vacuum depositions of layered battery components onto a given substrate in, for example, the following order: positive cathode current collector, positive cathode, negative anode current collector, electrolyte (separator), negative anode, and encapsulation. A lamination process may be used instead of a deposition process step (see, for example, U.S. Pat. No. 6,916,679 versus Wang et al., 143 J. Electrochem. Soc. 3203-13 (1996) or U.S. Pat. No. 5,561,004). Optionally, the two terminals of a thin-film battery may not simply comprise extensions of the positive and the negative current collectors, but may be additionally deposited terminal contacts that make electrical contact to the respective current collector. The positive cathode material may be insufficiently crystalline in the as-deposited state and, associated with this fact, may exhibit insufficient electrochemical properties (see, for example, Wang et al., supra). For this reason, the positive cathode may be crystallized during battery fabrication, which can be achieved in a post-deposition, high-temperature ("anneal") process (see, for example, Wang et al., supra or Bates et al., "Thin-Film Lithium Batteries" in *New Trends in Electrochemical Technology: Energy Storage Systems for Electronics* (T. Osaka & M. Datta eds., Gordon and Breach 2000)). The anneal process, which is applied immediately after the deposition of the positive cathode, may limit the choice of materials for the substrate and positive cathode current collector, thereby limiting, in turn, the capacity density, energy density, and power density of the thin-film battery, both per volume and weight. The affect of the substrate on those three quantities is, for example, explained in more detail below.

The intrinsic (i.e., without substrate and without encapsulation) volumetric and gravimetric densities of the capacity, the energy, and the power of lithium-based, solid-state, thin-film secondary (rechargeable) and primary (non-rechargeable) batteries are dominated by the volumetric and gravimetric densities of the capacity, the energy, and the power of the positive cathode material. Crystalline $LiCoO_2$ may be an example of a choice for the positive cathode material for both bulk (non thin-film) and thin-film batteries in terms of volumetric and gravimetric densities of the capacity, energy, power, and cyclability, in the case of secondary batteries, followed by derivatives of crystalline $LiMn_2O_4$, crystalline $LiMnO_2$, and crystalline $LiNiO_2$. Doping these main parent positive cathode materials with other transition metals (leading to derivatives) such as Sc, Ti, V, Cr, Mn, Fe, Co, Ni, Cu, Zn, Y, Zr, Nb, Mo, Ru, Rh, La, Hf, Ta, W, and Re and main group elements selected from the groups 1, 2, 13, 14, 15, 16 and 17 has been found to alter the properties of $LiCoO_2$, $LiMn_2O_4$, $LiMnO_2$, and $LiNiO_2$ with only little, if any, overall improvement.

According to U.S. Pat. No. 6,280,875, native titanium oxide on a Ti substrate is not inert enough to prevent adverse reactions from occurring between a Ti substrate and the battery components. This approach is severely restricted because the choice of substrate materials is limited to materials capable of forming a native surface oxide during the anneal step of the positive cathode. Apart from the present invention, metallic substrates including flexible foils that do not form a native surface oxide have not been employed successfully as thin-film battery substrates. Fabricating solid-state, thin-film secondary batteries by depositing, for example, high-temperature cathode materials directly onto metallic substrates, including flexible foils, other than Zr, and then annealing at high temperature, such as 700° C. in air for 1 hour, may result in the positive cathode and substrate materials reacting detrimentally to such an extent that the positive cathode is rendered useless. Pure Ti and Zr substrates are also relatively expensive.

Prior thin-film batteries do not disclose the use of an effective barrier layer between the substrate and the battery, and, therefore, provide potential negative observations. A need exists for the present invention such as, for example, an inventive barrier layer with sublayering attributes to overcome certain problems of prior thin film-batteries.

SUMMARY OF THE INVENTION

Various aspects and embodiments of the present invention, as described in more detail and by example below, address certain of the shortfalls of the background technology and emerging needs in the relevant industries.

The number of portable and on-board devices continues to increase rapidly while the physical dimensions available may decrease. The batteries that run these devices should keep pace with the demands of the devices served, potentially shrinking in size while, for example, delivering the same power. The thinner the batteries become, the more applications they may serve. One enabling power device is the thin-film, solid-state battery. When footprint is a limiting factor but capacity demand is still "high," it becomes important to pack and stack as many battery cells as possible into the space (footprint×height) available.

The batteries with the highest capacity, voltage, current, power, and rechargeable cycle life may, for example, take advantage of today's most powerful positive cathode materials, $LiCoO_2$, $LiMn_2O_4$, $LiMnO_2$, $LiNiO_2$, and derivatives thereof.

When vacuum deposited into thin-films, these materials may preferably include post-deposition annealing at high temperatures in order to improve their crystallinity, which is directly related to development of their full range of electrochemical properties. For an electrochemical apparatus, which employs such a thin-film battery, to become thinner, mainly the inert, electrochemically inactive part of the electrochemical apparatus should become thinner. One approach may be to build the battery on thin, metal foil substrates instead of thick, bulky ceramic ones. Metal foils are more flexible, thinner, and less expensive than ceramic substrates of the same footprint. Furthermore, they are easily available in much larger areas which translates into substantial cost savings in manufacturing.

However, $LiCoO_2$, like other positive cathode materials, is a strong oxidizer and possesses very mobile and thus reactive lithium ions. At the high annealing temperatures necessary to crystallize the as-deposited $LiCoO_2$ film, it reacts strongly with most metals and alloys as well as with many compounds, except for a limited number of inert ceramics. In other cases, unwanted species from the substrate may diffuse into $LiCoO_2$ during the high annealing temperatures and contaminate the positive cathode, thereby detrimentally altering its electrochemical properties. If the annealing temperature is kept sufficiently low to prevent reactions or unwanted diffusion, then the positive cathode may not fully crystallize, and capacity, energy, current, and power capability, and, in the case of rechargeable batteries, lifetime (number of cycles) may suffer.

High-power positive cathode materials may unfold their full, desirable, electrochemical properties in their crystalline state. Because these materials may, for example, be used in the present invention in thin-film form, they may typically be deposited by one of the common vapor phase thin-film deposition methods, such as sputter deposition (RF, pulse DC, or AC), electron-beam evaporation, chemical vapor deposition, plasma enhanced chemical vapor deposition, spray pyrolysis, ion-assisted beam evaporation, electron-beam directed vapor deposition, cathodic arc deposition, etc. These vapor phase methods may not produce positive cathode films in the as-deposited state that exhibit comparable electrochemical properties to positive cathodes that are fabricated from their respective, well-crystallized powders used in bulk batteries, such as cell phone and camcorder type batteries. Thus, the inferior electrochemical properties of such positive cathodes deposited by thin-film methods may be attributed to the lack of the necessary degree of crystallinity in the as-deposited state.

The degree of crystallinity, however, may be improved by a post-deposition anneal at higher temperatures, typically between 200° C.-900° C., better between 500° C.-850° C., and even better between 650° C.-800° C. Atmospheres used in these anneals are typically air, $O_2$, $N_2$, Ar, He, $H_2$, $H_2O$, $CO_2$, vacuum (P<1 Torr), or mixtures thereof. To achieve sufficient Zcrystallization and hence improved electrochemical properties, annealing times should preferably, for example, be extended when reducing the annealing temperature below about 650° C. The rate of crystallization may be exponentially activated by temperature, and thus decreases significantly with decreased annealing temperature. If the anneal temperature is lowered too much, then the applied energy from the annealing temperature may not be sufficient to overcome the thermal activation energy necessary for the crystallization process to occur at all. For example, a 900° C. anneal in air for 15 minutes may yield the same degree of crystallinity in magnetron-sputtered $LiCoO_2$ films as about a 1 hour anneal in air at 700° C. and as about a 12 hour anneal in air at 600° C. After annealing at 400° C. in air for 24 hours, the electrochemical quality of magnetron-sputter-deposited $LiCoO_2$ cathode films may remain poor and unimproved after 72 hours at that temperature. Thus, $LiCoO_2$ cathode films fabricated via vapor phase methods may be post-deposition annealed at 700° C. in air for about 30 minutes to 2 hours. This relatively high annealing temperature, however, may cause chemical compatibility issues, thereby rendering such an annealing step potentially undesirable in the fabrication process of thin-film batteries, as well as increasing the cost and reducing the fabrication throughput.

Post-deposition annealing conditions may severely limit the choice of substrate materials. Not only should substrates preferably be able to withstand the high annealing temperatures (T>500° C.), but they should also preferably be chemically inert against all battery film materials that are in contact with the substrate with regards to the anneal atmosphere, battery operation, and storage conditions applied. Likewise, the substrate should preferably not be a source of impurities that can diffuse into the battery film materials, neither during fabrication nor thereafter during operation and storage of the electrochemical apparatus. Such impurities may poison any of the battery film materials and diminish, severely impact or even destroy battery performance and lifetime. Certain choices of substrates may be, for example, restricted to chemically inert, high-temperature ceramics, for example, $Al_2O_3$, MgO, NaCl, SiC, and quartz glass. Two metals, Zr and Ti, for example, have demonstrated limited success as metallic substrates. The electrochemical apparatus of the present invention does not require the substrate to be Zr or Ti.

Although the above-mentioned ceramics have demonstrated their ability to withstand high temperatures without chemical reactions during the thin-film battery fabrication, there may be significant drawbacks to using them in cost-effective manufacturing of thin-film batteries. Ceramics tend to be at least 5 mil≈125 μm thick, brittle, inflexible (rigid), and relatively expensive per given footprint. Also, their sheer area size may be limited. The thinner the ceramic substrate becomes, the smaller the maximum area that can safely be handled without breaking the ceramics. For example, 12 inch×12 inch plates of ¼ inch thick $Al_2O_3$ are commercially readily available. However, thinned and polished $Al_2O_3$ ceramic substrates of 10 mil≈250 μm in thickness reduce the area that can be fabricated with reasonable yields to approximately 4 inch×4 inch boards. Thin (<20 mil or <500 μm), 4 inch×8 inch polished ceramic boards are available as custom orders, but not as a routinely stocked item at acceptable prices for large-scale manufacturing of thin-film batteries.

Due to their fragile character below about 100 μm, the use of ceramics as a substrate material for thin-film batteries may become impractical (despite the discussion in U.S. Pat. No. 6,632,563, discussing Mica substrates with thicknesses below 100 μm). One of the properties of Mica is its extremely brittle and fragile character, even at much greater thicknesses than 100 μm. Using ceramic substrates thicker than 100 μm, however, may cause the electrochemically inactive mass and volume of the substrate to make up more than 90% of the total battery weight and volume, which may be undesirable.

For all of these stated reasons, non-ceramic foils may be used as thin-film battery substrates. Under non-ceramic substrates, including, for example, metallic and polymeric substrates, silicon, and doped silicon may assume an intermediate position.

Non-ceramic foils, for example, may offer advantages as substrates for thin-film batteries, provided the substrate material is able to withstand the processing conditions, including temperature and, for example, contacting certain potentially reactive battery layers. Relative to ceramic substrates of a given footprint, non-ceramic foil substrates can be thinner, more flexible, less expensive, readily available in larger sizes, and may decrease the overall thickness of the battery or electrochemical apparatus while reducing the electrochemically inactive mass and volume of the entire battery, which in turn may increase the battery's capacity density, energy density, and power density. Non-ceramic foils are, for example, available in rolls of 0.5-5 mil≈12-125 μm thickness, up to several meters wide, and up to many meters in length. Substrates that come in long rolls present the possibility of roll-to-roll fabrication at much lower costs than the typical batch mode fabrication processes currently in practice. Fabricating a thin-film battery on a thinner, more flexible substrate without compromising battery performance, compared to a thin-film battery fabricated on a thick rigid substrate, plays a role in enabling certain applications for the thin-film battery technology.

Reducing the electrochemically inactive mass and volume of the battery by making the substrate significantly thinner may increase the capacity density, energy density, and power density of the battery per mass and volume. For example, a given application may allot a volume for the battery of 2 cm×2 cm×0.1 cm. Currently, there are no traditional button cell or jelly roll (spiral wound or prismatic) batteries available that can physically fit in that volume. In contrast, a thin-film, solid-state battery may fit that volume because even when fabricated onto a ceramic substrate of 0.05 cm, the entire battery, including an optionally protective encapsulation or encasing (see definitions further below), is much thinner than 0.1 cm. Fabricating a thin-film battery on a 2 mil≈50 μm=0.005 cm thick foil substrate with the same footprint and same battery capacity may further allow the stacking of a maximum of 20 batteries into this volume. The actual number of batteries is determined, for example, by the thickness of each battery cell including its substrate and its optional, protective encapsulation or encasing. Using a thin non-ceramic foil substrate instead of a thick ceramic one may cause a manifold increase in capacity density, energy density, and power density.

Thin-film batteries may, for example, be fabricated by sequentially depositing the individual battery component layers on top of each other. As mentioned, examples of the best positive cathodes include (but are not limited to) $LiCoO_2$, $LiMn_2O_4$, $LiMnO_2$, $LiNiO_2$, and derivates thereof. The electrochemical apparatus of the present invention does not require a $Li_xV_2O_y$ cathode where $0<x\leq100$ and $0<y\leq5$. The positive cathodes may include a post-deposition anneal at temperatures well above 500° C. in order to crystallize completely, thereby achieving their full electrochemical properties. Because certain known solid-state lithium electrolytes may react destructively when in contact with the high-temperature positive cathodes at these high temperatures, the positive cathode can be deposited and annealed before depositing the electrolyte layer.

Positive cathode materials may generally be considered poor semi-conductors, at least over some range of their state of charge during battery operation. To get maximum power out of the battery and into the external circuit, the positive cathode layer may be deposited onto a metallic back contact, the cathode current collector (CCC) layer. This CCC also should undergo the high-temperature cathode anneal and not react with the positive cathode at the same time. For this reason, a noble metal such as, for example, gold or an alloy thereof, or equivalent may be used.

The facts outlined above suggest that for improvement in the performance of batteries, positive cathode materials may be deposited as the second layer of batteries immediately after the deposition of the CCC. The post-deposition anneal of the positive cathode layer may, therefore, accomplish its crystallization before the next fabrication step, the electrolyte deposition. Due to the close proximity of the high-temperature cathode material to the substrate, which may only be separated from each other by a relatively thin CCC (0.1-1 μm), strong detrimental interdiffusion and reaction of the positive cathode and the substrate have been observed when not using ceramic substrates, but instead high-temperature stable metallic foils, such as stainless steel. This interdiffusion may, for example, not be blocked out by the metallic CCC itself for three main reasons. First, the CCC film is relatively thin (0.1-1 μm), thereby representing only a thin pseudo-diffusion barrier. Second, the CCC exhibits a crystalline grain structure. Grain boundaries may be the usual locations for ionic and electronic diffusion and conduction so that the CCC should be viewed as inherently permeable for ions and electrons from both the adjacent positive cathode layer and the adjacent metallic foil substrate. Thus, during the cathode anneal step, the foil substrate material and cathode film material may interdiffuse. Third, the metallic CCC alloys directly into the metallic foil substrate affecting its current collecting properties.

The thickness of the CCC is determined, for example, by cost, mass, volume, and adhesion, which all may become technologically impractical when fabricating the CCC thicker than about 2 μm, especially when using a costly noble metal such as gold. Potentially, significantly thicker CCC films of about more than 5 μm may avoid interdiffusion depending, for example, on temperature and pertinent dwell time of the annealing step. However, the use of such a thick CCC may, for example, incorporate increased materials costs and potentially unreliable adhesion.

Replacing ceramic substrates with metal foil substrates introduces tremendous opportunities for enabling new technologies using thin-film batteries, in addition to reducing fabrication costs over thin-film batteries fabricated onto ceramic substrates. In contrast to ceramic plates, metallic foils are commercially readily available in thicknesses of less than 75 μm with some materials available as thin as 4 μm. These foils are much more flexible than their ceramic counterparts, contribute less structural, inactive mass to the battery, and, most importantly, substantially reduce the overall thickness of the complete thin-film battery device. It should be emphasized that minimizing the overall thickness and increasing the flexibility of the battery is critically important for most thin-film battery applications. Thinner thin-film battery devices are able to fit into new, physically smaller applications. What was once not practical with a button-cell battery now becomes possible with a thin-film battery (i.e., smart cards, etc.). The added flexibility of a foil substrate further, for example, allows conformation to new, non-planar shapes.

Furthermore, thin metal foils may generally cost less than ceramics per footprint area and come in much larger sizes such as rolls. With the availability of flexible, large area substrates, the potential exists for developing roll-to-roll fabrication methods, thereby further reducing production costs.

New applications may, for example, be enabled with a thin-film battery that provides uncompromised or improved performance relative to state-of-the-art thin-film battery that is fabricated on ceramic substrate. In this regard, the present invention may include the deposition of an interdiffusion barrier layer onto metallic foil substrates wherein the barrier layer chemically separates the battery (i.e., electrochemically active cell) part from the substrate part of the electrochemical apparatus during high and low post-deposition anneal temperatures, for example, in the range between 100° C. and up to the melting point of the substrate, aswell as all operation and storage conditions of the electrochemical apparatus while not becoming a source of impurities itself. An embodiment of this aspect of the present invention is shown, for example, in FIG. 1.

The barrier may, for example, prevent diffusion of any contaminants entering the battery from the substrate as well as, for example, block ions from escaping the battery and diffusing into the substrate during both battery fabrication and during battery operating and storage conditions. Such a barrier layer may not, for example, exhibit a grain structure at any time. That is, it may be amorphous or glassy in its as-deposited state and remain as such throughout the entire annealing and battery fabrication process as well as during battery operation and storage conditions. The absence of a grain structure in the barrier layer may avoid the detrimental grain boundary diffusion or conduction of ions and electrons. As mentioned earlier, grain boundaries are the pathways along which impurities and contaminants may travel. When certain of these conditions are met, the thin-film batteries fabricated on metallic substrates, flexible and thin or less flexible and thicker, may exhibit properties comparable to, for example, thin-film batteries fabricated on chemically inert yet thick, heavier, rigid, and expensive ceramic substrates.

Certain potentially suitable materials for the diffusion barrier layer may be poor ion conducting materials, for example, such as borides, carbides, diamond, diamond-like carbon, silicides, nitrides, phosphides, oxides, fluorides, chlorides, bromides, iodides, and any multinary compounds thereof. Of those compounds, electrically insulating materials may further prevent possible reactions between the substrate and the battery layers to occur, because for example, if these chemical reactions may include the diffusion of ions and electrons, then blocking electrons is one means of blocking these example chemical reactions. However, electrically conducting materials may be used as well, for example, ZrN, as long as they are, for example, not conducting any of the ions of the substrate or battery layer materials. In some cases metals, alloys, and/or semi-metals may serve as a sufficient barrier layer depending on the anneal temperatures applied during the battery fabrication process and substrate material used. The diffusion barrier layer may, for example, be single or multi-phase, crystalline, glassy, amorphous or any mixture thereof, although glassy and amorphous structures are usually used due to their lack of grain boundaries that would otherwise serve as locations for increased, but unwanted, ion and electron conduction.

Because certain materials block out the conduction of a wide variety of ions, they may also be used in certain non-lithium containing thin-film batteries, such as batteries whose electro-active ions are, for example, beryllium, sodium, magnesium, potassium, calcium, boron, and aluminum. The thickness of the diffusion barrier layer may, for example, range from 0.01 μm to 1 mm.

Although the barrier and/or sub-barrier layer concepts and principles for thin-film batteries of the present invention have initially been developed for metallic substrates, the same barrier layer materials may, for example, be deposited onto polymeric substrates and doped and undoped silicon substrates whose associated thin-film battery applications are also of commercial interest. The post-deposition anneal temperatures may, for example, be lower than the melting point of the silicon or polymeric substrates used, irrespective of the barrier layer applied in order to, for example, avoid melting of the substrate.

An embodiment of the present invention relates, for example, to a method for fabricating flexible, high-capacity, solid-state, thin-film batteries on thin foil substrates, for example, metallic substrates. For the purpose of the present invention, an electrochemical apparatus is defined as an apparatus comprising at least one electrochemical active cell, for example a thin-film battery, a pertinent substrate, for example a metallic substrate, and a suitable diffusion barrier layer, which in turn can be composed of a multitude of barrier sublayers, between the electrochemically active cell and the substrate (see FIG. 1). In addition, the electrochemical apparatus may include a protective encapsulation or protective encasing, as will be discussed further below.

The success of certain embodiments of the present invention is attributed to the utilization of an appropriate, chemically inert diffusion barrier layer and sublayers between the substrate and the thin-film battery which may effectively separate these two parts of the electrochemical apparatus. The diffusion barrier layer can, preferably, be able to withstand the high annealing temperatures that may be applied to the thin-film battery part during its fabrication onto the substrate, be chemically inert to both the substrate and the thin-film battery part, not be a source of impurities, at least not for the thin-film battery part, and keep the thin-film battery part chemically separated from the substrate under the operating and storage conditions of the electrochemical apparatus after its completed fabrication. Additionally, the barrier layer should for example, preferably, prevent diffusion of any contaminants attempting to enter the thin-film battery part from the substrate, as well as block Li ions from escaping the thin-film battery part and diffusing into the substrate during both battery fabrication and all battery operating and storage conditions. As an added benefit, the barrier layer may also protect the substrate during processing from the atmosphere applied during the post-deposition anneal and from any of the thin-film battery components already present at that fabrication stage of the unfinished electrochemical apparatus.

Fabricating the diffusion barrier of a multitude of barrier sublayers allows the fine-tuning of the physical (mechanical (in particular, pinhole-freeness, flexibility, and adhesion), electrical, magnetic, acoustic, thermal, and optical) and chemical properties of the diffusion barrier layer and thus improves the performance and reliability of the electrochemical apparatus over one that is fabricated with a diffusion barrier layer that might include only one single layer of a given material, such as $Si_3N_4$, for example, or $Ti_{84}B_{16}$, for example, which thermodynamically is a two-phase system ("composite") of almost equal amounts of $TiB_2$ and beta-B (see *Binary Alloy Phase Diagrams*, $2^{nd}$ Ed. (T. B. Massalski, H. Okamoto, P. R. Subramanian, and L. Kacprzak eds., ASM International 1990), incorporated herein by reference), or a $TiO_2$—$Ba_{0.5}Sr_{0.5}TiO_3$ composite material, such as described in U.S. Pat. No. 6,444,336 (incorporated herein by reference). In the simplest form, a diffusion barrier layer of the present invention may include a thin (~1000 Å) barrier sublayer with additional adhesion improving properties, such as Ti, and one (1 μm) thicker barrier sublayer, such as $Si_3N_4$.

Barrier sublayer materials for a diffusion barrier layer of the present invention may include, but are not limited to, thin-films of amorphous $Si_3N_4$, SiC, ZrN, and TiC, among others. These are exemplary of compounds which may effectively serve as barriers due to their ion blocking properties, amorphous structure, and chemical inertness to the substrate, as well as to the battery part of the electrochemical apparatus. The pre-eminent characteristics of these barrier layer chemistries are their inherent ability to retain their amorphous, as-deposited state and their diffusion blocking properties up to substantially high temperatures, for example 700° C., and for longer periods at those temperatures, for example 2 hours, during the preferred $LiCoO_2$ crystallization post-deposition anneal process. As a result, thin-film batteries fabricated on metal foils with such barrier layers retain good electrochemical properties for equivalently configured thin-film batteries that are fabricated onto ceramic substrates, but with the added benefits of being flexible, much thinner, and cheaper.

An embodiment of the present invention further, for example, relates to fabricating an appropriate barrier layer onto substrates in conjunction with a subsequent thin-film battery fabrication where the barrier layer may chemically separate the substrate from the battery part during the battery fabrication as well as during battery operation and storage conditions thereafter. Polymeric substrates and doped and undoped silicon substrates may be used in addition to metallic substrates.

An object of an embodiment of the present invention is to provide, for example, an electrochemical apparatus with a metallic, polymeric, or doped or undoped silicon substrate, with a battery (electrochemically active cell) on only one side of the substrate.

Another object of an embodiment of the present invention is to provide, for example, an electrochemical apparatus with a metallic, polymeric, or doped or undoped silicon substrate, with two batteries (two electrochemically active cells), one on each side of the substrate.

Another object of an embodiment of the present invention is to provide, for example, a method of fabricating an electrochemical apparatus with a metallic, polymeric, or doped or undoped silicon substrate, with a battery (electrochemically active cell) on only one side of the substrate.

A further object of an embodiment of the present invention is to provide, for example, a method of fabricating an electrochemical apparatus with a metallic, polymeric, or doped or undoped silicon substrate, with two batteries (two electrochemically active cells), one on each side of the substrate.

DETAILED DESCRIPTION OF THE INVENTION

Figure 1:
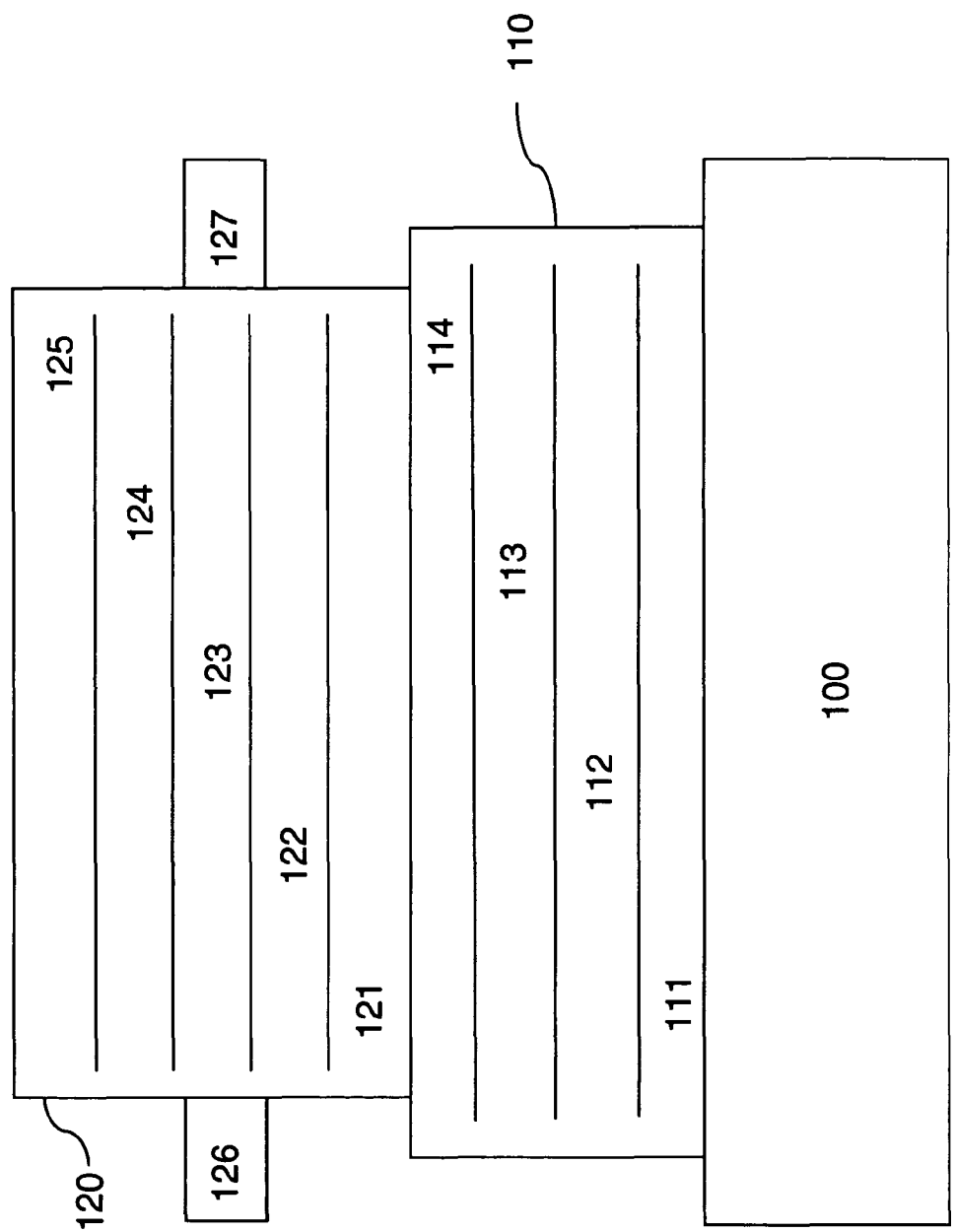
FIG. 1 illustrates an exemplary schematic of an embodiment of a chemical separation of the substrate part from the electrochemically active cell part of the electrochemical apparatus via a barrier layer, which includes a multitude of barrier sublayers.

It should be understood that this invention is not limited to the particular methodology, protocols, etc., described herein and, as such, may vary. The terminology used herein is for the purpose of describing particular embodiments only, and is not intended to limit the scope of the present invention, which is defined solely by the claims.

As used herein and in the claims, the singular forms "a," "an," and "the" include the plural reference unless the context clearly indicates otherwise.

All patents and other publications identified are incorporated herein by reference in their entirety for the purpose of describing and disclosing, for example, the methodologies, apparatuses, and compositions described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason.

Unless defined otherwise, all technical terms used herein have the same meaning as those commonly understood to one of ordinary skill in the art to which this invention pertains. Although any known methods, devices, and materials may be used in the practice or testing of the invention, certain exemplary preferred methods, devices, and materials in this regard are described here.

Thin-film batteries may, for example, be fabricated in batch mode by depositing the individual battery component layers sequentially. Once a substrate material has been selected, it may be prepared by cleaning and, if desired, other pre-treatments. The barrier layer composed of its barrier sublayers, which may be 0.5-5 μm thick in total, is the key to successful fabrication of thin-film batteries on metallic and polymeric foils as well as silicon. The barrier layer should be able to withstand the annealing temperatures for the positive cathode film together with the cathode current collector, remain chemically inert, and not be a source of impurities.

Additionally, the barrier layer should prevent diffusion of any contaminants entering the positive cathode from the substrate as well as block all ions and atoms from the positive cathode and the cathode current collector from diffusing into the substrate during both the battery fabrication and all battery operating and storage conditions. The barrier layer may be deposited onto the clean substrate and typically coats the substrate everywhere with a uniform, defect-free film. The ensuing battery layers may then be deposited sequentially in batch fashion using shadow masks to demarcate the boundaries of each layer of the thin-film battery. The barrier layer may be designed and fabricated to isolate the effects of grain boundary diffusion, thereby eliminating reactions between the subsequently deposited positive cathode, such as $LiCoO_2$, with its underlying cathode current collector and the substrate, such as for example a gold cathode current collector and a flexible stainless steel foil substrate, respectively. The following presents exemplary ways of depositing embodiments of barrier layers, including their barrier sublayers, onto substrates onto which thin-film batteries are fabricated.

1. Substrate Selection and Preparation

First, the substrate material may be chosen. The thin-film batteries may be fabricated on a variety of metallic foils and sheets with varied surface finishes. A thin foil of stainless steel may be used for the substrate. However, other, more expensive and thicker materials or lower melting materials work as well, including, but not limited to, Ti and Ti-alloys, Al and Al-alloys, Cu and Cu-alloys, and Ni and Ni-alloys, for example. Additionally, the preferred physical properties of the foil, such as type of steel alloy, surface roughness, homogeneity, and purity, are left to the user to determine the optimum manufacturing parameters for the particular device. The electrochemical apparatus of the present invention does not require the substrate to be Al coated with metals or semi-metals that include V, Mn, Mg, Fe, Ge, Cr, Ni, Zn, and Co. Moreover, the electrochemical apparatus of the present invention does not require the substrate to be a pure polymide.

Once the stainless steel foil material, for example, has been selected, it is generally cleaned in order to remove oils, particulates, and other surface contaminants that may otherwise impede chemical or mechanical adhesion of the barrier layer to the substrate. Any cleaning procedure, for example, any suitable wet chemical cleaning or plasma cleaning process that provides a sufficiently clean surface, may be used in this regard. Optionally, the cleaned foil substrate may be further pre-treated, if so desired. For example, to relieve the intrinsic stress of metallic foils, an anneal step at high temperatures (e.g., 500° C.) prior to depositing the barrier layer may be employed, provided that the anneal temperature remains below the melting point of the metallic foil.

Although substantially independent of any foil material and its thickness, several annealing strategies may further reduce or accommodate thermal and mechanical stresses on a film-by-film basis. For example, pre-annealing a cleaned foil may be performed as described above to condition an uncoated metal foil. Additionally, other annealing steps may include, for example, a post-deposition barrier layer anneal, a post-deposition cathode current collector layer anneal, or any combination of post-deposition layer anneals prior to the cathode crystallization anneal. Such steps may be preceded or followed by additional plasma treatments (see, for example, D. M. Mattox, *Handbook of Physical Vapor Deposition (PVD) Processing, Society of Vacuum Coaters*, Albuquerque, N. Mex. 660ff and 692ff (Noyes Publications 1998)). Analogously, silicon and polymeric substrates may be prepared.

2. Barrier Layer Deposition

Depositing a barrier layer onto substrates may be performed in conjunction with thin-film battery fabrication that, for example, chemically separates the substrate from the battery part during the battery fabrication as well as, for example, during battery operation and storage conditions thereafter.

In general, chemical reactions between potential reactants may be prevented when either their ions or their electrons are confined to each of the reactants' space or blocked at the reactants' interface so that preferably no interdiffusion of these species between the potential reactants is possible. In addition to the mere diffusion blocking properties, the materials selected for the barrier layer and its constituting barrier sublayers should take into account that the barrier layer (a) shall be able to withstand the annealing temperatures for the positive cathode film together with the cathode current collector, (b) remain chemically inert, and (c) not be a source of impurities.

An electrically conductive material, such as ZrN, for example, that possesses adequate diffusion blocking properties relative to ions so as to chemically separate the substrate from the battery part in the electrochemical apparatus, may be deposited. In this case, the conductive barrier sublayer may also serve as a current collector. Because ZrN is also stable in contact with negative anode materials, in particular metallic lithium, it may be used as the cathode current collector and/or the anode current collector.

Although constructing a barrier layer with just one single layer of a specific material is feasible in principle, for example, electrically insulating and metal ion blocking $Si_3N_4$, it has been found that a barrier layer composed of more than one suitable sublayer, in which each sublayer provides different specific properties to the barrier layer with the objective to fine-tune the barrier layer properties, achieves higher fabrication yields and consequently higher reliability in battery performance over a given thin-film battery's lifetime. For this reason, the present invention focuses on the fabrication and provision of a barrier layer that is composed of more than just one single layer and that preferably chemically separates the substrate from the battery part of the electrochemical apparatus while allowing the reliable fabrication of such apparatus.

2.1 Fabrication of a Barrier Layer Including Insulating Barrier Sublayers

A barrier layer may be directly deposited onto the substrate. A barrier layer composed of barrier sublayers wherein at least one barrier sublayer is amorphous or glassy may be designed and fabricated to avoid or minimize grain boundary diffusion of ions and electrons, thereby reducing the diffusion of unwanted species into and out of the battery layers during fabrication and during operation and storage conditions of the battery thereafter. It is preferable to prevent or minimize chemical reactions between the battery components with the substrate.

Each of the barrier sublayers may, for example, be selected from a group of materials that may block the diffusion of ions from a $LiCoO_2$ cathode layer (lithium ions, cobalt ions, and oxygen ions), atoms and ions from the current collector (gold, platinum, nickel, copper, etc.), and ions and atoms from the stainless steel substrate (iron, chromium, nickel, other heavy metals, and main group elements of the selected stainless steel type), although it may, for example, be sufficient to use simply electrically insulating materials that are inert to the substrate, the current collector, and/or the positive cathode. Selecting a barrier layer composed of sublayers that is capable of blocking ions and electrons may be considered a preferable approach regarding obtaining a substrate part and the battery part of the electrochemical apparatus that may be chemically separated during fabrication and during operation and storage conditions of the electrochemical apparatus thereafter.

The group of binary borides, carbides, silicides, nitrides, phosphides, oxides, fluorides, chlorides, bromides, and iodides, as well as diamond, diamond-like carbon, high-temperature stable organic polymers, and high-temperature stable silicones may, for example, provide general ion blocking properties in addition to electrical insulation properties. Therefore, these materials may be used for the barrier sublayer materials. In addition to using preferably the binary compounds of these materials, the barrier sublayers may, for example, be formed of any multinary compound composed of these materials such as, but not limited to, oxy-nitrides, carbo-borides, carbo-oxy-nitrides, silico-carbo-nitrides, and oxy-fluorides. The electrochemical apparatus of the present invention does not require the barrier layer to be a pure oxide.

The above-listed binary and multinary barrier sublayer materials may be deposited by selecting one or more of the many suitable thin-film deposition methods including sputtering (RF-magnetron, AC magnetron, DC and DC pulse magnetron, diode RF or DC or AC), electron beam evaporation, thermal (resistive) evaporation, plasma enhanced chemical vapor deposition, ion beam assisted deposition, cathodic arc deposition, electrochemical deposition, spray pyrolysis, etc. A $Si_3N_4$ barrier sublayer, for instance, may be fabricated by utilizing a pure silicon target that is sputtered preferably in a RF magnetron sputter system using an $Ar$—$N_2$ reactive plasma environment. SiC and TiC barrier sublayer films are usually RF magnetron sputtered from targets of the same respective composition in an inert Ar plasma environment while their nitrogen doped derivatives, SiC:N and TiC:N, are deposited from SiC and TiC targets, respectively, in a reactive $Ar$—$N_2$ plasma environment using RF magnetron sputter equipment.

The formation of optimized oxy-nitrides, carbo-borides, carbo-oxy-nitrides, silico-carbo-nitrides, oxy-fluorides, and the like may be accomplished by providing sputter gas mixtures that may contain $N_2$, $O_2$, $N_2O$, $BF_3$, $C_2F_6$, $B_2H_6$, $CH_4$, $SiH_4$, etc. either alone or in addition to an inert carrier gas, such as argon, and/or in addition to providing the elements from a sputter target. For example, the thin-film deposition of titanium silico-carbo-nitride (or titanium silicon carbide nitride), $Ti_3SiC_2$:N, may be accomplished by RF magnetron sputtering in $Ar$—$N_2$ plasma atmosphere using either a single sputter target constructed of alternating areas of TiC and SiC, in an overall area ratio of 3:1 or two separate sputter targets, one of TiC and the other one of SiC, that are operated in such a way that they deposit a mixed material layer having a TiC/SiC ratio of 3:1 at any given time onto the same substrate area (dual target sputter deposition). The barrier-layer coated substrate may or may not be post-deposition processed prior to continuing with the battery fabrication.

An example for a barrier sublayer material may be $Si_3N_4$, $SiN_xO_y$ for $3x+2y=4$, or oxide-gradiented $Si_3N_4$ that may reach a stoichiometry at its surface, or at both of its surfaces, of almost $SiO_2$, if so desired. Additionally, SiC or TiC, with or without nitrogen doping, may be used as a barrier sublayer material.

A few specific derivatives of these materials may not be most preferable as ion blockers when used in a barrier layer without any further, suitable barrier sublayers, because they allow the diffusion of certain ions in the fabrication process or during battery operating and storage conditions while exhibiting only poor insulating properties, such as non-stoichiometric $ZrO_2$, non-stoichiometric YSZ (yttrium stabilized zirconia), and non-stoichiometric LiI (lithium iodide). In contrast to their stoichiometric counterparts, the non-stoichiometry is the main reason why these materials are electrically conductive while allowing oxygen and lithium ion diffusion, respectively.

To, for example, fine-tune certain barrier properties, such as improved adhesion to the substrate and/or the battery part, mechanical flexibility, stability to adjacent layers, pinhole-freeness, electrical resistance, and chemical inertness, suitable barrier layers may be provided that comprise barrier sublayers. For example, a barrier layer on top of a stainless steel 430 substrate may be constructed from a stack of barrier sublayers of the following sequence: 500 Å $SiO_2$ (for improved adhesion to the oxide-bonding stainless steel substrate)/2000 Å $Si_3N_4$ (electrically insulating and diffusion blocking material towards lithium ions, cobalt ions, oxygen ions, iron ions, chromium ions, and gold atoms, for example)/1000 Å SiC:N (strongly diffusion blocking layer relative to lithium ions, cobalt ions, oxygen ions, iron ions, chromium ions, and gold atoms)/2000 Å $Si_3N_4$ (electrically insulating and diffusion blocking material towards lithium ions, cobalt ions, oxygen ions, iron ions, chromium ions, and gold atoms, for example)/500 Å $SiO_2$ (adhesion facilitator to the current collector layer) onto which 300 Å cobalt current collector adhesion layer and 3000 Å gold current collector can be deposited.

In some cases the insulating barrier sublayers may not only be in contact with the positive cathode and/or the cathode current collector but also may be in contact with the negative anode and/or the anode current collector. In any case the barrier sublayers may, for example, be preferably chemically inert to all materials with which it is in contact. This characteristic may limit, for example, the use of a pure $Al_2O_3$ or $SiO_2$ barrier layers when in contact with a metallic lithium negative anode which otherwise might react detrimentally to $Li_2O$, $LiAlO_2$, and Li—Al alloys or $Li_2O$, $Li_2SiO_3$, and Li—Si alloys.

2.2 Fabrication of a Barrier Layer of at least One Electrically Conductive Barrier Sublayer Conductive barrier sublayers may, for example, be equally effective if, for example, they satisfy the preferable attributes of: 1) preventing ionic diffusion into or out of the battery layers; and 2) not reacting with either the substrate or the battery layers during the fabrication process and thereafter during all battery operating and storage conditions. The barrier layer, may, for example, include electrically insulating barrier sublayers as well. Such electrically insulating and electrically conductive sublayers may, for example, not all have the same shape or area size. Therefore, a barrier layer of such a mixed stack of barrier sublayers may, for example, be electrically conductive in some areas that are in contact with the substrate part or the battery part while in other contact areas with the substrate part or the battery part the barrier layer exhibits electrically insulating properties.

The materials for the electrically conductive barrier sublayers may, for example, be selected from the group of conductive binary borides, carbides, silicides, nitrides, phosphides, and oxides, as well as from the group of any of their conductive multinary compounds, for example, but not limited to, oxy-nitrides, carbo-borides, carbo-oxy-nitrides, silico-carbo-nitrides, and oxy-fluorides. Also, high-temperature stable polymers and high-temperature stable silicones may be used that are specifically engineered to be electrically conductive. The materials selection list for the electrically insulating barrier sublayers has been provided in the previous section 2.1 above and are incorporated herein. The barrier sublayers may be formed from completely different compositions, such as a barrier layer that may be fabricated of a barrier sublayer stack of, for example, 5000 Å ZrN/4000 Å $Si_3N_4$/3000 Å WC/1000 Å $MoSi_2$ where each of the barrier sublayers may, for example, have different area dimensions.

As a result, for example, the $Si_3N_4$ barrier sublayer may extend over the entire footprint area of, for example, the metallic substrate while the ZrN barrier sublayer only covers the area on the substrate underneath the cathode current collector while the WC and $MoSi_2$ barrier sublayers are, for example, covering at least the entire area underneath the anode current collector while further extending into the area of ZrN. Due to its area size, the interposed $Si_3N_4$ barrier sublayer may, for example, provide electrical separation of the electrically conductive ZrN barrier sublayer from the electrically conductive WC/$MoSi_2$ barrier sublayers and thus the electrical separation between the positive and the negative parts of the battery (see FIG. 2).

In this embodiment, an electrically conductive barrier sublayer, such as ZrN, TiN, WC, $MoSi_2$, $TiB_2$, or NiP may be deposited by standard deposition methods including sputter deposition (RF-magnetron, DC and DC pulse magnetron, AC magnetron, diode RF or DC or AC), electron beam evaporation, thermal (resistive) evaporation, plasma enhanced chemical vapor deposition, ion beam assisted deposition, cathodic arc deposition, electrochemical deposition, spray pyrolysis, etc. onto the substrate. For example, a ZrN barrier sublayer may be fabricated either from a ZrN sputter target performing a DC magnetron sputter deposition in an inert Ar atmosphere or from a metallic Zr target also using DC magnetron sputter deposition but in a reactive Ar—$N_2$ atmosphere.

Additionally, certain metals (e.g., Au, Pt, Ir, Os, Ag, Pd), semi-metals (e.g., graphitic carbon, Si), and alloys (e.g., based on Au, Pt, Ir, Os, Ag, Pd, C, and Si) may be selected as an electrically conductive barrier sublayer, preferably, but not limited to, when the post-deposition anneal temperatures necessary to crystallize the positive cathode are moderate, such as 200° C.-500° C. The electrically conductive barrier sublayer may or may not be heat processed further before continuing with the battery fabrication process.

Figure 3A:
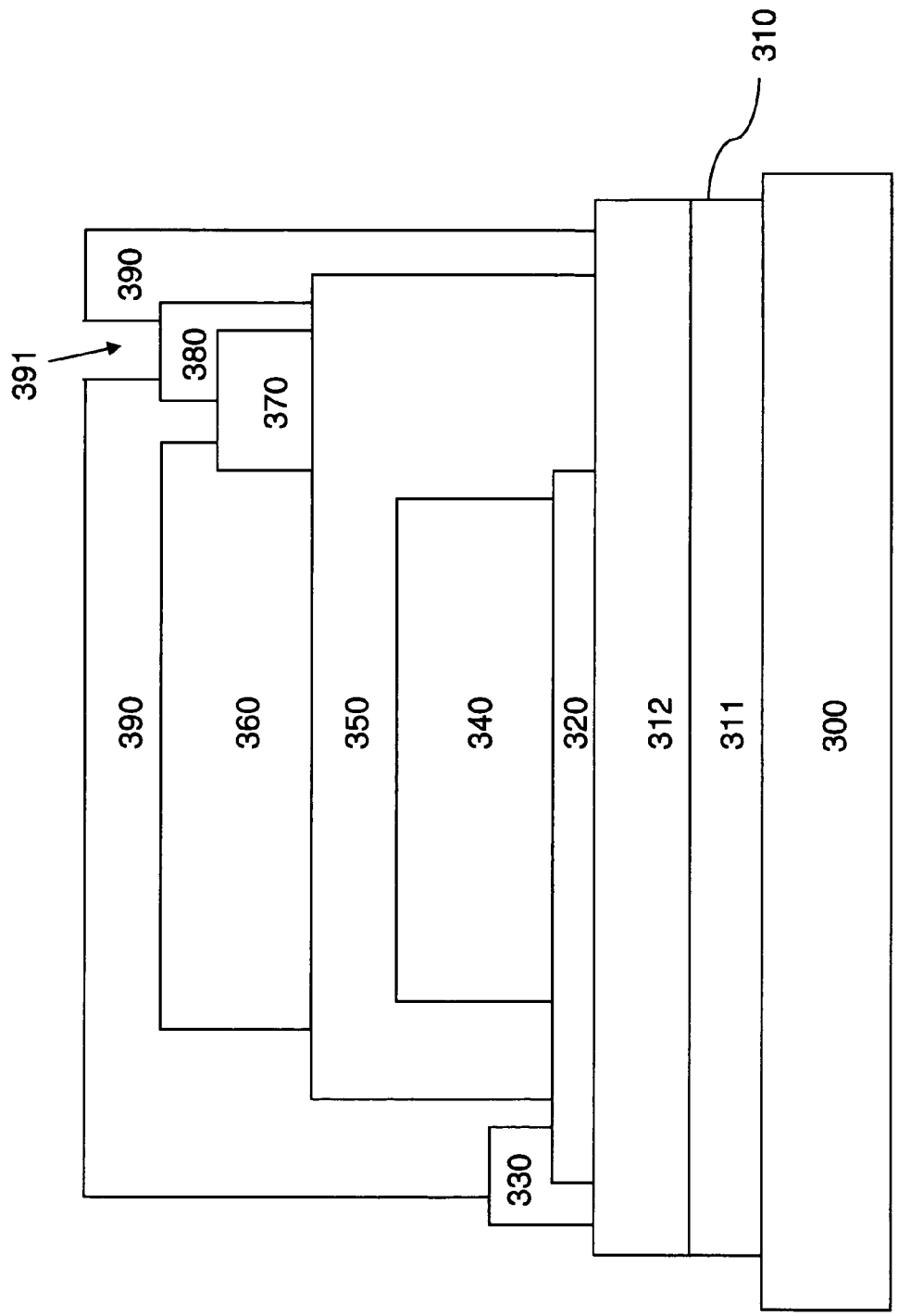
FIG. 3a illustrates a schematic of an exemplary use of an embodiment of a barrier layer that includes an electrically conductive barrier sublayer for the case in which the electrical separation between the positive and the negative part of the electrochemically active cell is accomplished through fabrication of the negative part entirely on top of the electrolyte.
Figure 3B:
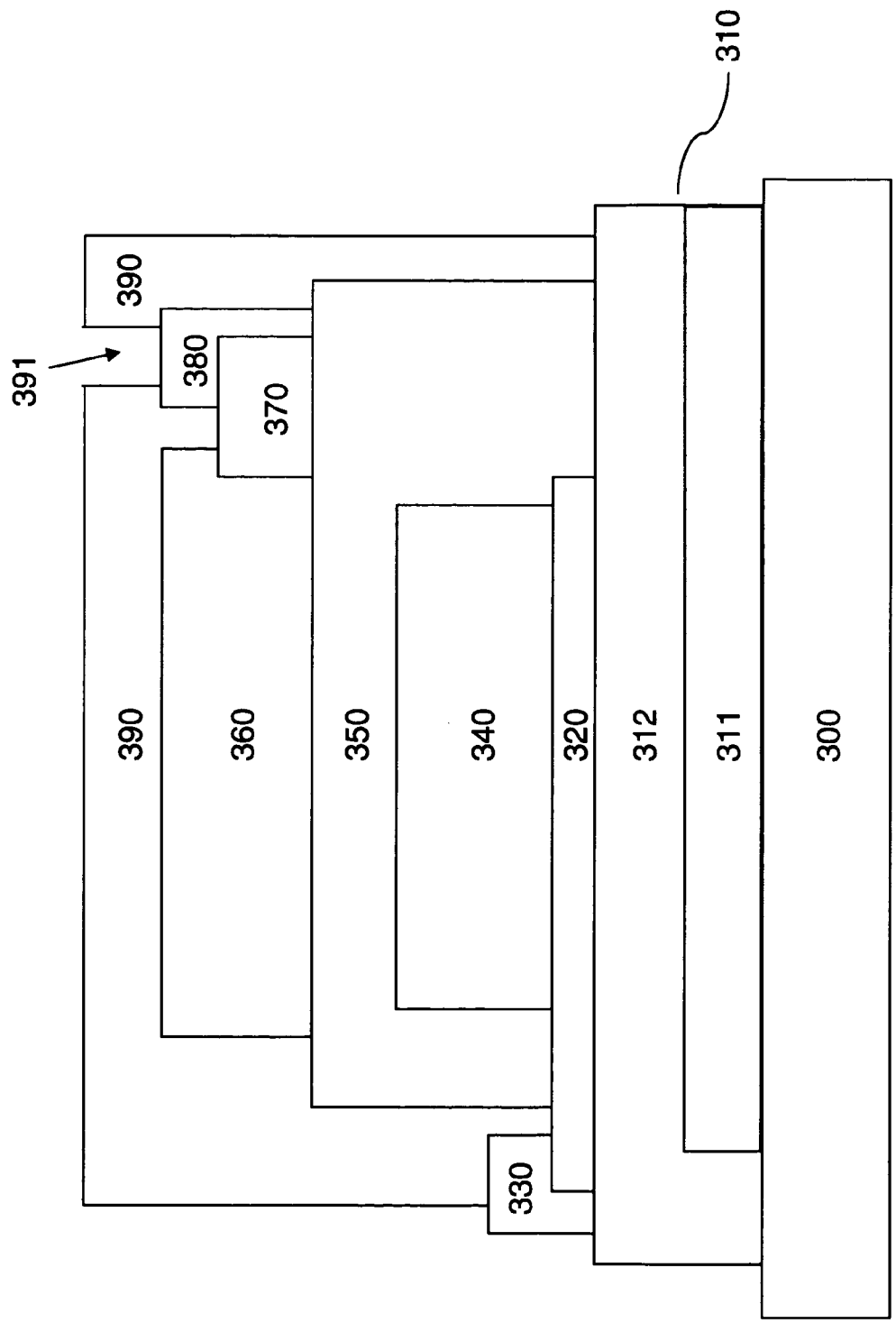
FIG. 3b illustrates a schematic of another exemplary use of an embodiment of a barrier layer that includes an electrically conductive barrier sublayer on metallic substrate for the case in which the electrical separation between the positive and the negative part of the battery is accomplished through fabrication of the negative part entirely on top of the electrolyte.

If fabricated appropriately in terms of electrical accessibility from the positive battery terminal, a conductive barrier sublayer may have the added advantage of eliminating a separate cathode current collector, unless, for example, one chooses to optimize the electrical properties of the conductive barrier sublayer by coating it with a better conducting and inert thin layer, for example, gold. Whether or not additionally coated with such a better conducting layer, the approach of the conductive barrier sublayer may include that, at the same time, the anode current collector and negative anode be separated from the conductive barrier sublayer to which the positive cathode and/or its cathode current collector makes electrical contact. This separation may be achieved, for example, as follows:

1) By extending the electrolyte in area so that both the negative anode and its anode current collector are entirely located on top of the electronically insulating electrolyte, which in turn serves, in this case, effectively as a local barrier sublayer for the negative anode and its anode current collector (see FIGS. 3a and 3b). If the specific fabrication parameters of the positive cathode do not cause a reaction with the already present electrolyte layer, the positive cathode and its cathode current collector can analogously be fabricated entirely on top of the electrolyte while the negative anode is located underneath the electrolyte (see FIG. 3c).

2) When the negative anode and/or the anode current collector are not located entirely on top of the electrolyte, then they may make contact with the barrier layer and thus with at least with one of its barrier sublayers and/or the metallic substrate. In this case, one or more of the barrier sublayers may be electrically conductive while at least one of the sublayers should be insulating (see FIGS. 4a and 4b). In any case, all of the barrier sublayers should be chemically inert to all of the materials with which they are in contact. This may preferably prohibit, for instance, the use of a $Pt_2Si$ barrier sublayer when in contact with a negative metallic lithium anode, because this would otherwise result in a reaction to $Li_xSi$ for $0<x<=4.4$ and $Li_yPt$ for $0<y<=2$ (see FIG. 4c).

2.3 Barrier Layer and Substrates

One reason for providing a barrier layer is, for example, providing chemical separation between the substrate part and the battery part of an electrochemical apparatus of an embodiment of the present invention during the fabrication of the battery part, which may entail process temperatures of up to the melting point of the substrate, and thereafter, during all operation and storage conditions of the electrochemical apparatus. The same principles as detailed above may apply for at least three substrate types of the present invention, which may comprise metallic substrates, polymeric substrates, and doped or undoped silicon substrates.

Direct depositions of electrically insulating or conductive barrier sublayers may be accomplished in a straightforward manner onto the three substrate types as described above. Of course, the inherent physical and chemical limitations each substrate type possesses should be observed, and the deposition parameters for each barrier sublayer should be adjusted accordingly. For example, a sputter deposition may be performed under such high deposition rates that the resulting deposition temperature at the substrate surface may exceed the melting point of the polymeric substrate. Therefore, the deposition parameters should preferably be limited so as to observe the melting point of the substrate. In another example, a very thin Si substrate of only 10 μm may be used. In such a case, it may be relevant to adjust the stresses of the barrier sublayers during their depositions, neglecting any post-deposition anneal for the moment, to the mechanical properties of the fragile Si substrate, in order not to crack it prior to the deposition of any subsequent barrier sublayers and/or the battery layers. More specific examples could be given without limiting the scope of the invention with respect to the possible use of all three substrate types and the basic principles for the fabrication of a barrier layer, including its barrier sublayers, onto them.

3. Battery Fabrication

Once the substrate in the present invention is fabricated with a barrier layer, the subsequent fabrication steps of the electrochemical apparatus depend on whether or not a second electrochemically active cell shall be fabricated onto the second side of the substrate to accomplish a "double-sided" electrochemical apparatus, which is discussed further below. The electrochemical apparatus of the present invention does not require the first electrochemically active cell to be a solar battery.

For the case of a "single-sided" electrochemical apparatus, however, wherein only a first electrochemically active cell is fabricated onto the first side of the substrate, a second layer is optionally deposited onto the second side of the substrate prior to the fabrication of the component layers of the first electrochemically active cell. This second layer can be fabricated with the objective to protect the substrate from the ambient environment against chemical and mechanical factors during the fabrication, operation, and storage of the electrochemical apparatus. In addition, through the implementation of the second layer, the first electrochemically active cell may be protected against chemical contaminants from the ambient environment that could enter the substrate at the second, otherwise unprotected side and diffuse through the substrate, thereby potentially reaching and detrimentally reacting with the first electrochemical active cell during fabrication, operation, and/or storage of the electrochemical apparatus. This protection of the first electrochemically active cell may be in addition to the protection provided by the substrate itself and by the barrier layer between the substrate and said first electrochemically active cell, in particular for the case in which the barrier layer may not cover the entire area underneath the first electrochemically active cell. The protection of both the substrate and the first electrochemically active cell may result in an extended lifetime of the electrochemical apparatus.

The second layer may be fabricated from a material that includes a chemical compound selected, for example, from the group of metals, semi-metals, alloys, borides, carbides, diamond, diamond-like carbon, silicides, nitrides, phosphides, oxides, fluorides, chlorides, bromides, iodides, or for example, from the group of any multinary compounds composed of borides, carbides, silicides, nitrides, phosphides, oxides, fluorides, chlorides, bromides, and iodides, or for example, from the group of high-temperature stable organic polymers and high-temperature stable silicones. In particular, a thin metal layer, between 500 Å and 5 μm thick, may be useful to protect the substrate by blocking the entry of contaminants at said second side during the fabrication, operation, and/or storage of the electrochemical apparatus. Furthermore, a metal layer, for example, nickel or titanium, may be useful because it can be deposited relatively fast and inexpensive compared to its ceramic counterparts, for example, TiC.

The blocking action of the second layer may, for example, include a chemical reaction of the second layer with the contaminants, which is known in the literature as chemical gettering, corrosion inhibition, or sacrificial layer provision, and is not limited to metal layers, but could also be accomplished with, for example, sub-oxides or sub-nitrides (insufficiently oxidized or nitrided film materials that can easily be fabricated by sputter depositions, for example) or, for example, nitrides or carbides that may convert into oxides or carbonates when reacting with the oxygen, moisture, or carbon dioxide contaminants present in the ambient environment during the fabrication, operation, and/or storage of the electrochemical apparatus.

One may fine-tune the second layer on the second side of the substrate by selecting materials that protect either mainly without a chemical reaction or mainly via chemical reaction. A further fine-tuning may then occur, for example, by selecting one of the latter materials but with a higher or a lesser reactivity under certain ambient environment conditions. For example, $Al_4C_3$ converts into $Al_2O_3$ at much lower temperatures and oxygen partial pressures than SiC to $SiO_2$. Likewise, nitrides with a very small enthalpy of formation, such as $CO_2N$, convert into the respective oxides at much lower temperatures and oxygen partial pressures than their counterparts that formed under a large negative enthalpy of formation, such as $Si_3N_4$ and ZrN.

Ultimately, it is up to the manufacturer of the electrochemical apparatus to decide on its optimum parameters relative to added costs for the fabrication of the second layer on the second side of the substrate, which is mainly a function of the materials selection and the fabricated thickness of the second layer, versus added protection of the substrate and the first electrochemically active cell against specific ambient environment conditions that exist for specific periods of time, which again is mainly a function of the materials selection and the fabricated thickness of said second layer.

Thin-film batteries may be manufactured in a batch fabrication process using sequential physical and/or chemical vapor deposition steps using shadow masks to build up the individual battery component layers. Electrochemically active cells may be fabricated with any of several structures. The features may include:

(i) the positive cathode configuration to be used
   a. the positive cathode located between the barrier layer and the negative anode (cathode deposition prior to anode deposition; "normal configuration"), and the negative anode located between barrier layer and the positive cathode (anode deposition prior to cathode deposition; "inverted configuration")
   b. the post-deposition anneal that is applied to the positive cathode (ii) the anode configuration to be used
   a. the negative anode layer contacts or does not contact the barrier layer
   b. the anode current collector layer contacts or does not contact the barrier layer (iii) the type of barrier layer to be used
   a. electrically insulating sublayers vs. electrically conductive sublayers
   b. area dimensions of a given sublayer in comparison to the other sublayers in a given barrier layer
   c. sequence combinations of insulating and conductive sublayers in the barrier layer (iv) the substrate is or is not in electrical contact with the electrochemical active cell (either with its positive part or with its negative part)

(v) the electrochemical active cell is fabricated on one side (single-sided electrochemical apparatus) or both sides of the substrate (double-sided electrochemical apparatus)

(vi) protective encapsulation or protective encasing design to be used
   a. encapsulation vs. encasing
   b. opening(s) in encapsulation or encasing vs. no opening(s) for access to terminals
   c. use or no use of moisture protection layer in opening area
(vii) current collectors and terminals.

3.1 Cathode Configuration 3.1.1 The Positive Cathode Located Between the Barrier Layer and the Negative Anode, which may be Equivalent to the Deposition and Potential Post-deposition Anneal of the Positive Cathode Prior to the Deposition of the Negative Anode: "Normal Configuration."

Depending on the electrical properties of the barrier layer, a cathode current collector may be fabricated prior to the deposition of the positive cathode. That is, if the barrier layer based on its sublayers is insulating in the area where the positive cathode is to be fabricated, then a cathode current collector may be deposited in order to create the necessary electrical access to the positive cathode from the positive terminal. If, however, the barrier layer based on its sublayers is electrically conductive in the area where the positive cathode is to be deposited, then an additional inert metal layer ("conduction enhancer") may optionally be deposited between the barrier layer and the positive cathode in order to enhance the current collecting properties of the barrier layer.

The positive cathode, the cathode current collector, and the conduction enhancer of the barrier layer may be deposited by selecting any of the many deposition methods including sputtering (RF-magnetron, DC and DC pulse magnetron, AC magnetron, diode RF or DC or AC), electron beam evaporation, thermal (resistive) evaporation, plasma enhanced chemical vapor deposition, ion beam assisted deposition, cathodic arc deposition, electrochemical deposition, spray pyrolysis, etc.

After the deposition of the positive cathode a post-deposition anneal may follow in order to improve the physical, chemical, and electrochemical properties of the positive cathode. The most common post-deposition anneal occurs at 700° C. in air for about 30 minutes to 2 hours which completes the crystallization of positive cathode materials, $LiCoO_2$, $LiMn_2O_4$, $LiMnO_2$, $LiNiO_2$, and derivatives thereof.

Figure 5:
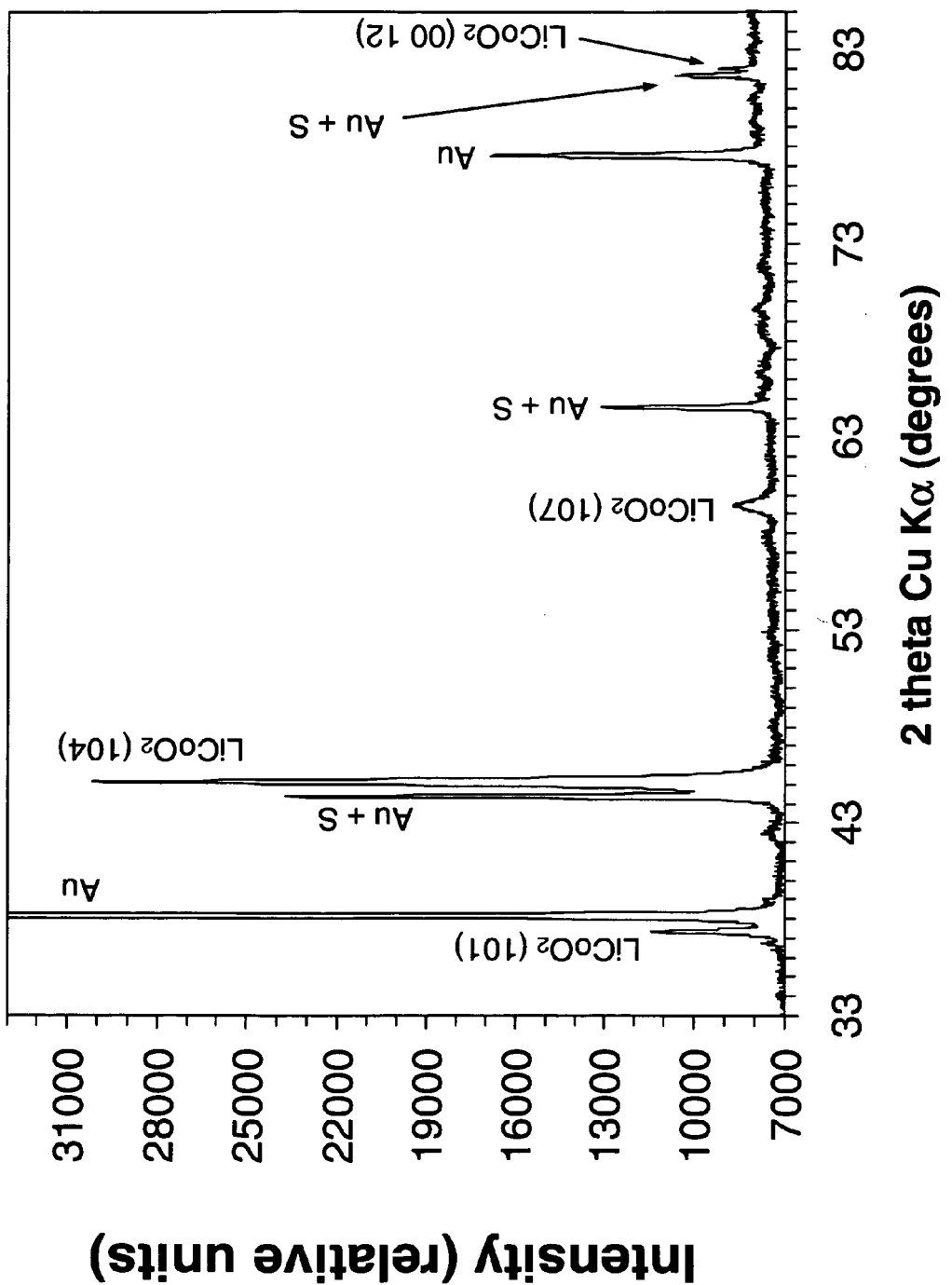
FIG. 5 illustrates a graph of an X-ray diffraction (XRD) pattern of an embodiment of a 1.6 µm thick $LiCoO_2$ positive cathode film fabricated onto 3000 Å Au cathode current collector over 300 Å Co adhesion layer attached to an electrically insulating barrier layer composed of two barrier sublayers, 5000 Å $Al_2O_3$ and 6000 Å $CO_3O_4$, on 50 µm thick stainless steel foil type 430 substrate.

The composition of a given derivate and the parameters of the applied post-deposition anneal may inform the selection of the barrier layer material. For example, for pure $LiCoO_2$ and a 700° C. anneal in air for 2 hours a 3000 Å gold cathode current collector that may be attached by a 300 Å cobalt adhesion layer to an electrically insulating barrier layer including two barrier sublayers, 5000 Å $Al_2O_3$ and 6000 Å $CO_3O_4$, on 50 μm of stainless steel 430 foil is one optional combination. The X-ray diffraction (XRD) pattern of this setup after the 700° C. anneal is shown in FIG. 5. The $LiCoO_2$ positive cathode exhibited a crystallite size of about 560 Å for the (101) grains while its refined lattice parameters ($a_{hex}$=2.8146(4)Å; $c_{hex}$=14.0732(8)Å) may match the theoretical values (e.g., ICDD 77-1370: $a_{hex}$=2.815(1)Å; $c_{hex}$=14.05(1)Å). This fact indicates that the crystalline $LiCoO_2$ positive cathode film may not react with any of its surrounding materials, including the substrate, while achieving the proper crystallographic parameters that are necessary to show optimized electrochemical behavior in an electrochemically active cell.

Also after fabricating a pure $LiCoO_2$ positive cathode over 3000 Å Au/300 Å Co cathode current collector attached to a barrier layer composed of two barrier sublayers, 5000 Å $Si_3N_4$ and 5000 Å $SiO_2$, onto 300 μm thick undoped silicon substrate followed by an anneal at 700° C. in air for 2 hours, a well crystalline $LiCoO_2$ positive cathode ($a_{hex}$=2.8151(4)Å; $c_{hex}$=14.066(7)Å; sample grain size for the (101) plane of 1100 Å) may be obtained with virtually theoretical lattice parameters (e.g., ICDD 77-1370: $a_{hex}$=2.815(1)Å; $c_{hex}$=14.05(1)Å). Having attained a well crystalline, stoichiometric $LiCoO_2$ positive cathode film with layered structure and theoretical crystallographic lattice parameters provides, for example, that the crystalline $LiCoO_2$ positive cathode film may not react with its surrounding materials, including the silicon substrate, as shown, for example, in FIG. 6. As with the $LiCoO_2$ positive cathode film in the previous example fabricated onto stainless steel 430 foil substrate, the theoretical crystallographic lattice parameters ($a_{hex}$=2.8151(4)Å; $c_{hex}$=14.066(7)Å) may suggest that a $LiCoO_2$ positive cathode film on Si substrate may show certain preferred electrochemical behavior.

3.1.2 The Negative Anode Located Between the Barrier Layer and the Positive Cathode, which may Provide Performance Approximating Deposition and Potential Post-deposition Anneal of the Negative Anode Prior to the Deposition of the Positive Cathode: "Inverted Configuration".

Figure 3C:
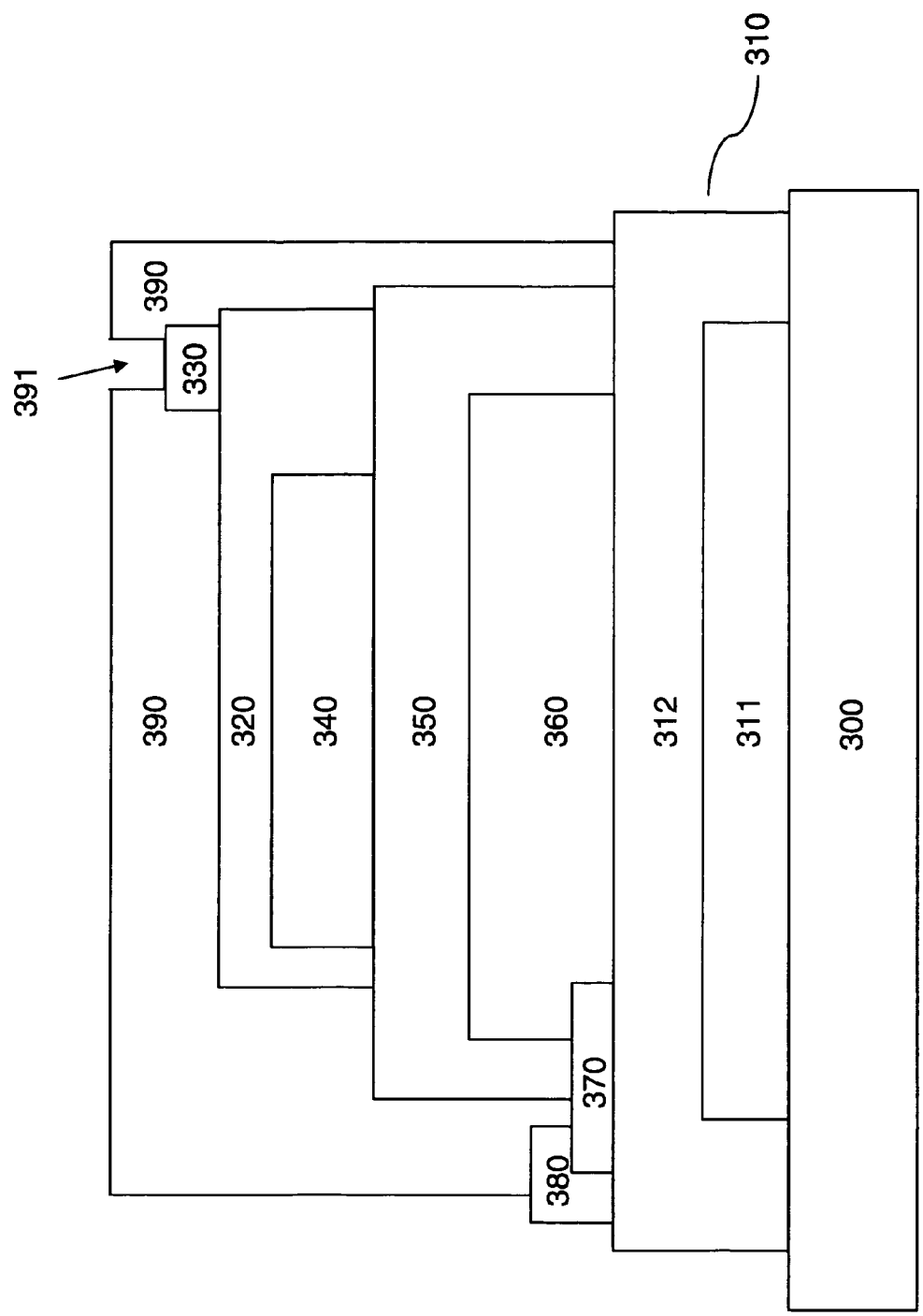
FIG. 3c illustrates a schematic of an exemplary use of an embodiment of a barrier layer that includes an electrically conductive barrier sublayer on metallic substrate for the case in which the electrical separation between the positive and the negative part of the battery is accomplished through fabrication of the positive part entirely on top of the electrolyte.

One example of an "inverted configuration" of an embodiment of the present invention is schematically shown in FIG. 3c for the case in which the substrate may be a metallic substrate. Depending on the electrical properties of the barrier layer, an anode current collector may be fabricated prior to the deposition of the negative anode. That is, if the barrier layer, based on its sublayers, is insulating in the area where the negative anode is to be fabricated, then an anode current collector may be deposited in order to create the necessary electrical access to the negative anode from the negative terminal. If, however, the barrier layer based on its sublayers is electrically conductive in the area where the negative anode is to be deposited, then an additional inert metal layer ("conduction enhancer") may be deposited between the barrier layer and the negative anode in order to enhance the current collecting properties of the barrier layer.

The negative anode, the anode current collector, and the conduction enhancer of the barrier layer may be deposited by selecting any of the many deposition methods including sputtering (RF-magnetron, DC and DC pulse magnetron, AC magnetron, diode RF or DC or AC), electron beam evaporation, thermal (resistive) evaporation, plasma enhanced chemical vapor deposition, ion beam assisted deposition, cathodic arc deposition, electrochemical deposition, spray pyrolysis, etc.

The negative anode may be selected from the group of metal lithium, lithium-ion anodes, and so-called lithium-free anodes (see, e.g., U.S. Pat. No. 6,168,884, incorporated herein by reference in its entirety). After the deposition of the negative anode, a post-deposition anneal may follow in order to improve the physical, chemical, and electrochemical properties of the negative anode. Preferably, such an anneal may be applied to lithium-ion anodes, if at all, for example, to $Li_4Ti_5O_{12}$, but, for example, not to metallic lithium, and not preferably to a group of lithium-free anodes.

The actual composition of the negative anode and the parameters of the applied post-deposition anneal may inform the selection of the barrier layer material. For example, for a metallic lithium negative anode, a barrier sublayer of 5000 Å of $Si_3N_4$ on silicon substrate that separates said silicon substrate from said metallic lithium negative anode, may provide the necessary barrier layer properties where the chemical inertness between the barrier layer and the metallic lithium may be accomplished through the positive enthalpy of reaction for the reaction path $12Li+Si_3N_4=4Li_3N+3Si$.

In an exemplary inverted configuration, the positive cathode may be deposited onto the electrolyte. Therefore, the temperatures permitted in a potential post-deposition anneal of the positive cathode may be limited, because for example, a chemical reaction between the electrolyte and the positive cathode is preferably avoided, as well as a reaction between the negative anode and the electrolyte.

3.2 Anode Configuration

Exemplary embodiments of "inverted configuration" have already been described above.

When fabricating an embodiment containing a negative anode entirely on top of the electrolyte, there may, for example, be no direct chemical interaction between the negative anode and the barrier layer.

When fabricating an embodiment of a negative anode partially on top of the electrolyte, the "normal configuration" (see 3.1.1) is preferable. The overhanging area of the negative anode over the electrolyte layer edge may be prevented from touching the barrier layer for the case where there is an anode current collector present (see FIG. 7a). Without the presence of an adequately configured anode current collector the overhanging area of the negative anode may touch the barrier layer (see FIG. 7b). In either case, the negative anode can, for example, preferably be chemically inert to the barrier layer and its barrier sublayers with which the negative anode is in direct contact, because, owing to its limited thickness and grain boundary morphology, the anode current collector may not provide adequate chemical separation between the negative anode and the barrier layer. In such case, the selection of the negative anode material determines the selection of the barrier sublayer materials. In this regard, a $CO_3O_4$ barrier sublayer may not be used if the negative anode is a metallic lithium anode and this anode has contact to the $CO_3O_4$ barrier sublayer. Otherwise, the metallic lithium can reactively degrade the $CO_3O_4$ barrier sublayer to $Li_2O$, CoO, and solid solutions of Li(Co) and Co(Li).

If the negative anode and/or its anode current collector make contact to the barrier layer, then two cases may need to be assessed: whether the negative anode and/or its anode current collector make contact to: 1) an insulating barrier sublayer, or 2) an electrically conductive barrier sublayer. In the first instance, it may be sufficient that this barrier sublayer be chemically inert to the negative anode and/or its anode current collector, such as $Si_3N_4$ when using a metallic lithium anode. For the second instance, in addition to the conductive barrier sublayer being in contact be chemically inert to the negative anode and/or its anode current collector, a more sophisticated barrier sublayer approach may, for example, be used for conductive substrates, for example, metallic ones and doped and undoped silicon (see examples in FIGS. 4a-4c). For insulating polymeric substrates and the second instance, it is sufficient to use a non-continuous conductive barrier sublayer so that the positive part and the negative part of the battery are not short-circuited through this electrically conductive barrier sublayer.

The use of, for example, a 1 μm thick ZrN barrier sublayer is relatively simple and effective for the embodiment where a metallic lithium negative anode makes contact to this ZrN barrier sublayer, which in turn should not be shared with the positive part of the battery, but instead the positive part of the battery may be located over an insulating barrier sublayer such as $Si_3N_4$. One advantage of this latter example embodiment is that the ZrN barrier sublayer also may serve as the anode current collector for the negative metallic lithium anode (see FIG. 8).

An anode current collector may comprise an inert metal, an inert alloy, or an inert nitride and thus may not be prone to reacting with the barrier layer or the negative anode. The anode current collector should preferably not make electrical contact to a conductive barrier sublayer to which also the positive cathode and/or the cathode current collector has electrical contact. Otherwise, the battery may be in a short-circuited state.

3.3 Substrate in Electrical Contact with the Electrochemically Active Cell

In an example embodiment where there is no reaction between the substrate and the positive cathode or the negative anode, the substrate with those electrodes may be brought into direct electrical contact or into indirect electrical contact via a current collector. However, for conductive substrates, such as metallic substrates, doped or undoped silicon wafers or metallized polymeric substrates, only one of those electrodes may, for example, be allowed to be in electrical contact with the substrate, because otherwise the electrochemically active cell may be shorted out or a strong current leakage may be introduced. This exemplary approach has the advantage of conveniently using the conductive substrate as one of, for example, two terminals of an electrochemical apparatus (see FIG. 9).

3.4 Double Sided Electrochemical Apparatus

The present invention may include embodiments wherein an electrochemical apparatus has at least one electrochemically active cell on each side of the substrate. The fabrication, for example, of embodiments may include wherein each electrochemically active cell is deposited by a given electrochemically active cell component layer, such as the positive cathode, on both sides of the substrate using equipment that, for example, is capable of depositing both sides of the substrate at the same time prior to proceeding to the fabrication of the next battery component layer, which may also be deposited on both sides of the substrate at the same time.

The potential sequential fabrication process of the battery component layers may, for example, be done in the same manner as for a single sided electrochemical apparatus. As a result of this exemplary approach of layer completion on both sides of the substrates prior to depositing the next layer on both sides of the substrate, a potential post-deposition anneal might not be applied to a layer on the other side of the substrate that should not be subjected to such a post-deposition anneal.

Another exemplary approach may be to partially complete the fabrication of the first electrochemically active cell on the first side of the substrate before proceeding to the partial completion of the fabrication of the second electrochemically active cell on the second side of the substrate or any further electrochemically active cell on either the first or second side of the substrate. This approach may, for example, be employed when the available deposition equipment does not allow double sided depositions at the same time. For example, a deposit onto the first side of the substrate comprising a cathode current collector and then a positive cathode layer may be accomplished before depositing a cathode current collector and a positive cathode layer onto the second side of the substrate. After these steps, a post-deposition anneal may be applied to the partially completed electrochemically active cells on this substrate at the same time prior to continuing the fabrication of the electrochemically active cell on the first side of the substrate using the fabrication sequence electrolyte-anode current collector-anode. Subsequently, the same fabrication sequence may be applied to the second side of the substrate before both sides are encapsulated with heat sensitive polymeric laminates on both sides of the substrates at the same time or thin-film encapsulations that may be applied at the same time or sequentially.

Depending on the actual conditions of a potential post-deposition anneal of the positive cathode and/or negative anode, a third approach may be possible where the fabrication of the first electrochemically active cell on the first side of the substrate may completed prior to starting the fabrication of the second electrochemically active cell on the second side of the substrate.

3.5 Protective Encapsulation or Protective Encasing Design

For the purpose of the present invention, we define "protective encasing" as a protective enclosure such as, for example, a pouch or hermetically sealed metal can that contains the electrochemical apparatus, and in certain embodiments may fully enclose and/or entirely contain the apparatus. We define "protective encapsulation" as, for example, a protection that "caps" the electrochemical apparatus or one or more given individual electrochemically active cells of the electrochemical apparatus. The cap may, for example, be attached to the substrate area available next to the electrochemically active cell or any suitable substrate area of the electrochemical apparatus.

Before the electrochemical apparatus of the present invention may be operated in the ambient environment, it is, for example, preferred that it be protected against any reactive chemicals that may be present in a given ambient environment and which may detrimentally react or degrade the electrochemical apparatus. For example, if the ambient environment is air, the electrochemical apparatus of the present invention may preferably be protected against moisture, among other reactive chemicals such as $O_2$ or $CO_2$ (see for example, U.S. Pat. No. 6,916,679 incorporated herein in its entirety). One may protect the electrochemical apparatus of the present invention against those external, chemical factors, for example, inside a hermetically sealed metal can with electrical feed-throughs, such as, for example, laser welded stainless steel cans or vacuum-tight metal or glass tubes or vessels. However, the dimensions of such kinds of protective encasings may add too much inert volume and mass to an electrochemical apparatus whose components, except for the energy carrying positive cathode, can be minimized relative to their thicknesses. This strategy of minimization is particularly useful for the thickness of the inert components of the electrochemical apparatus, such as the substrate and any protective encasings, or protective encapsulations as well, whose mere presence is always reducing the densities of power, energy, and capacity of any electrochemically active cell, and thus the densities of power, energy, and capacity of the electrochemical device.

For the reasons described above, the protective encapsulation or protective encasing should preferably be as thin as possible while still being able to protect the electrochemical apparatus against a variety of chemicals present in the ambient environment in which the electrochemical apparatus is operated. Protection against those chemicals includes implicitly all of the pertaining temperatures of and exposure times to said chemicals, which the electrochemical apparatus encounters during its lifetime. However, it is the sole discretion of the manufacturer of the electrochemical apparatus to establish the optimum parameters of the electrochemical apparatus relative to manufacturing costs and performance. In this regard, an electrochemical apparatus, which may be operated only for a few days after its fabrication, for example, may receive a potentially cheaper and less sophisticated protective encapsulation or protective encasing than an electrochemical apparatus that, for example, may be designed to be operated for years.

Both protective encapsulation and protective encasing should allow external access to the terminals of the electrochemical apparatus. This external access may be accomplished by, for example, adopting one of the following three main engineering designs. First, the substrate and/or the protective encapsulation can serve as terminals to which direct external contact can be made (see, for example, FIG. 3b, substrate 300 serves as the positive terminal). Second, a terminal can be run underneath the hermetically sealed edge of the protective encapsulation and further extend outside of said protective encapsulation to which contact can be made (see, for example, FIG. 4a, layers 430 and 480). Analogously, a terminal can be run through a hermetically sealed exit or opening of the protective encasing, and further extend outside of said protective encasing to which contact can be made (see, for example, prismatic Li-ion bulk battery technology). Third, an opening can be provided in the protective encapsulation or protective encasing, which allows direct external access to a terminal inside of the electrochemical apparatus, but wherein sensitive parts, for example, the moisture sensitive electrolyte, may be separated from the ambient environment, for example, moisture containing air, only by the thickness of the terminal or its adjacent current collector.

Figure 10:
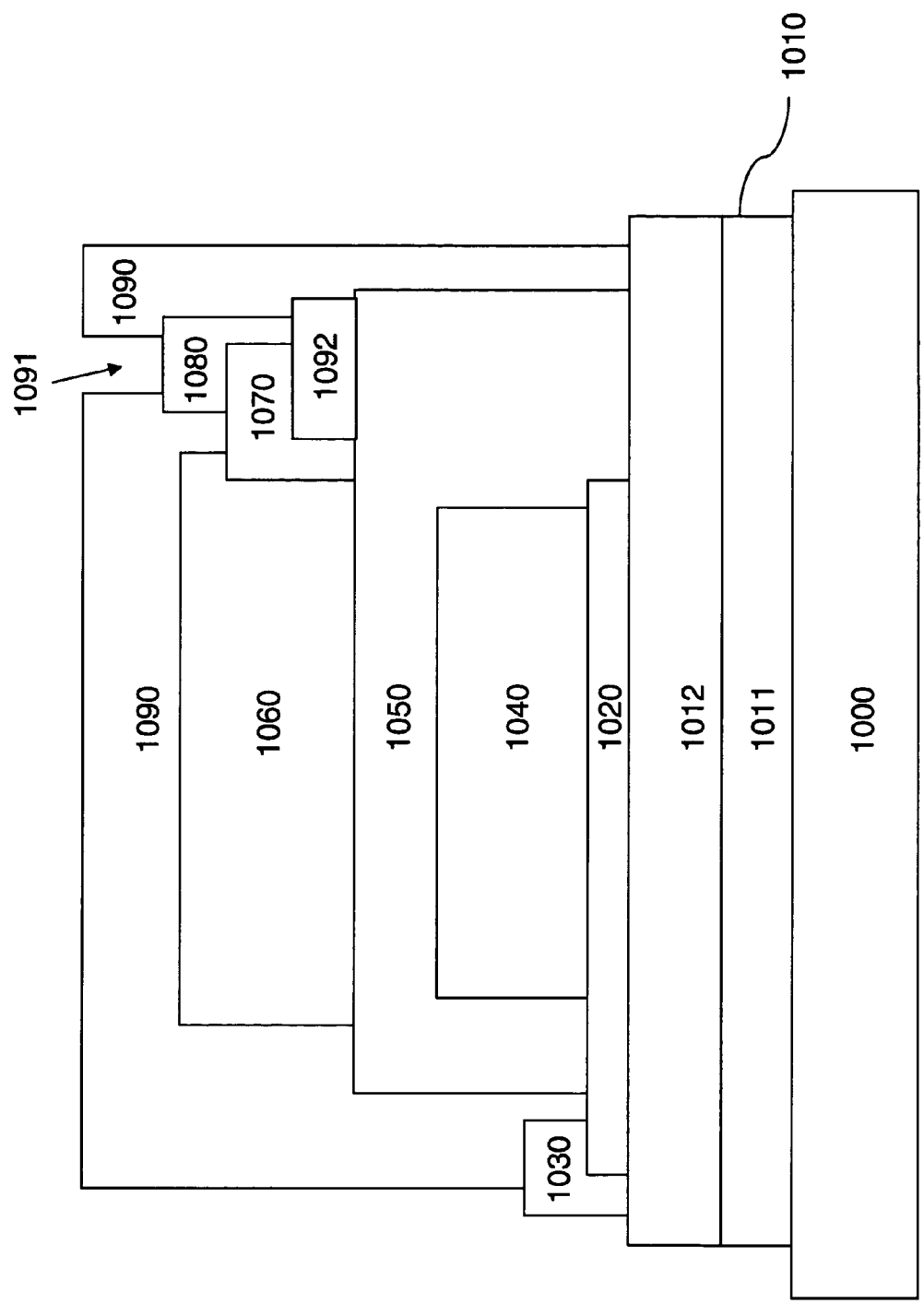
FIG. 10 illustrates a schematic of an embodiment of the use of a moisture protection layer to protect the moisture-sensitive electrolyte layer against moisture present in the ambient environment for the case in which the protective encapsulation has been fabricated with an opening for providing access to the negative terminal.

For improved lifetime, which represents a useful performance parameter of the electrochemical apparatus of the present invention, one may ensure, in particular for the case in which said opening of said third design is located near the electrolyte area, that the electrolyte receives added protection by, for example, a moisture protection layer, as schematically shown in FIG. 10.

3.6 Current Collector and Terminals

Less electrically conducting electrode materials, such as a $LiCoO_2$ positive cathode or a $Li_4Ti_5O_{12}$ negative anode, may need a well conducting, inert backside contact (current collector), for example Au or Ni, in order to keep the electrical resistance of that electrode small, as well as minimize the ionic diffusion pathway inside the electrode, which is accomplished when the z-parameter (thickness) of the electronic and ionic pathway is kept to a minimum. This principle is implemented in most batteries where the electrodes are preferably built flat or thin (z-parameter), that is, have a length dimension (x-parameter) and width dimension (y-parameter) that is maximized compared to the thickness (z-parameter). Some electrodes are good electrical conductors, both electronically and ionically, and would not need a current collector for the aforementioned reasons. However, they may be chemically so reactive, such as a negative metallic Li anode, that they may preferably be separated from other battery parts, such as the negative terminal, by an appropriate inert "bridge", such as Ni in the case of a negative Li metallic anode. This "bridge" may make contact to the reactive, well conducting electrode only in one corner or at one edge, in contrast to the full-area backside contact in the case of a poorly conducting electrode. The bridge serves as an inert medium between the reactive electrode and its terminal, and provides current collecting properties, and may thus be called "current collector" as well.

A terminal of the electrochemical apparatus of the present invention may, in one embodiment, be an extended current collector, and may thus made of the same material that makes contact to the electrode. However, the current collector used in thin-film batteries may be very thin and mechanically dense so that externally making contact to them, mechanically (e.g., clipping), soldering, or spot welding, for example, may not form a preferable permanent electrical contact. One may prefer to improve the contact properties of the current collector by adding, for example, thick and/or porous, well-conducting materials to the end of the current collector, which is the area called a "terminal", to which a mechanical, soldered, or spot welded external electrical contact, for example, may be accomplished. In this regard, screen-printed silver and silver alloys, about 5-15 µm thick and fairly porous, have been successfully employed as a terminal that is printed in a manner so that the cathode or anode current collector may make good electrical contact to it while the screen-printed material does not chemically contaminate the electrochemically active cell, or cells, at any point during their fabrication, operation, or storage.

Example embodiments and implementations of the invention are described with reference to the drawings.

FIG. 1 illustrates one embodiment of an electrochemical apparatus. The substrate part 100 may, for example, be chemically separated from the battery part 120 via a barrier layer 110, which is composed of barrier sublayers 111-114. Battery component layers 121-125 are provided. A positive battery terminal 126 and a negative battery terminal 127 are further provided.

Figure 2:
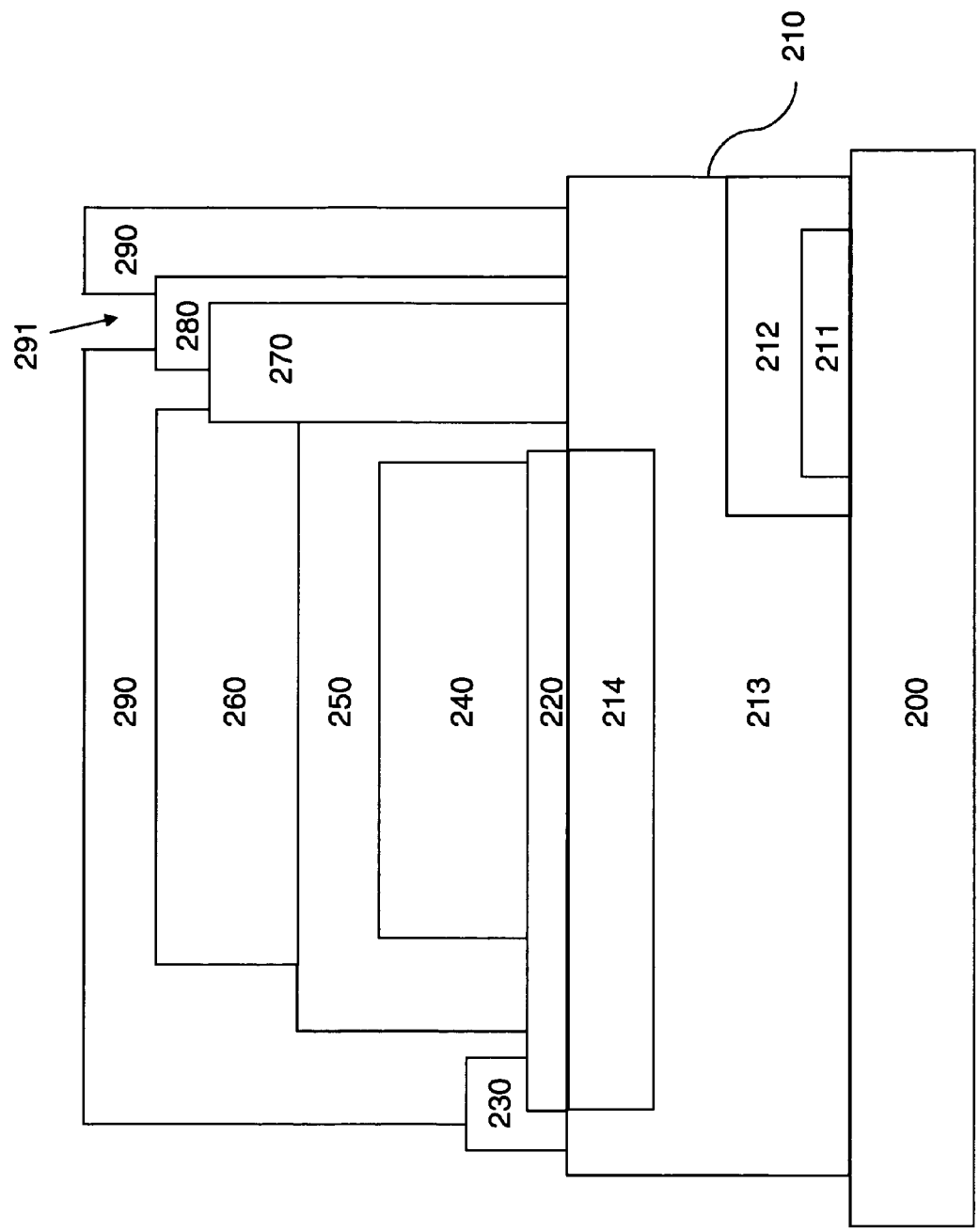
FIG. 2 illustrates a schematic of an exemplary use of an embodiment of a barrier layer that includes barrier sublayers of different area dimensions and provides the electrical separation between the positive and negative part of the electrochemically active cell.

FIG. 2 illustrates one embodiment of an example of a barrier layer 210 of the exemplary barrier sublayers 1000 Å $MoSi_2$ 211, 3000 Å WC 212, 4000 Å $Si_3N_4$ 213, and 5000 Å ZrN 214. As shown, the area dimensions of these sublayers may, for example, be very different from each other while they may still accomplish the preferred electrical separation between the positive part (214, 220, 230, and 240) and the negative part (260, 270, and 280) of the electrochemically active cell. The cathode current collector, the positive terminal, and the positive cathode are represented by items 220, 230, and 240, respectively. The positive part of the electrochemically active cells may include at least a positive cathode, a cathode current collector, and a positive terminal. The cathode current collector alone may serve as a positive terminal. The negative anode, the anode current collector, and the negative terminal are represented by 260, 270, and 280, respectively. The negative part of the electrochemically active cell may include at least a negative anode, an anode current collector, and a negative terminal. An extended anode collector may also serve as: (1) a negative terminal; (2) an anode; and (3) an anode current collector, an anode, and a negative terminal. The electrolyte 250 may, for example, electronically separate the positive part from the negative part of the electrochemically active cell. In this particular case, the electrochemically active cell may, for example, be protected by an encapsulation 290 with an opening 291 to access the negative terminal 280. This encapsulated electrochemically active cell may be fabricated onto a substrate 200 which altogether forms the electrochemical apparatus.

FIG. 3a illustrates an example embodiment of a barrier layer 310 containing a first barrier sublayer 311 and a second barrier sublayer 312, which may, for example, be electrically conductive for an embodiment wherein the electrical separation between the positive part and the negative part of the electrochemically active cell is accomplished through fabrication of the negative part entirely on top of the electrolyte 350. The positive part may, for example, constitute the second barrier sublayer 312, the cathode current collector 320, the positive terminal 330, and the positive cathode 340. When the first barrier layer 311 provided is electrically conductive, the positive part may additionally constitute the first barrier layer 311. For embodiments where the substrate 300 is electrically conductive, for example metallic, in conjunction with an electrically conductive first barrier layer 311, then this substrate may also become a part of the positive part. The negative part may constitute the negative anode 360, the anode current collector 370, and the negative terminal 380. In this particular example, the electrochemically active cell may be protected by an encapsulation 390 with an opening 391 to access the negative terminal 380.

FIG. 3b illustrates an example embodiment of a barrier layer 310 containing a first barrier sublayer 311 and a second barrier sublayer 312, which may for example be electrically conductive, for an embodiment where the electrical separation between the positive part and the negative part of the electrochemically active cell may, for example, be accomplished through fabrication of the negative part entirely on top of the electrolyte 350, while the cathode current collector 320, the positive terminal 330, and the positive cathode 340 may, for example, have electrical contact to the metallic substrate 300 via the second barrier sublayer 312. In this configuration, the metallic substrate 300 may serve as the positive terminal. The positive part may constitute a metallic substrate 300, a second barrier sublayer 312, a cathode current collector 320, a positive terminal 330, and a positive cathode 340. For an embodiment wherein the first barrier layer 311 is electrically conductive, the positive part may additionally include a first barrier layer 311. The negative part may include a negative anode 360, an anode current collector 370, and a negative terminal 380. In this particular example, an electrochemically active cell may be protected by an encapsulation 390 with an opening 391 to access the negative terminal 380.

FIG. 3c illustrates an example embodiment of a barrier layer 310 containing a first barrier sublayer 311 and a second barrier sublayer 312, which may, for example, be electrically conductive, for the case in which the electrical separation between the positive part and the negative part of the electrochemically active cell is accomplished through fabrication of the positive part entirely on top of the electrolyte 350 while the anode current collector 370, the negative terminal 380, and the negative anode may, for example, have electrical contact to the metallic substrate 300 via the second barrier layer 312. In this configuration, the substrate 300 may, for example, serve as the positive terminal as well. The positive part may constitute the cathode current collector 320, the positive terminal 330, and the positive cathode 340. The negative part may constitute metallic substrate 300, the second barrier sublayer 312, the negative anode 360, the anode current collector 370, and the negative terminal 380. In the case where the first barrier layer 311 is electrically conductive as well, the negative part may additionally constitute this first barrier layer 311. In this particular example, the electrochemically active cell may be protected by an encapsulation 390 with an opening 391 to access the positive terminal 330.

Figure 4A:
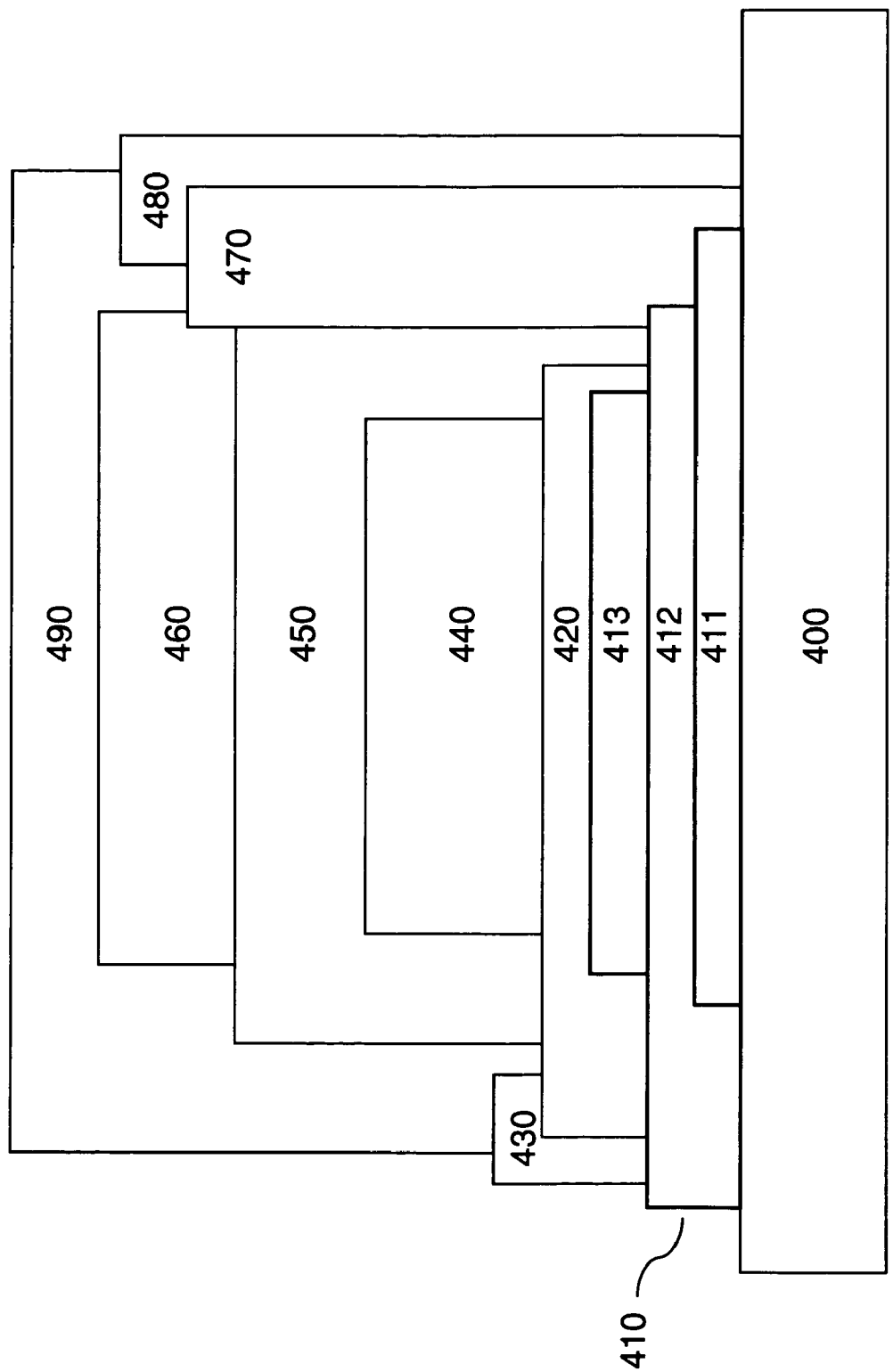
FIG. 4a illustrates a schematic of an exemplary use of an embodiment of a barrier layer that includes electrically conductive barrier sublayers for the case in which the electrical separation between the positive and the negative part of the electrochemical active cell is not done via fabrication of the negative part entirely on top of the electrolyte.

FIG. 4a illustrates an example embodiment of a barrier layer 410 containing electrically conductive barrier sublayers for the case in which the electrical separation between the positive and negative part of the electrochemically active cell may not be done via fabrication of the negative part entirely on top of the electrolyte 450. Together with the electrolyte 450 the second barrier layer 412, which is electrically insulating, may, for example, separate the positive from the negative part of the electrochemically active cell. The positive part may constitute a cathode current collector 420, a positive terminal 430, and a positive cathode 440. If the third barrier sublayer 413 is electrically conductive, then it may, for example, also become a member of the positive part. The first barrier sublayer 411 may be either electrically insulating or conductive. In the latter case, it may become a member of the negative part itself, for example, while making the substrate 400 a member of the negative part as well. Additionally, the negative part may constitute the negative anode 460, the anode current collector 470, and the negative terminal 480. In this configuration the metallic substrate also may serve as the negative terminal. Finally, the electrochemically active cell may be protected by an encapsulation 490.

Figure 4B:
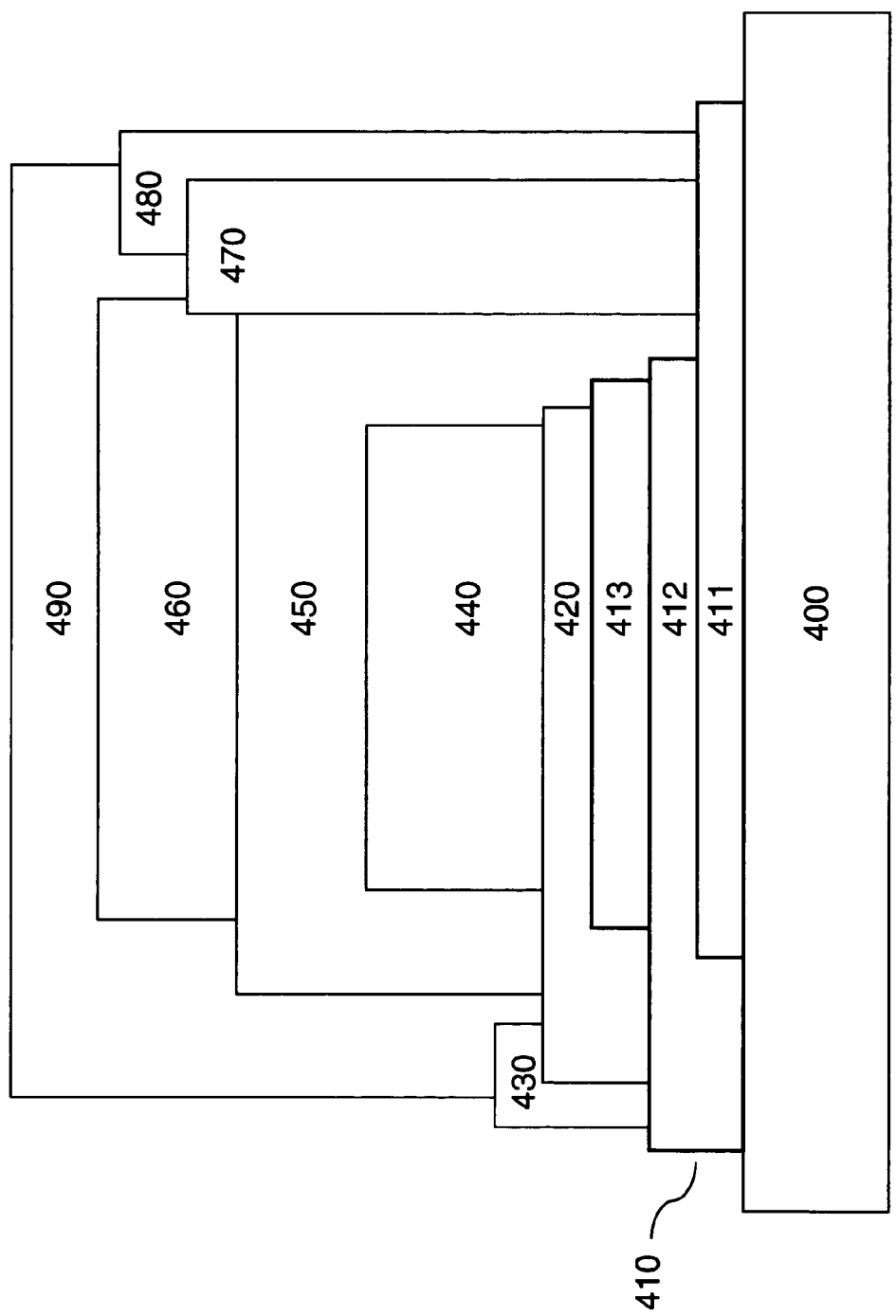
FIG. 4b illustrates a schematic of another exemplary use of an embodiment of a barrier layer that includes electrically conductive barrier sublayers for the case in which the electrical separation between the positive and the negative part of the electrochemically active cell is not done via fabrication of the negative part entirely on top of the electrolyte.

FIG. 4b illustrates an embodiment of another example of a barrier layer 410 containing electrically conductive barrier sublayers for the case in which the electrical separation between the positive and negative part of the electrochemically active cell is not done via fabrication of the negative part entirely on top of the electrolyte 450. Together with the electrolyte 450, the second barrier layer 412, which is electrically insulating, may, for example, separate the positive from the negative part of the electrochemically active cell. The positive part may constitute a cathode current collector 420, a positive terminal 430, and a positive cathode 440. If the third barrier sublayer 413 is electrically conductive, then it may also become a member of the positive part. The first barrier sublayer 411 may be either electrically insulating or conductive. In the latter case, it may become a member of the negative part while making the substrate 400 a member of the negative part as well. Additionally, the negative part may constitute the negative anode 460, the anode current collector 470, and the negative terminal 480. In this configuration, the metallic substrate may serve as the negative terminal as well. Finally, the electrochemically active cell may be protected by an encapsulation 490.

Figure 4C:
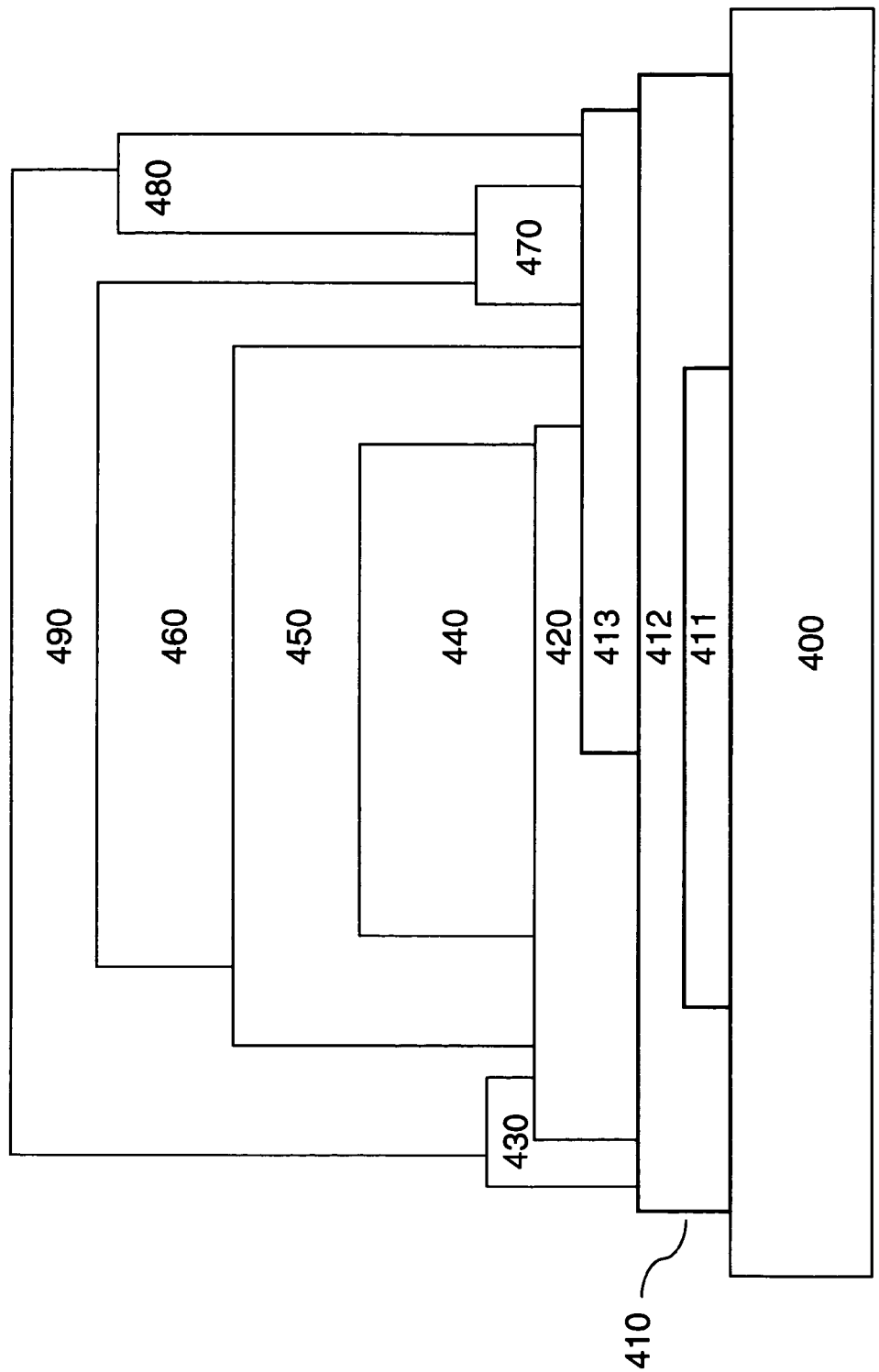
FIG. 4c illustrates a schematic of another exemplary use of an embodiment of a barrier layer that includes electrically conductive barrier sublayers for the case in which the electrical separation between the positive and the negative part of the electrochemically active cell is not done via fabrication of the negative part entirely on top of the electrolyte while the negative anode has direct contact to a barrier sublayer.

FIG. 4c illustrates an embodiment of another example of a barrier layer 410 containing electrically conductive barrier sublayers for the case in which the electrical separation between the positive and negative part of the electrochemically active cell is not done via fabrication of the negative part entirely on top of the electrolyte 450. The negative anode 460 may, for example, have direct contact with the third barrier sublayer 413, which therefore is preferred to be chemically inert to negative anode 460. In this example, the third barrier sublayer 413 may, for example, be electrically insulating so that, together with the electrolyte 450, it may provide the electrical separation between the positive and the negative part of the electrochemically active cell. The positive part may constitute the cathode current collector 420, the positive terminal 430, and the positive cathode 440. If the second barrier sublayer 412 is electrically conductive, then it also may become a member of the positive part while also making the metallic substrate 400 a member of the positive part. The first barrier sublayer 411 may either be electrically insulating or conductive. In the latter case, it may also become a member of the positive part, but only if the second barrier layer 412 is as well. The negative part may constitute the negative anode 460, the anode current collector 470, and the negative terminal 480. In this configuration, the metallic substrate may serve as the negative terminal. Finally, the electrochemically active cell may be protected by an encapsulation 490.

FIG. 5 illustrates a graph of an X-ray diffraction (XRD) pattern of a 1.6 µm thick $LiCoO_2$ positive cathode film fabricated onto 3000 Å gold cathode current collector over 300 Å cobalt adhesion layer over a barrier layer composed of two barrier sublayers, 5000 Å $Al_2O_3$ and 6000 Å $CO_3O_4$, on 50 µm thick stainless steel foil type 430 substrate. The $LiCoO_2$ positive cathode was post-deposition annealed at 700° C. in air for 2 hours, which affected the underlying substrate, the barrier layer and its barrier sublayers, the cathode current collector adhesion layer, and the cathode current collector in a similar thermal manner. The refined lattice parameters of the crystalline $LiCoO_2$ positive cathode film ($a_{hex}$=2.8146(4)Å; $c_{hex}$=14.0732(8)Å) closely match the theoretical values (e.g., ICDD 77-1370: $a_{hex}$=2.815(1)Å; $c_{hex}$=14.05(1)Å), which indicates that the crystalline $LiCoO_2$ positive cathode (crystallinity for the (101) plane as estimated by the Scherrer equation: 560 Å) film did not react with any of its surrounding materials, including the substrate. "Au" represents a gold cathode current collector. "Au+S" represents overlapping peaks of gold cathode current collector and stainless steel 430 substrate foil.

Figure 6:
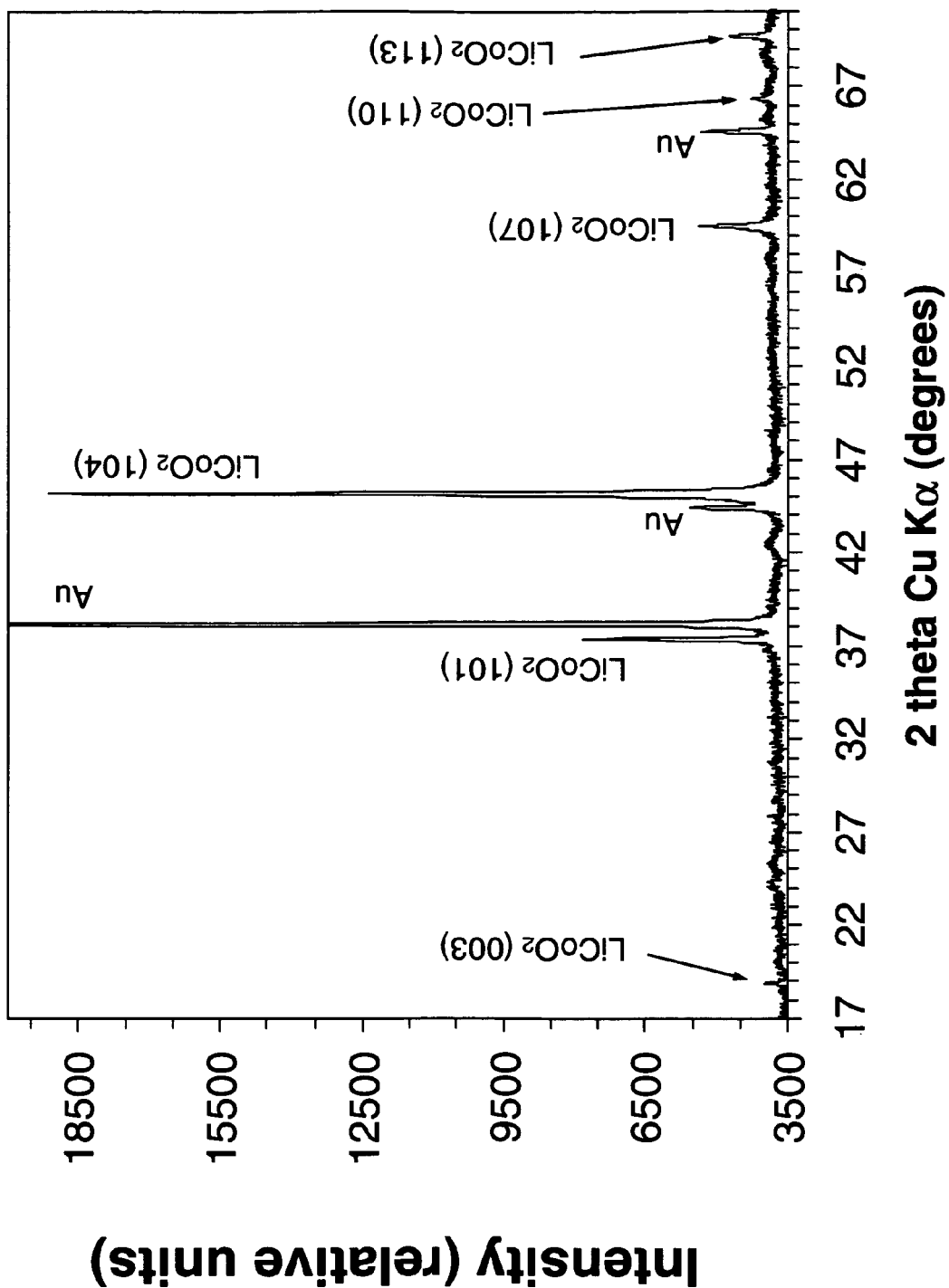
FIG. 6 illustrates a graph of an X-ray diffraction (XRD) pattern of an embodiment of a 1.6 µm thick $LiCoO_2$ positive cathode film fabricated onto 3000 Å Au cathode current collector over 300 Å Co adhesion layer over a barrier layer composed of two sublayers, 5000 Å $Si_3N_4$ and 5000 Å $SiO_2$, on 300 µm thick silicon substrate.

FIG. 6 illustrates a graph of an X-ray diffraction (XRD) pattern of a 1.6 µm thick $LiCoO_2$ positive cathode film fabricated onto 3000 Å gold cathode current collector over 300 Å cobalt adhesion layer over a barrier layer composed of two barrier sublayers, 5000 Å $Si_3N_4$ and 5000 Å $SiO_2$, on 300 µm thick undoped silicon substrate. The $LiCoO_2$ positive cathode was post-deposition annealed at 700° C. in air for 2 hours, which affected the underlying substrate, the barrier layer and its barrier sublayers the cathode current collector adhesion layer, and the cathode current collector in the same thermal manner. The refined lattice parameters of the crystalline $LiCoO_2$ positive cathode film ($a_{hex}$=2.8151(4)Å; $c_{hex}$=14.066(6)Å) match the theoretical values given in the literature (ICDD 77-1370: $a_{hex}$=2.815(1)Å; $c_{hex}$=14.05(1)Å), which indicates that the crystalline $LiCoO_2$ positive cathode (crystallinity for the (101) plane as estimated by the Scherrer equation: 1100 Å) film did not react with any of its surrounding materials, including the silicon substrate. "Au" represents a gold cathode current collector. The peaks of the single crystal silicon substrate were eliminated by the theta-2theta geometry of the diffractometer.

Figure 7A:
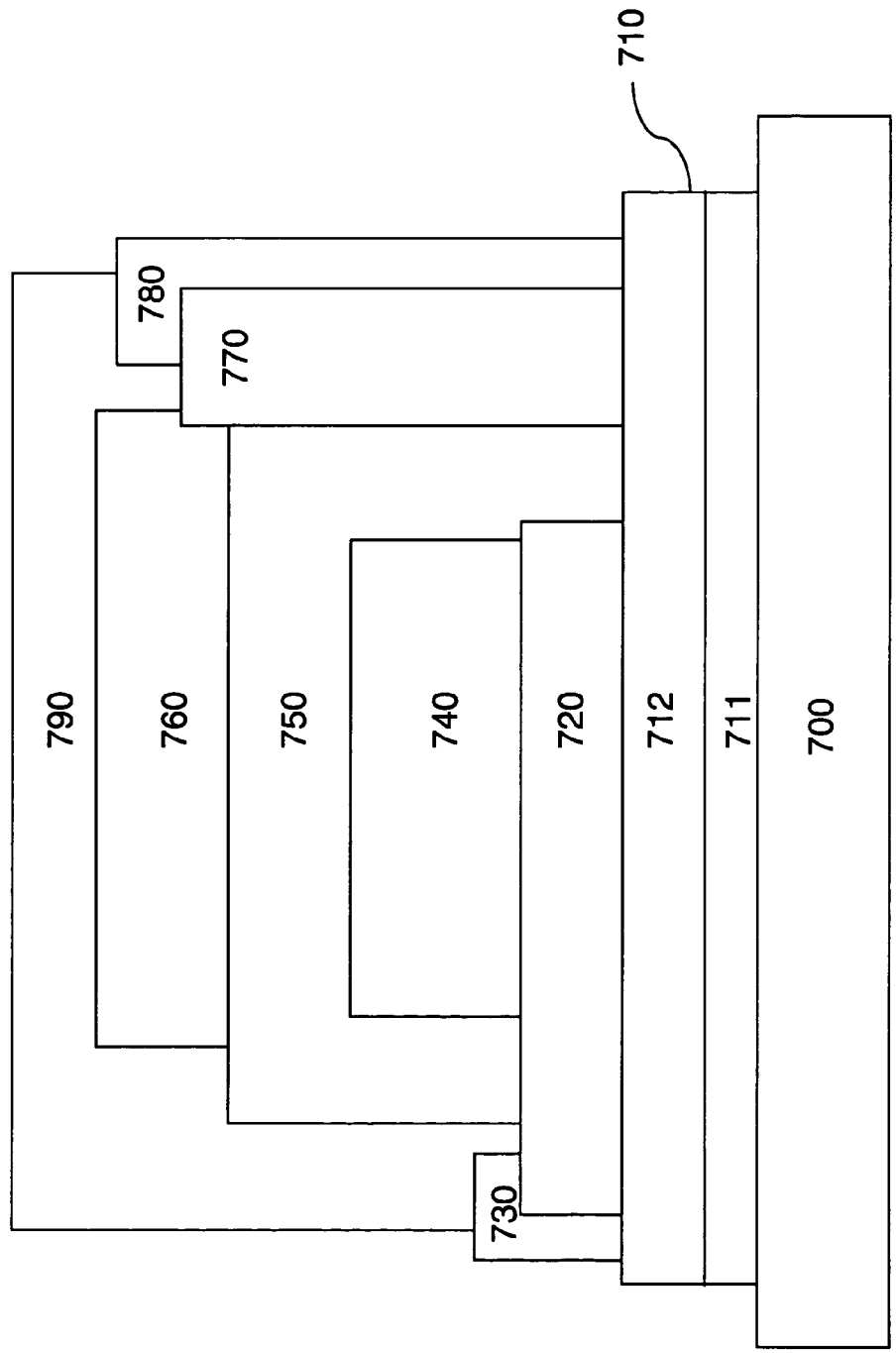
FIG. 7a illustrates a schematic of an embodiment of an anode configuration of the "normal configuration" in which the negative anode is not in direct contact with the barrier layer.

FIG. 7a illustrates an embodiment of an anode configuration in which the negative anode 760 is not in direct contact with the barrier layer 710, and thus with any of its barrier sublayers 711, 712. While the first barrier sublayer 711 may either be electrically insulating or conductive, the second barrier sublayer 712 should be electrically insulating in order to avoid electrical short-circuiting of the electrochemical active cell and thus the electrochemical apparatus. In such a configuration where the negative anode 760 does not contact the barrier layer, it does not determine the selection of the chemical composition of the barrier sublayers 711, 712. The positive part of the electrochemically cell may, for example, include cathode current collector 720, the positive terminal 730, and the positive cathode 740 that are separated by the electrolyte 750 from the negative part, which may constitute the negative anode 760, the anode current collector 770, and the negative terminal 780. Finally, the electrochemically active cell may be protected by an encapsulation 790.

Figure 7B:
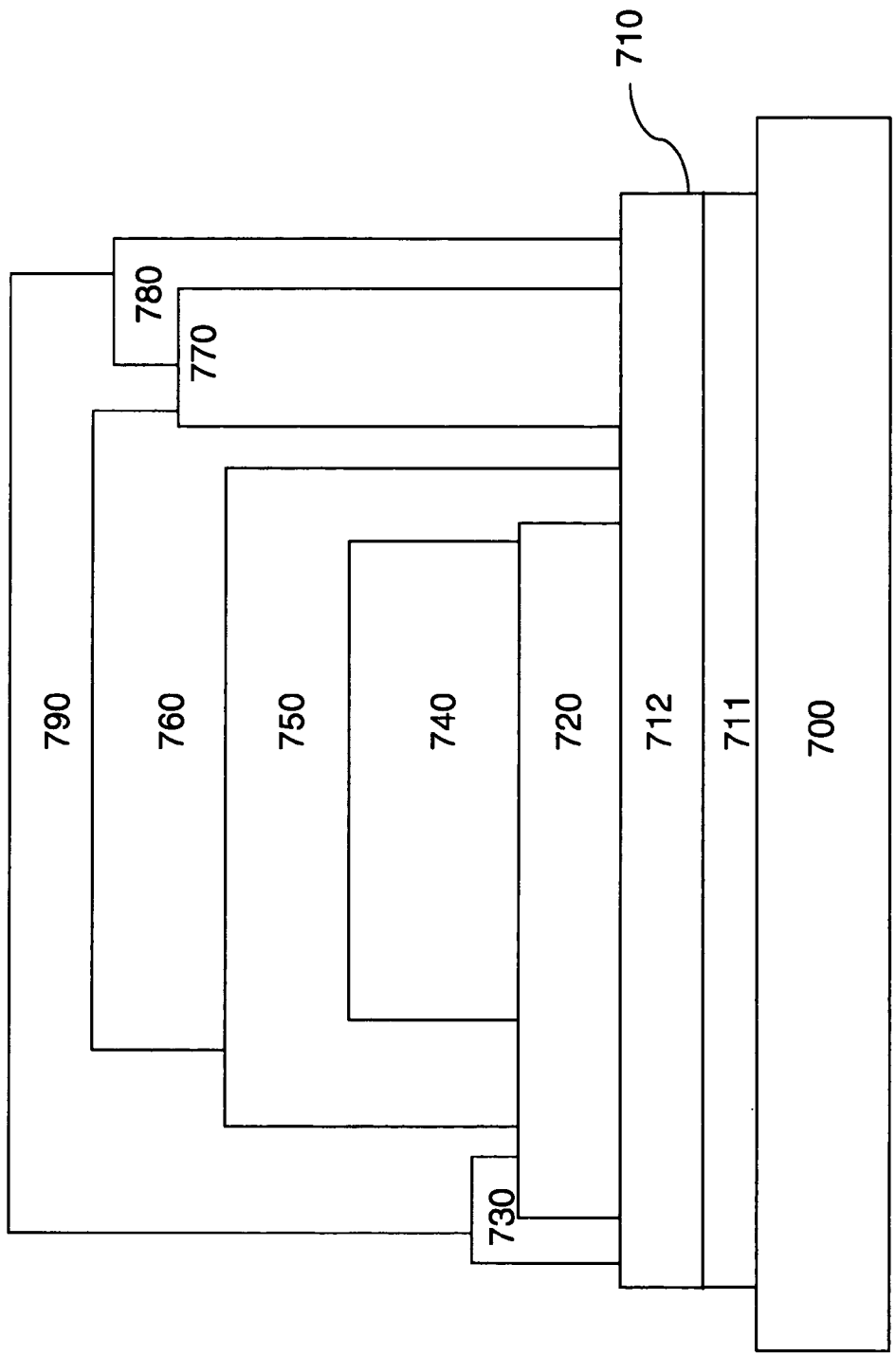
FIG. 7b illustrates a schematic of an embodiment of an anode configuration of the "normal configuration" in which the negative anode is in direct contact with at least one of the barrier sublayers.

FIG. 7b illustrates a schematic of an anode configuration in which the negative anode 760 is in direct contact with the barrier layer 710, and thus with its barrier sublayer 712. While the first barrier sublayer 711 may either be electrically insulating or conductive, the second barrier sublayer 712 is preferably electrically insulating in order to avoid electrical short-circuiting of the electrochemical active cell and thus the electrochemical apparatus. In such a configuration, where the negative anode 760 has contact with the barrier layer, it may determine at least the selection of the chemical composition of that barrier sublayer 712 with which it is in contact. The positive part of the electrochemically cell may, for example, constitute the cathode current collector 720, the positive terminal 730, and the positive cathode 740 that are separated by the electrolyte 750 from the negative part, which may constitute the negative anode 760, the anode current collector 770, and the negative terminal 780. Finally, the electrochemically active cell may be protected by an encapsulation 790.

Figure 8:
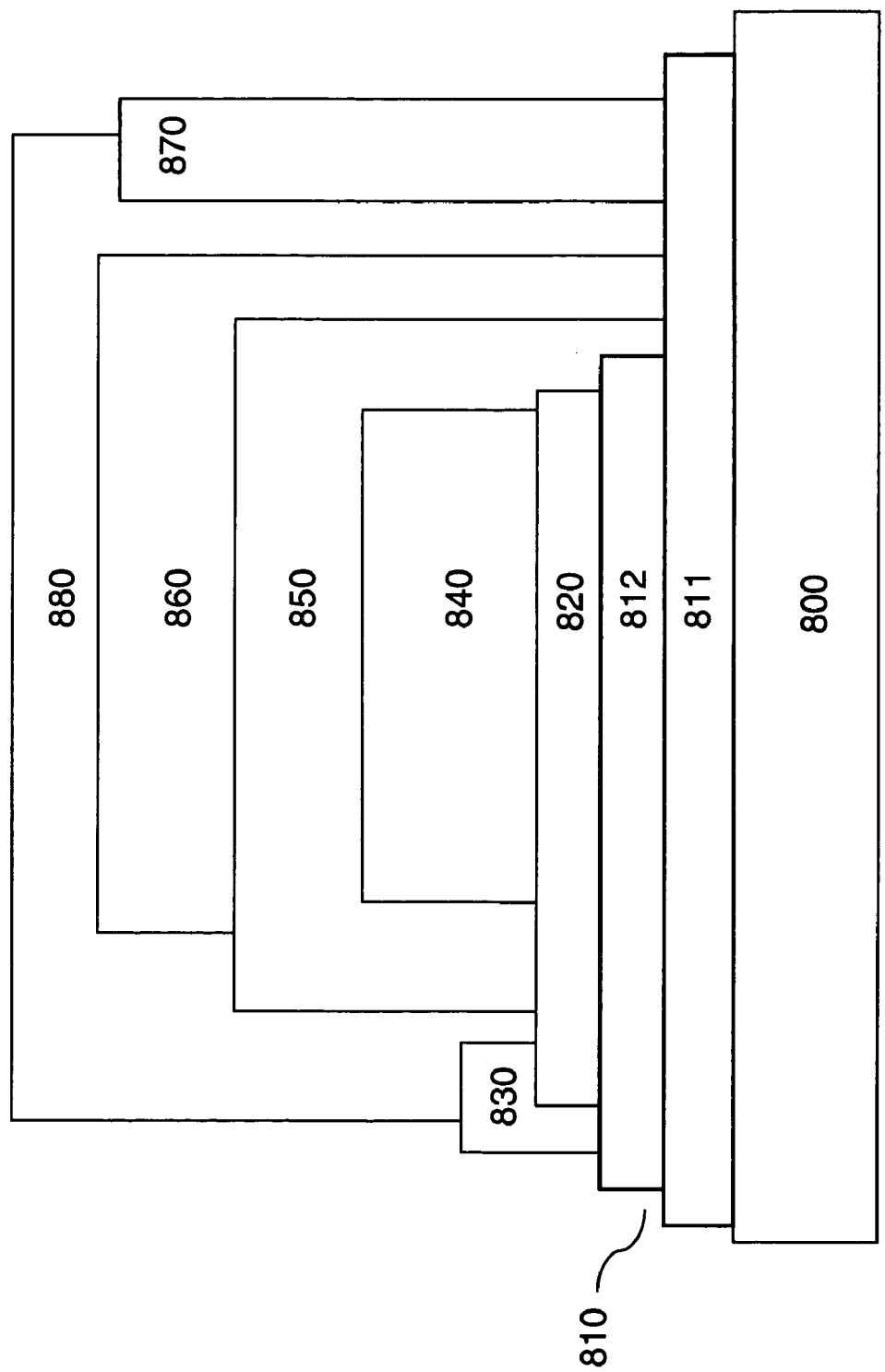
FIG. 8 illustrates a schematic of an embodiment of an anode configuration of the "normal configuration" in which the negative anode is in direct contact with an electrically conductive ZrN barrier sublayer that also serves as the anode current collector.

FIG. 8 illustrates an embodiment of an anode configuration in which the negative anode 860 is in direct contact with an electrically conductive ZrN barrier sublayer 811, which is the first barrier sublayer of the electrochemical apparatus shown and may also serve as the anode current collector, for example. This anode current collector and barrier sublayer 811 may, for example, be chemically inert even to a reactive negative anode 860 such as metallic lithium, if so selected for the negative anode 860. Due to the specific geometry of barrier sublayer 811, selected for the embodiment of an electrochemical apparatus shown in this figure, the second barrier sublayer 812 is preferably electrically insulating, such as $Si_3N_4$. The positive part of the electrochemically cell may include the cathode current collector 820, the positive terminal 830, and the positive cathode 840 separated by the electrolyte 850 from the negative part, which may constitute, for example, the metallic substrate 800, the ZrN barrier sublayer and anode current collector 811, the negative anode 860, and the negative terminal 870. Finally, the electrochemically active cell may be protected by an encapsulation 880.

Figure 9:
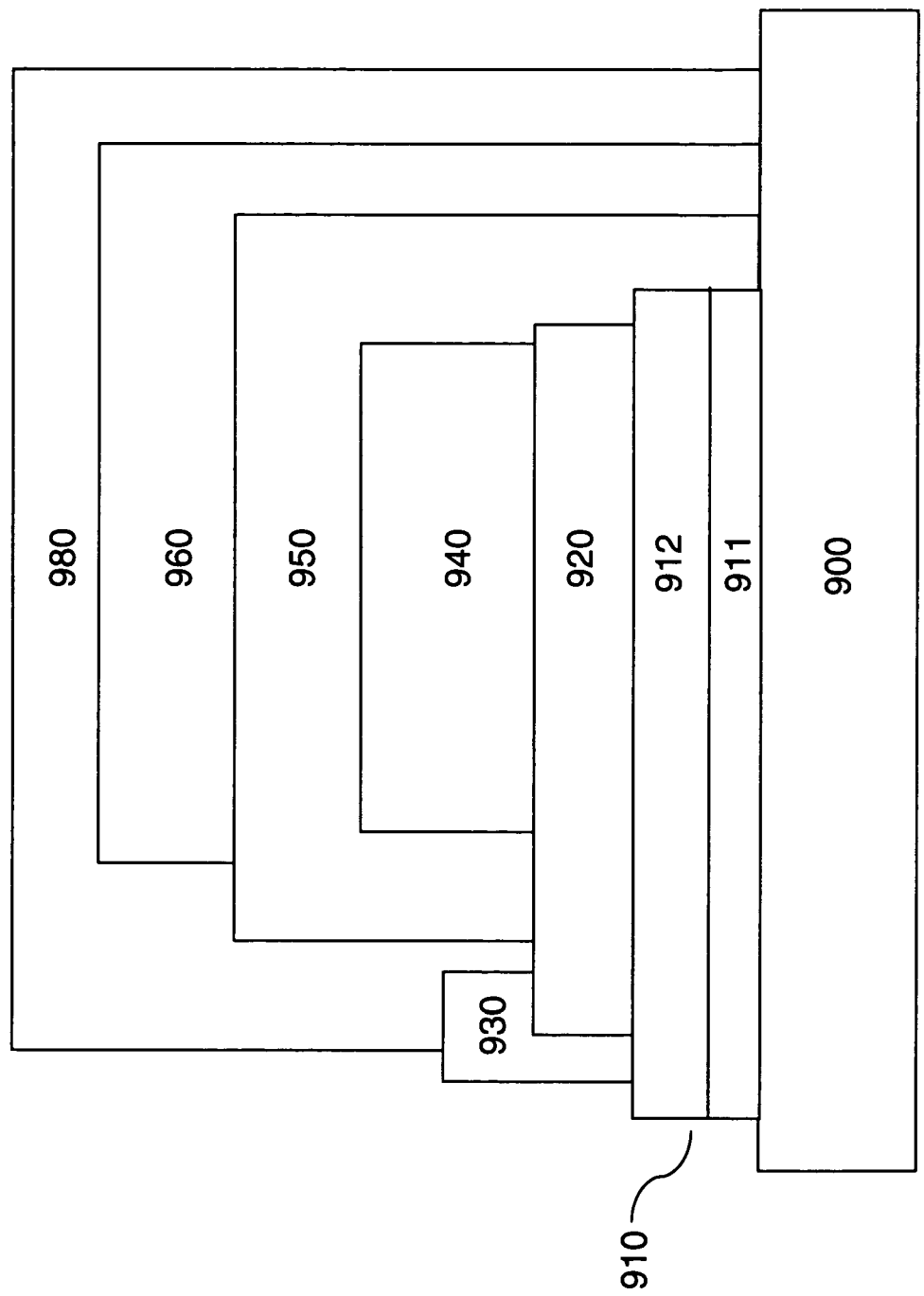
FIG. 9 illustrates a schematic of an embodiment of a battery configuration in which the negative anode is in direct contact with the substrate, in case the substrate is chemically inert to the negative anode. In this embodiment, the substrate can serve as the negative anode current collector and the negative terminal, if the substrate is sufficiently electrically conductive, as is the case for stainless steel, for example.

FIG. 9 illustrates an embodiment of a specific battery configuration in which the negative anode 960 may be in direct contact with the substrate 900 in the case where the substrate is chemically inert to the negative anode 960, for example. In such a case, the substrate may serve as the negative anode current collector and the negative terminal, for example, if the substrate is sufficiently electrically conductive, as is the case for stainless steel. The positive part of the electrochemically active cell may include, for example, the cathode current collector 920, the positive terminal 930, the positive cathode 940, and, if electrically conductive, the second barrier sublayer 912. The first barrier layer 911, however, is preferably electrically insulating in order to avoid short-circuiting the electrochemical apparatus to the negative part, which may include, for example, the metallic substrate 900 and the negative anode 960.

FIG. 10 illustrates an embodiment of a specific battery configuration in which a moisture protection layer 1092 protects, for example, the moisture-sensitive electrolyte layer 1050 against moisture present in the ambient environment for an embodiment where the protective encapsulation 1090 has been fabricated with an opening 1091 for providing access to the negative terminal 1080. The negative terminal 1080 and the anode current collector 1070, for example, may not be sufficiently thick and/or moisture blocking to protect the underlying electrolyte layer 1050 over longer periods of time. The schematic is a modified improvement of the electrochemical apparatus shown in FIG. 3a. The substrate 1000 may be electrically insulating or conductive, and so may be the barrier sublayers 1011 and 1012, which may constitute the barrier layer 1010. Further components of the electrochemical apparatus shown in FIG. 10 are the cathode current collector 1020, the positive terminal 1030, the positive cathode 1040, and the negative anode 1060.

Although the invention has been particularly shown and described with reference to the various embodiments provided above, it will be understood by those skilled in the art that various changes in form and detail may be made to these various embodiments without departing from the spirit and scope of the invention.

What is claimed is:

1. An electrochemical apparatus comprising:
    a) a substrate, selected from the group of a metallic, a polymeric, or a doped or undoped silicon material, with a first side;
    b) a first electrochemically active cell on said first side having a negative part and a positive part, said parts further comprising one or more terminals;
    c) a first barrier layer on said first side which chemically separates said first electrochemically active cell from said substrate; and
    d) wherein said first barrier layer further comprises a plurality of sublayers, wherein said barrier layer remains electrically conducting or semiconducting between said electrochemically active cell and said substrate.

2. The electrochemical apparatus of claim 1 further comprising a plurality of electrochemically active cells provided on said first side of said substrate.

3. The electrochemical apparatus of claim 1 wherein said first barrier layer comprises a chemically inert material with respect to said first electrochemically active cell and said substrate; and is adapted to be diffusion blocking relative to said first electrochemically active cell, and said substrate, during the fabrication of said first electrochemically active cell onto said substrate, and during operation and storage conditions of said electrochemical apparatus.

4. The electrochemical apparatus of claim 1 wherein:
    a) said positive part of said first electrochemically active cell is not in electrical contact with said negative part of said first electrochemically active cell;
    b) said positive part of said first electrochemically active cell comprises at least a positive cathode, a cathode current collector, and a positive terminal; and
    c) said negative part of said first electrochemically active cell comprises at least a negative anode, an anode current collector, and a negative terminal.

5. The electrochemical apparatus of claim 4 wherein said cathode current collector comprises said positive terminal.

6. The electrochemical apparatus of claim 4 wherein said anode current collector comprises said negative terminal.

7. The electrochemical apparatus of claim 4 wherein said anode current collector comprises said anode.

8. The electrochemical apparatus of claim 4 wherein said anode current collector comprises said anode current collector, said anode, and said negative terminal.

9. The electrochemical apparatus of claim 1 wherein said sublayers each comprise the same shape and area size.

10. The electrochemical apparatus of claim 1 wherein at least one of said sublayers comprises a different shape and area size from another of said plurality of sublayers.

11. The electrochemical apparatus of claim 10 wherein at least one of said sublayers comprises an electrically insulating material.

12. The electrochemical apparatus of claim 10 wherein each of said sublayers comprises electrically conducting or semiconducting material.

13. The electrochemical apparatus of claim 1 wherein said first barrier layer only partially covers said substrate such that at least said positive part of said first electrochemically active cell is chemically separated from said substrate.

14. The electrochemical apparatus of claim 1 wherein said first barrier layer only partially covers said substrate such that at least said negative part of said first electrochemically active cell is chemically separated from said substrate.

15. The electrochemical apparatus of claim 1 wherein said first barrier layer comprises a thickness ranging from 0.01 µm to 1 mm.

16. The electrochemical apparatus of claim 1 wherein said first barrier layer comprises a thickness ranging from 0.1 µm to 100 µm.

17. The electrochemical apparatus of claim 1 wherein said first barrier layer comprises a thickness ranging from 0.5 µm to 5 µm.

18. The electrochemical apparatus of claim 1 wherein said substrate comprises a thickness within a range of 0.1 µm to 1 cm.

19. The electrochemical apparatus of claim 1 wherein said substrate comprises a thickness within a range of 1 μm to 1 mm.

20. The electrochemical apparatus of claim 1 wherein said substrate comprises a thickness within a range of 10 μm to 100 μm.

21. The electrochemical apparatus of claim 1 wherein said sublayers comprise a chemical compound selected:
   a) from the group of metals, semi-metals, alloys, borides, carbides, silicides, nitrides, phosphides, oxides and iodides;
   b) from the group of any multinary compounds composed of borides, carbides, silicides, nitrides, phosphides, oxides and iodides; or
   c) from the group of high-temperature stable organic polymers and high-temperature stable silicones.

22. The electrochemical apparatus of claim 1 wherein at least one of said sublayers comprise a single phase of crystalline, nano-crystalline, amorphous, or glassy material or poly phase mixture or composite thereof.

23. The electrochemical apparatus of claim 1 wherein at least one of said sublayers comprise a single phase of amorphous or glassy material.

24. The electrochemical apparatus of claim 1 wherein said first electrochemically active cell comprises a battery selected from the group of lithium metal anode batteries, lithium-ion anode batteries, and lithium free anode batteries.

25. The electrochemical apparatus of claim 24 wherein said first electrochemically active cell comprises a positive thin-film cathode deposited by vapor deposition, and wherein a thickness of said positive thin-film cathode is less than 200 μm.

26. The electrochemical apparatus of claim 24 wherein said first electrochemically active cell comprises a positive thin-film cathode deposited by non-vacuum deposition, and wherein a thickness of said positive thin-film cathode is less than 200 μm.

27. The electrochemical apparatus of claim 25 wherein said positive thin-film cathode comprises single crystallites having a size of at least 100 Å.

28. The electrochemical apparatus of claim 26 wherein said positive thin-film cathode comprises single crystallites having a size of at least 100 Å.

29. The electrochemical apparatus of claim 1 wherein said first electrochemically active cell comprises a thin-film solid-state electrolyte having a thickness of less than 100 μm.

30. The electrochemical apparatus of claim 1 wherein said first electrochemically active cell comprises a thin-film negative anode selected from the group of lithium metal, lithium-ion anode, or a metal that does not form inter-metallic compounds with lithium, and wherein the thickness of said thin-film negative anode is less than 200 μm.

31. The electrochemical apparatus of claim 1 wherein said first electrochemically active cell further comprises a protective encapsulation and wherein said protective encapsulation is adapted to protect said first electrochemically active cell against at least mechanical and chemical factors from the ambient environment.

32. The electrochemical apparatus of claim 31 wherein said encapsulation has at least one opening adapted to allow direct electrical contact to at least one terminal of said first electrochemically active cell.

33. The electrochemical apparatus of claim 32 wherein said electrochemically active cell further comprises an electrolyte and wherein said one or more terminals are separated from said electrolyte by a moisture protection layer.

34. The electrochemical apparatus of claim 33 wherein said moisture protection layer comprises a material having moisture blocking properties, and is selected:
   a) from the group of metals, semi-metals, alloys, borides, carbides, diamond, diamond-like carbon, silicides, nitrides, phosphides, oxides, fluorides, chlorides, bromides, iodides;
   b) from the group of any multinary compounds composed of borides, carbides, silicides. nitrides, phosphides, oxides, fluorides. chlorides, bromides, and iodides; or
   c) from the group of high-temperature stable organic polymers and high-temperature stable silicones.

35. The electrochemical apparatus of claim 33 wherein said moisture protection layer comprises a single phase of crystalline, nano-crystalline, amorphous, or glassy material or poly phase mixture or composite thereof.

36. The electrochemical apparatus of claim 1 further comprising a protective encasing and wherein said protective encasing is adapted to protect said electrochemical apparatus against at least mechanical and chemical factors from the ambient environment.

37. The electrochemical apparatus of claim 36 wherein said protective encasing has at least one opening adapted to allow direct electrical contact to at least one terminal of said first electrochemical apparatus.

38. The electrochemical apparatus of claim 37 wherein said electrochemically active cell further comprises an electrolyte and wherein said one or more terminals are separated from said electrolyte by a moisture protection layer.

39. The electrochemical apparatus of claim 38 wherein said moisture protection layer comprises a material having moisture blocking properties, and is selected:
   a) from the group of metals, semi-metals, alloys, borides, carbides, diamond, diamond-like carbon, silicides, nitrides, phosphides, oxides, fluorides, chlorides, bromides, iodides;
   b) from the group of any multinary compounds composed of borides, carbides, silicides, nitrides, phosphides, oxides, fluorides, chlorides, bromides, and iodides; or
   c) from the group of high-temperature stable organic polymers and high-temperature stable silicones.

40. The electrochemical apparatus of claim 38 wherein said moisture protection layer comprises a single phase of crystalline, nano-crystalline, amorphous, or glassy material or poly phase mixture or composite thereof.

41. The electrochemical apparatus of claim 1 further comprising a second layer located on a second side of said substrate.

42. The electrochemical apparatus of claim 41 wherein said second layer comprises a chemical compound selected:
   a) from the group of metals, semi-metals, alloys, borides, carbides, diamond, diamond-like carbon, silicides, nitrides, phosphides, oxides, fluorides, chlorides, bromides, iodides;
   b) from the group of any multinary compounds composed borides, carbides, silicides, nitrides, phosphides, oxides, fluorides, chlorides, bromides, and iodides; or
   c) from the group of high-temperature stable organic polymers and high-temperature stable silicones.

43. The electrochemical apparatus of claim 1 wherein at least one of said sublayers comprises an electrically insulating material.

44. The electrochemical apparatus of claim 1 wherein each of said sublayers comprises electrically conducting or semi-conducting material.

* * * * *